United States Patent
Tomita

(12)
(10) Patent No.: US 6,292,028 B1
(45) Date of Patent: Sep. 18, 2001

(54) OUTPUT CIRCUIT FOR A TRANSMISSION SYSTEM

(76) Inventor: Takashi Tomita, c/o Oki Electric Industry Co., Ltd. 7-12, Toranomon 1-chome, Minato-ku, Tokyo (JP)

( * ) Notice: Subject to any disclaimer, the term of this patent is extended or adjusted under 35 U.S.C. 154(b) by 0 days.

(21) Appl. No.: 09/379,123

(22) Filed: Aug. 23, 1999

(30) Foreign Application Priority Data

Aug. 25, 1998 (JP) .................................................. 10-238583

(51) Int. Cl.$^7$ .............................................. H03K 19/0175
(52) U.S. Cl. .............................. 326/86; 326/30; 326/83; 326/87; 326/81; 327/65
(58) Field of Search ................................. 326/30, 81, 83, 326/86, 87; 327/53, 65, 66, 69

(56) References Cited

U.S. PATENT DOCUMENTS

| | | | |
|---|---|---|---|
| 5,767,699 | * 6/1998 | Bosnyak et al. | 326/86 |
| 5,959,472 | * 9/1999 | Nagamatsu et al. | 327/108 |
| 5,986,473 | * 11/1999 | Krishnamurthy et al. | 326/83 |
| 6,008,682 | * 12/1999 | Mirov | 327/333 |
| 6,025,742 | * 2/2000 | Chan | 327/108 |
| 6,054,874 | * 4/2000 | Sculley et al. | 326/83 |
| 6,111,425 | * 8/2000 | Bertin et al. | 326/21 |
| 6,114,898 | * 9/2000 | Okayasa | 327/437 |

FOREIGN PATENT DOCUMENTS

| | | |
|---|---|---|
| A-01-296491 | 11/1989 | (JP) . |
| A-02-151059 | 6/1990 | (JP) . |
| A-02-198096 | 8/1990 | (JP) . |

* cited by examiner

Primary Examiner—Michael Tokar
Assistant Examiner—T. Vibol
(74) Attorney, Agent, or Firm—Rabin & Champagne, P.C.

(57) ABSTRACT

An output circuit for a transmission system is disclosed. The output circuit of the present invention comprises an input terminal receiving an input logical signal, a first output terminal outputting a first output logical signal having a logic corresponding to a logic of the input logical signal, a second output terminal outputting a second output logical signal having a logic corresponding to an inverted logic of the input logical signal, a first constant voltage supply circuit generating a first voltage level, a second constant voltage supply circuit generating a second voltage level, and an output logic formation circuit connected to said first and second constant voltage supply circuits. The output logic formation circuit generates the first and second output logical signals having either the first voltage level or second voltage level based on the logic of the input logical signal.

26 Claims, 34 Drawing Sheets

C2150

| 2151 | 2152 | 2153 | 2154 |
|------|------|------|------|
| 0    | 0    | 1    | 1    |
| 1    | 1    | 0    | 0    |

| 2171 | 2172 | 2173 | 2174 | 2175 |
|---|---|---|---|---|
| 0 | 0 | 1 | 1 | 1 |
| 1 | 1 | 0 | 0 | 0 |

| 2211 | 2212 | 2213 | 2214 | 2215 |
|------|------|------|------|------|
| 0    | 0    | 1    | 1    | 0    |
| 1    | 1    | 0    | 0    | 1    |

OUTPUT CIRCUIT FOR A TRANSMISSION SYSTEM

BACKGROUND OF THE INVENTION

The present invention relates to an output circuit and an input circuit, and more particularly, it relates to an output circuit and an input circuit, which can apply to a small amplitude interface circuit used in a signal transmission system between integrated circuits.

In recent years, in consequence of the high send a receive speed of a binary signal between CMOS (complementary metal-oxide semiconductor) integrated circuits, signals at a well-known TTL or CMOS level which has been conventionally used are becoming difficult to send and receive. In the TTL or CMOS level, the frequency of about several tens of MHz is a limit, and when the frequency exceeds the limit, a small amplitude interface circuit, which uses a transmission signal having a smaller voltage amplitude than the TTL and CMOS levels, is used. The small amplitude interface circuit implements high-speed signal transmission by performing the impedance matching of a transmission line, reducing electrical reflection and shortening the charge and discharge time generated in the capacitance component inside the circuit due to the small amplitude of the transmission signal voltage.

As the typical conventional small amplitude interface circuit, for example, there are interface circuits based on CTT and GTL (Gunning transceiver logic). Further, as the transmission methods of the conventional small amplitude interface circuits, there are an unbalanced transmission-type method and a balanced transmission-type method. Because the unbalanced transmission-type interface circuit has a configuration in which transmission signals are transmitted via a single transmission line, it has such advantages that the configuration is simple and the number of pins used for the application of an LSI (large scale integrated circuit) can be reduced. Conversely, because the balanced transmission-type interface circuit has a configuration in which transmission signals are transmitted via two transmission lines and use differential signals, it has such advantages that noise can be offset and relative transmission amplitude can be increased.

Up to this time, as an output circuit and an input circuit that can apply to the small amplitude interface circuit based on the CTT, for example, there are those that have been disclosed in the "Center-Tap-Terminated (CTT) Low-Level, High-Speed Interface Standard for Digital Integrated Circuits, JEDEC STANDARD, JESD8-4".

Further, as an input circuit that can apply to other conventional small amplitude interface circuits, there are those that can apply to the GTL disclosed in "A CMOS Low-Voltage-Swing Transmission-Line Transceiver, by Bill Gunning, et al, ISSCC Digest of Technical Papers, pp. 58–59, February 1992".

Because the conventional output circuit and input circuit are described in these references, their detailed description are not redundantly described in this specification.

However, in the small amplitude interface circuit based on the balanced transmission-type CTT, the amplitude of an output signal sent to the transmission line between the output circuit and the input circuit is small. Therefore, as the input circuit, a differential amplification circuit having the capability to receive a small amplitude signal must be used. For example, in the conventional reference (JEDEC STANDARD) with reference to the CTT, a differential amp used as an input circuit whose amplitude of an output signal is about 1.0 V and whose minimum receivable amplitude is 0.2 V.

On the one hand, in a small amplitude interface circuit, the potential fluctuation of a signal which is propagated via the transmission line needs to be considered due to the fluctuation characteristics of an output circuit, the noise of a transmission signal, or the attenuation of a signal which is being propagated. Therefore, the receiving sensitivity of the input circuit must have a certain tolerance to accommodate the potential (hereinafter referred to as "output voltage") of an output signal from the output circuit.

Consequently, an input circuit is requested for performing a receiving operation with an ample allowance for a small amplitude input signal and must apply an exceedingly high-performance differential amplification circuit. However, using such high-performance differential amplification circuit is not easy in consideration of circuit technology and cost, and finally, under the present conditions, the light receiving sensitivity of the input circuit cannot have an ample allowance.

Further, in the conventional balanced transmission-type interface circuit based on the CTT, the output voltage of an output circuit is determined according to the ratio of the impedance of a terminating resistor in the transmission line and the on (dynamic) resistance of an MOS transistor comprising the output circuit. That is to say, the output voltage of the output circuit greatly affects the operating resistance of the MOS transistor comprising the output circuit.

Therefore, for example, when the resistance of the MOS transistor comprising the output circuit is fluctuated according to the completion of a process, the fluctuation of a power supply voltage or the fluctuation of ambient temperature, the voltage of an output signal is greatly deviated from a design value. In a small amplitude interface circuit, fluctuation of such output voltage reduces the allowance for the receiving sensitivity of an input circuit and in the worst case, may cause a malfunction.

Up to this date, to prevent the possibility of such a malfunction, a manufactured integrated circuit is inspected as to whether an output voltage is within the specification value, and if a fluctuation is out of the specification value, the manufactured integrated circuit is discarded as a defective product. Naturally, having many defective products is not desirable because they are not economical. In particular, because an LVDS interface circuit which is a type of a small amplitude interface circuit with a strict specification of the output voltage requirements, a large number of defective products may be generated in the integrated circuit if the conventional output circuit is used.

Further, in a small amplitude interface circuit, because the amplitude of an input signal is small, a differential amp is generally used in the input circuit. However, the conventional input circuit has the configuration in which only two NMOS transistors receive the input signal or only two PMOS transistors receive the input signal. Therefore, in the configuration in which only the NMOS transistors receive the input signal, if the reference potential is in the vicinity of the GND (ground) potential or the potential of a differential input signal is in the vicinity of the GND potential, a sufficient bias voltage between the gate and source of both the NMOS transistors cannot be sufficiently obtained. Furthermore, in the configuration in which only the PMOS transistors receive the input signal, if the reference potential is in the vicinity of power supply potential or the potential of the differential input signal is in the vicinity of power supply potential, a bias voltage between the gate and source of both the PMOS transistors cannot be sufficiently obtained.

That is to say, the conventional input circuit can anticipate a full operation only for the input signal in a narrow range, but cannot receive the differential input signal in a broad range. Consequently, the requirements of the LVDS input voltage cannot be satisfied or is extremely difficult to satisfy. Further, it is difficult for the conventional input circuit to support various interface circuits when the specifications of the potential of the input signal differs from an input circuit. Therefore, the input circuit may need to be redesigned in accordance with the specifications, and that is not economical.

Furthermore, the conventional input circuit fluctuates the center potential of the differential input signal by the fluctuation of an input signal, reference potential, a power supply voltage or GND potential, in particular, by the fluctuation of the power supply potential and GND potential; thus, may cause a malfunction.

SUMMARY OF THE INVENTION

The present invention anticipates problems of the conventional output circuit, and one object is to provide a new and improved output circuit which can secure a fixed allowance for the receiving sensitivity of an input circuit when it is applied to an interface by suppressing the fluctuation of an output voltage and being able to output a fixed output voltage. Another object of the present invention is to provide an economical, new and improved output circuit which is less prone to malfunction in addition to reduce defective products during shipment of integrated circuits.

To solve the issues of the conventional output circuit, an output circuit of the present invention comprises an input terminal receiving an input logical signal, a first output terminal outputting a first output logical signal having a logic corresponding to a logic of the input logical signal, a second output terminal outputting a second output logical signal having a logic corresponding to an inverted logic of the input logical signal, a first constant voltage supply circuit generating a first voltage level, a second constant voltage supply circuit generating a second voltage level, and an output logic formation circuit connected to said first and second constant voltage supply circuits. The output logic formation circuit generates the first and second output logical signals having either the first voltage level or second voltage level based on the logic of the input logical signal.

DETAILED DESCRIPTION OF THE PREFERRED EMBODIMENTS

These and other embodiments of the present invention will be described in more detail with reference to the accompanying drawings, as follows. Besides, the first to 11th embodiments among the embodiments described below relate to an output circuit and the 12th embodiment onward relate to an input circuit. Further, in the following explanatory diagrams and accompanying drawings, redundant description is omitted by applying the same numerical code to a component having almost the same function and configuration.

Figure 1:
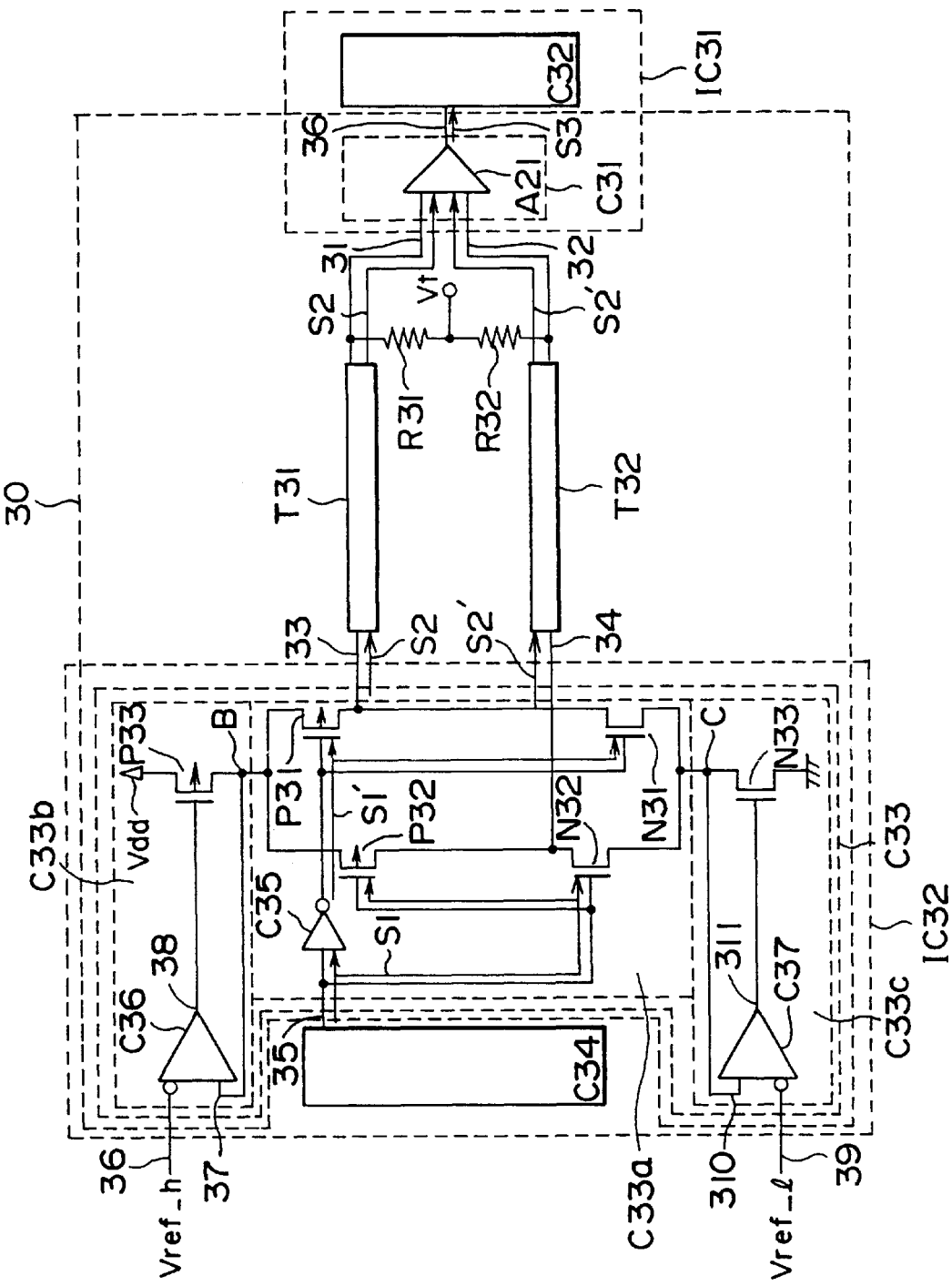
FIG. 1 is a schematic circuit diagram of an output circuit and an interface circuit to which the present invention can be applied.
Figure 2:
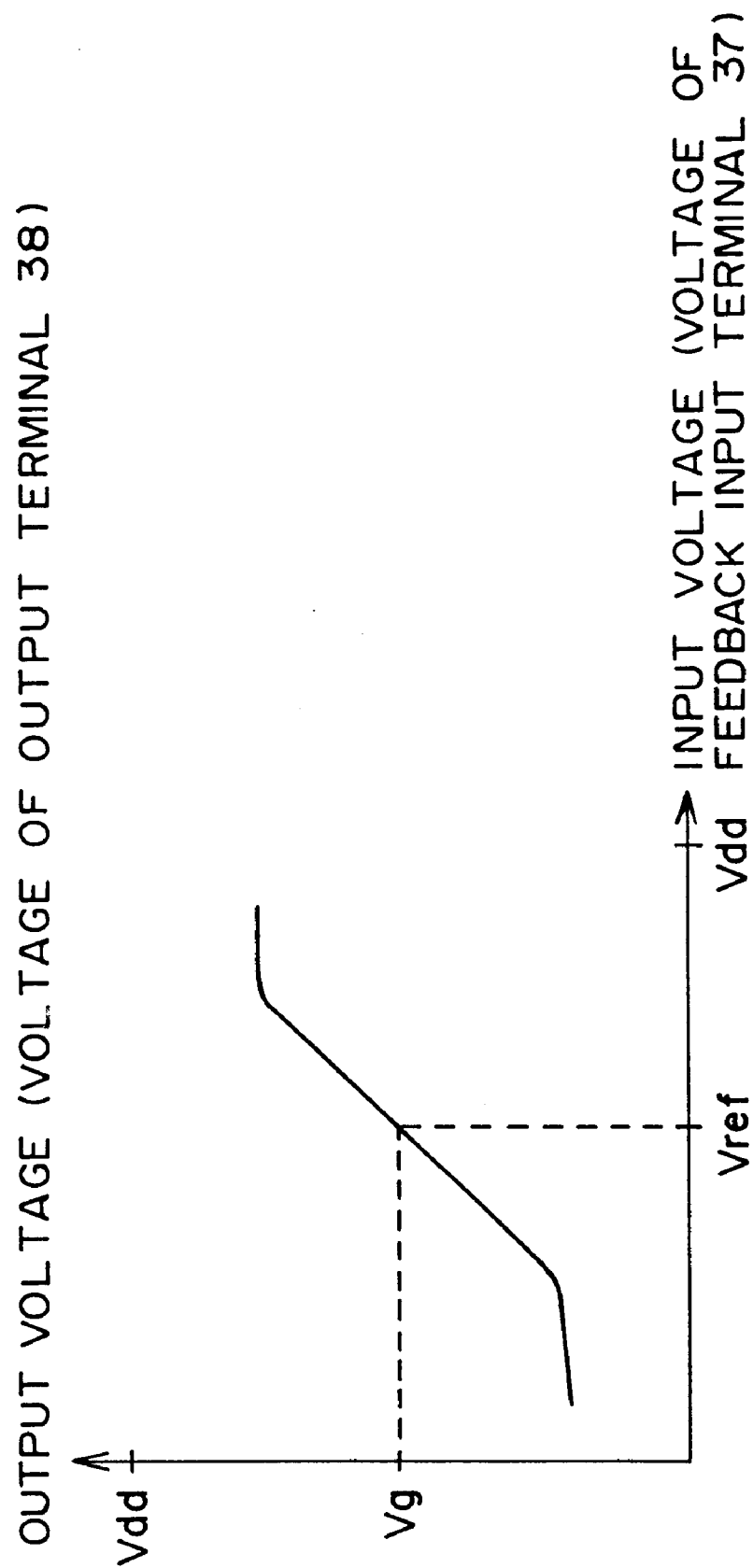
FIG. 2 is a characteristic diagram of a control circuit that can be applied to the output circuit shown in FIG. 1.
Figure 3:
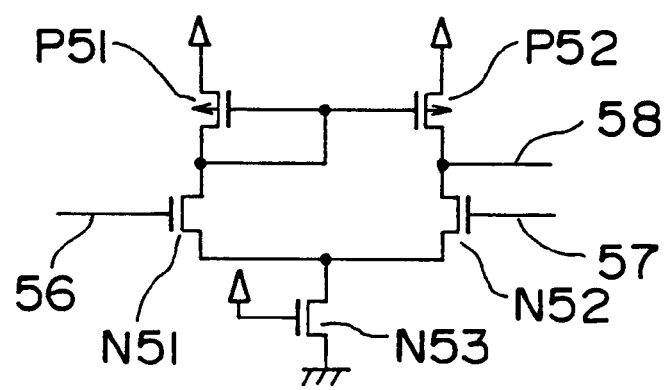
FIG. 3 is a schematic circuit diagram of a control circuit that can be applied to the output circuit shown in FIG. 1.
Figure 4:
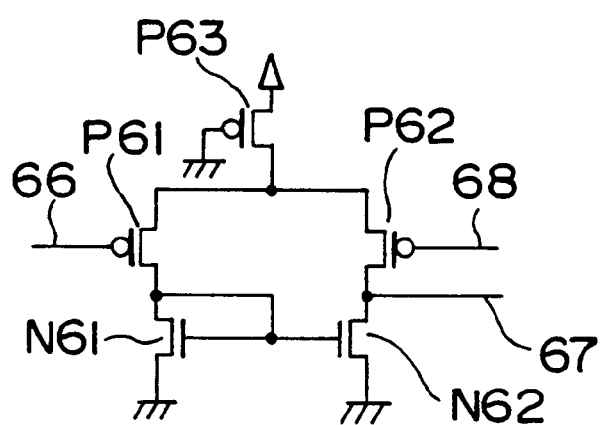
FIG. 4 is a schematic circuit diagram of another control circuit that can be applied to the output circuit shown in FIG. 1.

The first embodiment is described referring to FIGS. 1 to 4. Hereupon, FIG. 1 is a schematic circuit diagram of an output circuit C33 according to this embodiment and an interface circuit 30 to which the output circuit C33 applies and FIG. 2 is a characteristic explanatory diagram of a control circuit C36 which can be applied to the output circuit 33 according to this embodiment. Further, FIG. 3 is a schematic circuit diagram of a control circuit C53 which can be applied as the control circuit C36 and FIG. 4 is a schematic circuit C63 which can be applied as a control circuit C37.

At first, the configuration of the balanced transmission-type interface circuit 30 to which the output circuit C33 according to this embodiment applies is described referring to FIG. 1. As shown in FIG. 1, the interface circuit 30 comprises the output circuit C33 according to this embodiment, an input circuit C31, a first transmission line T31, a second transmission line T32, a first terminating resistor R31 and a second terminating resistor R32.

In the interface circuit 30, the output circuit C33 according to this embodiment is integrated with an internal circuit C34 and formed on an integrated circuit IC32 on the signal sending side. The output circuit C33 has an input terminal 35, a first output terminal 33 and a second output terminal 34, and is provided with the function of almost simultaneously outputting output signals S2 and S2' having a mutually inverted logic from the first output terminal 33 and the second output terminal 34 in accordance with the logic of a logical signal S1 input from the input terminal 35. In the integrated circuit IC32, the output terminal of the internal circuit C34 is connected to the input terminal 35 of the output circuit C33. Besides, the details of the output circuit C33 according to this embodiment are described later.

Further, the input circuit C31 is integrated with the internal circuit C32 and formed on an integrated circuit IC31 on the signal receiving side. Such input circuit C31 has a first input terminal 31, a second input terminal 32 and an output terminal 36, and is provided with the function of amplifying the potential difference between the first input terminal 31 and the second input terminal 32 and outputting a logical signal S3 in the CMOS level from the output terminal 36. Because the voltage amplitude of the output signals S2 and S2' is small in the interface circuit 30, a differential amp A21 applies as such input circuit C31. In the integrated circuit IC31, the input terminal of an internal circuit C32 is connected to the output terminal 36 of such differential amp A21.

In the interface circuit 30, the two output terminals 33 and 34 of the output circuits C33 and the two input terminals 31 and 32 of the differential amp A21 are connected in one-to-one correspondence by the first transmission line T31 and the second transmission line T32. That is to say, the first output terminal 33 of the output circuit C33 and the first input terminal 31 of the differential amp A21 are connected by the first transmission line T31 and the second output terminal 34 and the second input terminal 32 are connected by the second transmission line T32.

In the interface circuit 30, such first transmission line T31 and second transmission line T32, for example, use micro strip lines formed on a printed circuit board. One end connected to each differential amp A21 of such first transmission line T31 and second transmission line T32 terminates with terminating potential Vt via the first terminating resistor R31 and the second terminating resistor R32.

In the interface circuit 30, the impedance of the first terminating resistor R31 and the characteristic impedance of the first transmission line T31 are equally set and the impedance of the second terminating resistor R32 and the characteristic impedance of the second transmission line T32 are equally set. Moreover, the terminating potential Vt is set to a lower potential than the power supply potential of the integrated circuit IC32 and the power supply potential of the integrated circuit IC31. Due to such configuration, electrical reflection is suppressed and the high-speed sending and receiving transmission using a small amplitude signal is enabled.

When the logical signal S1 in the CMOS level is output from the internal circuit C34 toward the balanced transmission-type interface circuit 30 composed as described above, the logical signal S1 is input to the output circuit C33 via the input terminal 35.

The complementary output signals S2 and S2' are output from the output circuit C33, to which the logical signal S1 is input via the first output terminal 33 and the second output terminal 34. That is to say, the output signal S2 in the CTT level having the same logic as the logical signal S1 is output from the first output terminal 33 to the first transmission line T31 and almost at the same time, the output signal S2' in the CTT level having the inverted logic of the logical signal S1 is output from the second output terminal 34 to the second transmission line T32. Such complementary output signals S2 and S2' are separately transmitted by the first transmission line T31 and the second transmission line T32 and almost at the same time input from each of the first input terminal 31 and the second input terminal 32 to the differential amp A21.

In the differential amp A21, the potential difference between the output signal S2 input to the first input terminal 31 and the output signal S2' input from the second input terminal 32 is amplified and the logical signal S3 in the CMOS level having the same logic as the logical signal S1 is output from the output terminal 36. Consequently, the logical signal S3 in the CMOS level is received by an internal circuit C32 and the signal transmission in the interface circuit 30 is implemented.

Besides, when the interface circuit 30 described above conforms to the CTT specifications, the characteristic impedance of the first transmission line T31 and the second transmission line T32 is both set to about 50Ω and accordingly, the impedance of the first terminating resistor R31 and the second terminating resistor R32 is set to about 50Ω. Moreover, the power supply potential of the integrated circuits IC31 and IC32 (22) is set to about 3.3 V and the terminating potential Vt is set to 1.5 V.

Next, the output circuit C33 according to this embodiment is described in detail referring to FIGS. 1 to 4. As shown in FIG. 1, the output circuit C33 according to this embodiment comprises a push-pull unit C33a which corresponds to an output logic supply circuit and a first voltage drop power supply circuit C33b which a first or second stable voltage supply circuit and a second voltage drop power supply circuit C33c. Such output circuit C33 can output a binary digital signal having the predetermined voltage amplitude as designed as the output signals S2 and S2'.

In the output circuit C33 according to this embodiment, the first voltage drop power supply circuit C33 comprises a third PMOS transistor P33, which corresponds to a voltage drop means and the bias voltage control circuit C36, which corresponds to the control circuit of the voltage drop means, and has a node B and power supply potential Vdd. In the output circuit C33, such first voltage drop power supply circuit C33b is provided with the function of supplying a stable voltage for forming an output signal in the "H (high)" level to the push-pull unit C33a.

In the first voltage drop power supply circuit C33b, the third PMOS transistor P33 comprises a gate terminal connected to an output terminal 38 of the bias voltage control circuit C36, a source terminal connected to the power supply potential Vdd and a drain terminal connected to the node B. In the third PMOS transistor P33, the resistance between the source terminal and the drain terminal can be adjusted by controlling the potential of the gate terminal.

Further, in the first voltage drop power supply circuit C33b, the bias voltage control circuit C36, in addition to the output terminal 38 connected to the gate terminal of the third PMOS transistor P33, comprises the reference potential input terminal 36 connected to a reference potential Vref_h outside the first voltage drop power supply circuit C33b and a feedback input terminal 37 connected to the node B. Such bias voltage control circuit C36 is provided with the function of outputting the output voltage for controlling the on resistance of the third PMOS transistor P33 from the output terminal 38 in accordance with the compared result in which the potential of the reference potential input terminal 36 and the potential of the feedback input terminal 37 are compared.

Hereupon, the output characteristics of such bias voltage control circuit C36 are described referring to FIG. 2. FIG. 2 shows the relationship between the input voltage to the feedback input terminal 37 and the output voltage from the output terminal 38 in the state in which the fixed reference potential Vref_h applies to the reference potential input terminal 36.

As shown in FIG. 2, in the bias voltage control circuit C36, the output voltage from the output terminal 38 increases as the input voltage to the feedback input terminal 37 increases in a predetermined voltage region centered around the reference potential Vref_h. Further, the input voltage from the output terminal 38 decreases as the input voltage to the feedback input terminal 37 decreases. When the input voltage to the feedback input terminal 37 becomes equal to the reference potential Vref_h, the output voltage from the output terminal 38 becomes a predetermined voltage Vg_h.

FIG. 3 shows a circuit C53 as an example of the circuit which can serve as the bias voltage control circuit C36. Such circuit C53 is a differential amp for a current mirror load, and an input terminal 56 of the circuit C53 corresponds to the feedback input terminal 36 of the bias voltage control circuit C36. Further, an input terminal 57 of the circuit C53 corresponds to the reference potential input terminal 37 of the bias voltage control circuit C36, and an input terminal 58 corresponds to the output terminal 38 of the bias voltage control circuit C36.

As shown in FIG. 3, the circuit C53 can be designed so that the predetermined voltage Vg_h will be output by adjusting the on (dynamic) resistance of PMOS transistors P51 and P52 and NMOS transistors N51, N51 and N53. Besides, in the output circuit C33 according to this embodiment, it goes without saying that the bias voltage control circuit C36 can be applied to a circuit other than the circuit C53 of FIG. 3.

In the first voltage drop power supply circuit C33b composed as described above, when the predetermined voltage Vg_h applies to the gate terminal of the third PMOS transistor P33, the potential of the node B can become the same as the reference potential Vref_h. As shown in FIGS. 1 and 2 again, when the potential of the node B becomes higher than the reference potential Vref_h, the potential of the feedback reference potential 37 of the bias voltage control circuit C36 becomes higher than the potential (reference potential Vref_h) of the reference potential input terminal 36. Therefore, the output voltage that is higher than the predetermined voltage Vg_h is output from the output terminal 38 and the potential of the gate terminal of the third PMOS transistor P33 rises. Consequently, the resistance between the source terminal and the drain terminal of the third PMOS transistor P33 rises and the potential of the node B drops.

Conversely, when the potential of the node B becomes lower than the reference potential Vref_h, the potential of the feedback input terminal 37 becomes lower than the potential (reference potential Vref_h) of the reference potential input terminal 36. Therefore, the output voltage that is lower than the predetermined voltage Vg_h is output from the output terminal 38 and the potential of the gate terminal of the third PMOS transistor P33 drops. Consequently, the resistance between the source terminal and the drain terminal of the third PMOS transistor P33 drops and the potential of the node B rises.

Finally, in the first voltage drop power supply C33b, it is clear that the potential of the node B is always held almost in the reference potential Vref_h by providing the feedback control of the third PMOS transistor P33 via the bias voltage control circuit C36.

The second voltage drop power supply circuit C33c comprises a third NMOS transistor N33 and a bias voltage control circuit C37, and in addition to them, has a node C connected to the push-pull unit C33a and GND potential. In the output circuit C33 according to this embodiment, such second voltage drop power supply circuit C33c is provided with the function of supplying a stable voltage for forming an output signal in the "L" level to the push-pull unit C33a.

In the second voltage drop power supply circuit C33c, the third NMOS transistor N33 has a gate terminal connected to an output terminal 311 of the bias voltage control circuit C37, a source terminal connected to the GND potential and a drain terminal connected to the node C. Such third NMOS transistor N33 can adjust the resistance between the source terminal and the drain terminal by controlling the potential of the gate terminal.

Further, the bias voltage control circuit C37, in addition to the output terminal 311 connected to the gate terminal of the third NMOS transistor N33, has a reference potential input terminal 39 connected to a reference potential Vref_I outside the second voltage drop power supply circuit C33c and a feedback input terminal 310 connected to the node C. Such bias voltage control circuit C37, like the bias voltage control circuit C36 described above, is provided with the function of outputting the output voltage for controlling the on resistance of the third NMOS transistor N33 from the output terminal 311 in accordance with the compared result in which the potential of the reference potential input terminal 39 and the potential of the feedback input terminal 310 are compared.

In such bias voltage control circuit C37, if the fixed reference voltage Vref_I applies to the reference potential input terminal 39 of the bias voltage control circuit C37, when the input voltage applied to the feedback input terminal 310 is increased in the predetermined voltage range centered around the reference potential Vref_I, the output voltage from the output terminal 311 is also increased. Conversely, when the input voltage applied to the feedback input terminal 310 is decreased, the output voltage from the output terminal 311 also is decreased. Then, when the input voltage becomes equal to the reference potential Vref_I, the output voltage from the output terminal 311 becomes the predetermined voltage Vg_I.

FIG. 4 shows the circuit C63 as an example of the circuit, which can apply as the bias voltage control circuit C37. Such circuit C is a differential amp for a current mirror load, and an input terminal 66 of the circuit C63 corresponds to the feedback input terminal 36 of the bias voltage control circuit C37. Further, an input terminal 67 of the circuit C63 corresponds to the reference potential input terminal 37 of the bias voltage control circuit C37 and an output terminal 68 of the circuit C63 corresponds to the output terminal 38 of the bias voltage control circuit C37.

As shown in FIG. 4, the circuit C63 can be designed so that the predetermined voltage Vg_I will be output by adjusting the on resistance of PMOS transistors P61, P62 and P63 and NMOS transistors N61 and N62. Besides, in the output circuit C33 according to this embodiment, it goes without saying that a circuit other than the circuit shown in FIG. 4 can be applied to the bias voltage control circuit C37.

In the second voltage drop power supply circuit C33c composed as described above, when the predetermined voltage Vg_I is applied to the gate terminal of the third NMOS transistor N33, the potential of the node C is designed so as to become the potential equal to the reference potential Vref_I. Then, due to the same reason as the first voltage drop power supply circuit C33b, the potential of the node C is always held in almost the reference potential Vref_I by performing the feedback control of the third NMOS transistor N33 via the bias voltage control circuit C37.

As shown in FIG. 1, the push-pull unit C33a mainly comprises a CMOS inverter circuit C35 and four MOS-FETs (metal-oxide semiconductor field-effect-transistors: Hereinafter referred to as "MOS transistors"). The input terminal 35, the first output terminal 33 and the second output terminal 34 of the output circuit C33 are formed in such push-pull unit C33a.

The CMOS inverter circuit C35 applied to the push-pull unit C33a is provided with the function of outputting a logical signal in the CMOS level having the inverted logic of the pertinent logical signal when the logical signal in the CMOS level is input. In the push-pull unit C33a, the input terminal of such CMOS inverter circuit C35 is connected to the input terminal 35.

Further, the four MOS transistors which comprise the push-pull unit C33a are a first PMOS transistor P31, a second PMOS transistor P32, a first NMOS transistor N31 and a second NMOS transistor N32. In the push-pull unit C33a, CMOS pairs consisting of complementary MOS transistors are formed with such four MOS transistors.

One CMOS pair comprising the push-pull unit C33a comprises the first PMOS transistor P31 and the second NMOS transistor N31. In the push-pull unit C33a, the gate terminal of the first PMOS transistor P31 and the gate terminal of the second NMOS transistor N31 are connected in common to the output terminal of the CMOS inverter circuit C35. Further, the drain terminal of the first PMOS transistor P31 and the drain terminal of the first NMOS transistor N31 are connected in common to the first output terminal 33 of the output circuit C33. Furthermore, the source terminal of the first PMOS transistor P31 is connected to the node B of the first voltage drop power supply circuit C33b and the source terminal of the first NMOS transistor N31 is connected to the node C of the second voltage drop power supply circuit C33c.

Further, the other CMOS pair comprises the second PMOS transistor P32 and the second NMOS transistor N32. In the push-pull unit C33a, the gate terminal of the second P-type MOS transistor P32 and the gate terminal of the second NMOS transistor N32 are connected to the input terminal 35. The drain terminal of the second P-type MOS transistor and the drain terminal of the second NMOS transistor N32 are connected to the input terminal 35. The source terminal of the second P-type MOS transistor P32 is connected to the node B of the first voltage drop power supply circuit C33b and the source terminal of the second NMOS transistor N32 is connected to the node C of the second voltage drop power supply circuit C33c.

When the logical signal S1 in the CMOS level is input to such push-pull unit C33a via the input terminal 35, the ON/OFF states of the PMOS transistors P31 and P32 and the NMOS transistors N31 and N32 are switched.

The operation of the output circuit C33 according to this embodiment composed as described above is described referring to FIG. 1. When the logical signal S1 is output from an internal circuit C24 toward the output circuit C33 according to this embodiment, the logical signal S1 is input to the inside of the output circuit C33 from the input terminal 35.

In the output circuit C33, the logical signal S1 is branched and input to the input terminal of the CMOS inverter circuit C35, the gate terminal of the second PMOS transistor P32, and the gate terminal of the second NMOS transistor N32. When the logical signal S1 is input in this manner, the output signal S2' having an inverted logic of an internal circuit is output from the second PMOS transistor P32 or the second NMOS transistor N32 to the second transmission line T32 connected to the output circuit C33 via the second output terminal 34.

On the one hand, the inverted logical signal S1' in the CMOS level having the inverted logic of the logical signal S1 is output from the CMOS inverter circuit C35 to which the logical signal S1 is input. Such inverted logical signal S1' is branched and input to the gate terminal of the first PMOS transistor P31 and the gate terminal of the first NMOS transistor N31. When the inverted logical signal S1' is input in this manner, the output signal S2 having the same logic as the internal circuit C34 is output from the first PMOS transistor P31 or the first NMOS transistor N31 to the transmission line T31 connected to the output circuit C33 via the first output terminal 33.

The output of such output signals S2 and S2' having a mutually inverted logic are described in detail. First, when the logic level of the logical signal S1 output from the internal circuit C34 is an "H" level, the second PMOS transistor P32 enters the off state and conversely the second NMOS transistor N32 enters the on state. Therefore, the second output terminal 34 connects with the node C of the second voltage drop power supply circuit C33c via the second NMOS transistor N32. As described above, the node C of the second voltage drop power supply circuit C33c is always held in the potential of the reference potential Vref_l on the "L" level side and consequently, the output signal S2' in the "L" level is output from the second output terminal 34 to the rear stage of the output circuit C33.

Further, when the logical level of the logical signal S1 is the "H" level, the inverted logical signal S1' from the CMOS inverter circuit C35 reaches the "L" level, the first PMOS transistor P31 enters the on state and conversely the first NMOS transistor N31 enters the off state. Therefore, the first output terminal 33 connects with the node B of the first voltage drop power supply circuit C33b via the first PMOS transistor P31. As described above, the node B of the first voltage drop power supply circuit C33b is always held at the potential of the reference potential Vref_h on the "H" level side, and consequently, the output signal S2 in the "H" level is output from the first output terminal 33 to the rear stage of the output circuit C33.

On the other hand, when the logical signal from the internal circuit C34 is at the "L" level, the second PMOS transistor P32 enters the on state, and conversely, the second NMOS transistor N32 enters the off state. Therefore, the second output terminal 34 connects with the node B of the first voltage drop power supply circuit C33b via the second PMOS transistor P32. Consequently, the output signal S2' at the "H" level is output from the second output terminal 34 to the rear stage of the output circuit C33.

Furthermore, when the logical level of the logical signal S1 is the "L" level, the inverted logical signal S1' from the CMOS inverter circuit 35 has the "H" level. Therefore, the first PMOS transistor enters the off state and the NMOS transistor N31 enters the on state. Consequently, the first output terminal 33 is connected to the node C of the second voltage drop power supply circuit C33c via the first NMOS transistor N31, and the output signal S2 at the "L" level is output from the first output terminal 33 to the rear stage of the output circuit C33.

In the operation of the output circuit C33 according to this embodiment described above, the "H" level voltages of the output signals S2 and S2' can be adjusted by adjusting the reference potential Vref_h applied to the first voltage drop power supply circuit C33b. Further, the "L" level voltages of the output signals S2 and S2' can be adjusted by adjusting the reference potential Vref_l applied to the second voltage drop power supply circuit C33c.

Hereupon, in the output circuit C33 according to this embodiment and the interface circuit 30 to which the output circuit C33 is applied, the signal voltages of the output signals S2 and S2' are described by specifically quoting examples of numeric values.

In an example of designing the interface circuit 30 described below, the integrated circuit IC31 and the integrated circuit IC32 use a power supply of about 3.3 V as the Vdd and both the transmission line T31 and the second transmission line T32 use a micro strip line of 50Ω characteristic impedance by setting the terminating potential Vt to about 1.5 V. Further, for example, the first PMOS transistor P31 and the second transmission line T32 of the output circuit C33 are designed so as to have the on resistance of about 20Ω and the first NMOS transistor N31 and the second NMOS transistor N32 are designed so as to have the on resistance of about 20Ω. Besides, this design example is a simple illustration, and it goes without saying that the NMOS transistor and the PMOS transistor can be designed by setting their on resistance to other various design values to about 100Ω and about 130Ω, for example.

Further, for example, the reference potential Vref_h is set to about 2.2 V and the reference potential Vref_l is set to about 0.8 V. Furthermore, for example, both the predetermined bias voltage Vg_h of the bias voltage control circuit C36 and the predetermined bias voltage Vg_l of the bias voltage control circuit 37 are set to 1.6 V. When the third PMOS transistor P33 is designed so that the on resistance will be set to about 110Ω when the predetermined bias voltage Vg_h=about 1.6 V is applied to the gate terminal and the third NMOS transistor N33 is designed so that the on resistance will be set to 80Ω when the predetermined bias voltage Vg_h=about 1.6 V is applied to the gate terminal.

Under such conditions, if the output circuit 33 is manufactured as designed and is used at the power supply voltage and ambient temperature as given in its setting conditions, the potential of the drain terminal of the third PMOS transistor P33, i.e, the potential of the node B is set to about 2.2 V. Further, the signal voltages of the output signals S1 and S1' are set to about to 2.0 V at the "H" level and are set to about 1.0 V at the "L" level. However, in actuality, due to the irregularity of process completion and environmental changes such as a fluctuation of the power supply voltage and a change of the ambient temperature, the operating resistance of each transistor of the output circuit C36 cannot be prevented from being dispersed from ei predetermined value.

When the on resistance of the first PMOS transistor P31, the second PMOS, transistor P32 and the third PMOS transistor P33 is dispersed, the "H" level voltages of the output signals S2 and S2' are deviated from the predetermined voltage of 2.0 V and the potential of the drain of the third PMOS transistor P33 is also temporally deviated from the predetermined potential of 2.2 V.

For example, assuming that the on resistance of the first PMOS transistor P31, the second PMOS transistor P32 and the third PMOS transistor P33 becomes smaller than each predetermined value, the "H" level voltages of the output voltages S2 and S2' become higher than 2.0 V and the potential of the drain terminal of the third PMOS transistor P33 temporally becomes higher than 2.2 V.

Because the input voltage of the feedback input terminal 37 of the bias voltage control circuit C36 increases, the output voltage of the output terminal 38 also increases. Consequently, the bias applied to the gate terminal of the third PMOS transistor P33 decreases and the on resistance increases. Finally, the potential of the drain terminal of the PMOS transistor P33 is held to about 2.2 V, which is a predetermined value and the "H" level voltages of the output signals S2 and S2' can approach 2.0 V.

Further, assuming that the on resistance of the first PMOS transistor P31, the second PMOS transistor P32 and the third PMOS transistor P33 becomes higher than each predetermined value. In such case, the "H" level potential of the output signals S2 and S2' becomes lower than 2.0 V and the potential of the drain terminal of the third PMOS transistor P33 temporally becomes lower than 2.2 V.

Therefore, because the input voltage to the feedback input terminal 37 of the bias voltage control circuit C36 decreases, the output voltage from the output terminal 38 also decreases. Consequently, the bias of the gate terminal of the third PMOS transistor increases and the on resistance decreases. Finally, the potential of the drain terminal of the third PMOS transistor P33 is held to about 2.2 V, which is a predetermined value and the "H" level voltages of the output signals S2 and S2' can approach 2.0 V.

Similarly, when the on resistance of the first NMOS transistor N31, the second NMOS transistor N32 and the third NMOS transistor N33 is dispersed, the "L" level voltages of the output signals S2 and S2' are deviated from about 1.0 V, which is a design voltage, and the potential of the drain terminal of the third NMOS N33 is also deviated from about 0.8 V, which is a predetermined value.

For example, assuming that the on resistance of the first NMOS transistor N31, the second NMOS transistor N32 and the third NMOS transistor N33 becomes smaller than each predetermined value, the "L" level voltages of the output signals 32 and S2' become lower than 1.0 V and the potential of the drain terminal of the third NMOS transistor N33 becomes lower than 0.8 V.

Because the input voltage of the feedback input terminal 310 of the bias voltage control circuit C37 increases, the output voltage of the output terminal 311 also decreases. Consequently, the bias voltage of the gate terminal of the third NMOS transistor N33 decreases and the on resistance increases. Finally, the potential of the drain terminal of the third NMOS transistor N33 is held at about 0.8 V of a predetermined value and the "L" level voltages of the output signals S2 and S2' can approach 1.0 V.

Further, assuming that resistance values of the first NMOS transistor N31, the second NMOS transistor N32 and the third NMOS transistor N33 become higher than each predetermined value, the "L" level voltages of the output signals S2 and S2' become higher than 1.0 V and the potential of the drain terminal of the third NMOS transistor N33 temporally becomes higher than 0.8 V.

Therefore, because the input voltage of the feedback input terminal 310 of the bias voltage control circuit C37 increases, the output voltage from the output terminal 311 also increases. Consequently, the bias of the gate terminal of the third NMOS transistor N33 increases and the on resistance decreases. Finally, the potential of the drain terminal of the third NMOS transistor N33 is held constant at about 0.8 V of a design value and the "L" level voltages of the output signals S2 and S2' can approach 1.0 V.

Hereupon, as described previously, because the potential of the drain terminal of the third NMOS transistor N33 is the same when the logical level of the input terminal 35 is the "H" level and the "L" level, the output voltage from the bias voltage control circuit C36 is the same when the logic level of the input terminal 35 is the "H" level and the "L" level, that is to say, the on resistance of the third NMOS transistor N33 is the same.

As described above, in the output circuit according to this embodiment, the signal voltage of an output signal is determined depending on the ratio between the on resistance in which the transistor of the voltage drop power supply circuit is controlled, the on resistance in which the transistor of the push-pull unit is not controlled and the impedance of the terminating resistor of the transmission line, and the potential difference between the power supply potential and the terminating potential. That is to say, even if a transistor is not manufactured fully as designed, the signal voltage of the output signal can be controlled to almost the design value by controlling the on resistance of the transistor of the voltage drop power supply circuit.

Therefore, for example, even if there are an irregularity of the process completion, a fluctuation of the power supply voltage and a change of the ambient temperature, an output signal having the voltage whose fluctuation is small can still be output as designed. Consequently, according to this embodiment, an output circuit which can obtain a fixed allowance for the sensitivity of the input circuit of an applied interface circuit, and which is hard to cause a malfunction by noise can be provided.

Moreover, according to this embodiment, because an output circuit whose output signal voltage is at a value as designed, almost fixed and not fluctuated, the generation of defective products can be reduced in the inspection at shipment of LSIs. Therefore, an output circuit whose yield is high and is economically effective and an LSI to which the circuit applies can be provided.

Further, in the output circuit according to this embodiment, fixed potential is always supplied to the push-pull unit from two voltage drop power supply circuits regardless of the logical level of the transmission signal sent from the internal circuit of an integrated circuit. This result in that when the logic of the transmission signal changes and the output circuit performs switching operation, the output voltage of the two output terminals of the output circuit moves without being overshot. Consequently, according to this embodiment, an output circuit which outputs an output signal with small noise can be provided.

Furthermore, in the voltage drop power supply circuit of the output circuit according to this embodiment, the drain potential of the voltage drop transistor fed back is compared with the reference potential thus controls the supply potential from the voltage drop power supply circuit. Therefore, even if noise gets mixed with an output signal from the outside of an LSI, such noise does not affect the bias voltage control circuit.

To the contrary, a method of feeding back an output signal from an output circuit and controlling the on resistance of a voltage drop transistor is also considered. However, in such method, the noise entering the output signal from the outside of an LSI may be input to a bias voltage control circuit and the accuracy of the on resistance control of the voltage drop transistor may be deteriorated.

Figure 5:
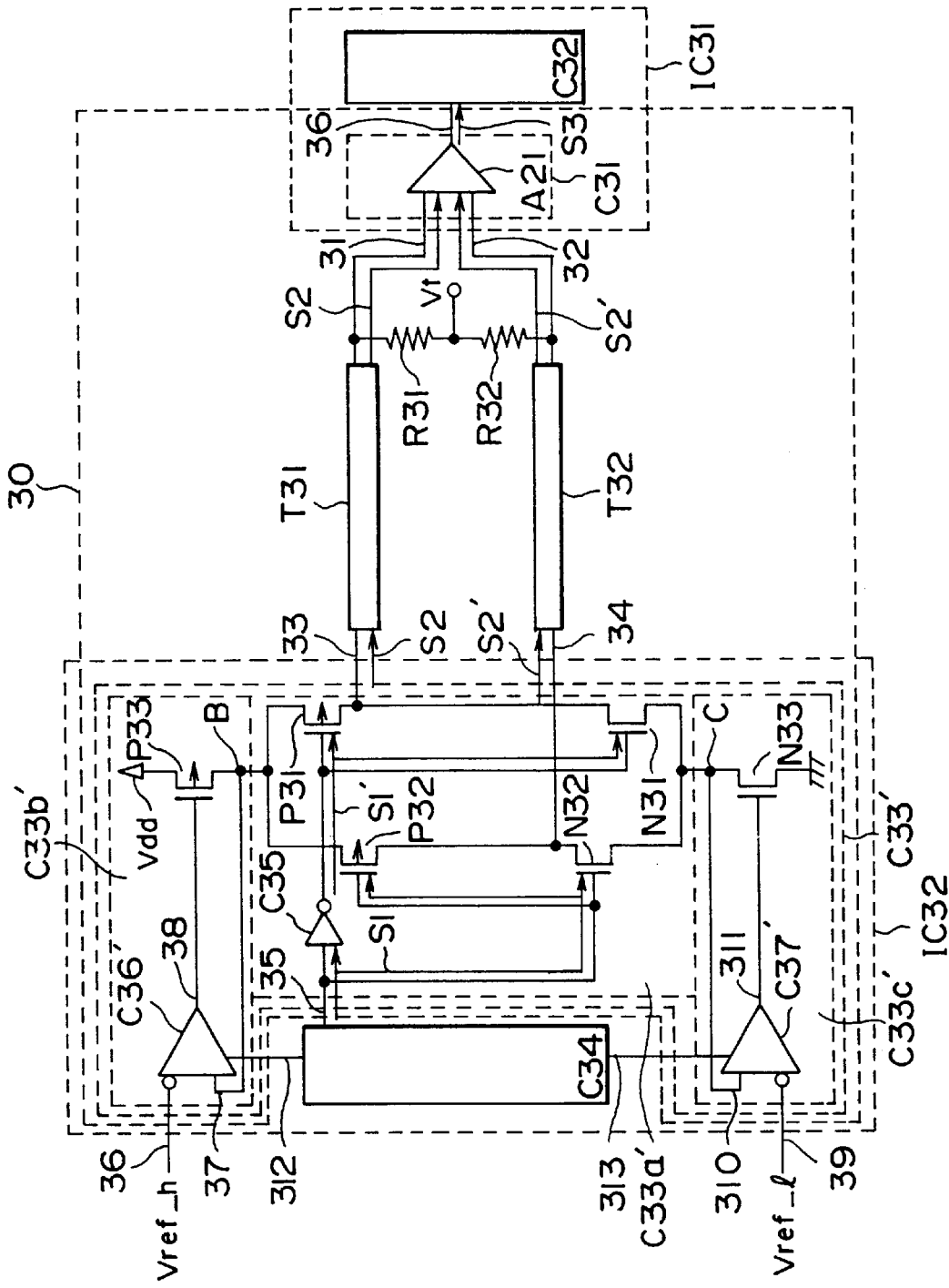
FIG. 5 is a schematic circuit diagram of another output circuit and interface circuit to which the present invention can be applied.
Figure 6:
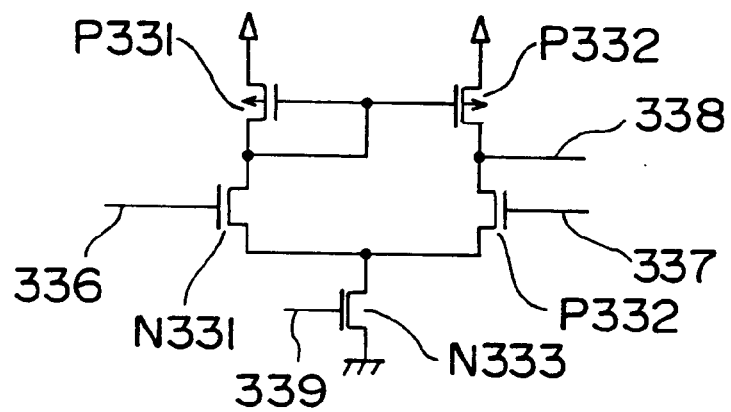
FIG. 6 is a schematic circuit diagram of a control circuit which can be applied to the output circuit shown in FIG. 5.
Figure 7:
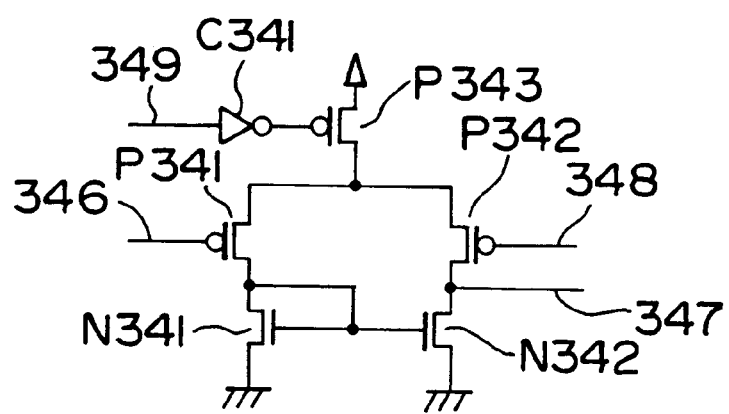
FIG. 7 is a schematic diagram of another control circuit which can be applied to the output circuit shown in FIG. 5.

Next, the second embodiment is described referring to FIGS. 5 to 7. FIG. 5 is a schematic circuit diagram of an output circuit C33' according to this embodiment, FIG. 6 is a schematic circuit diagram of a control circuit C330, which can be applied to the output circuit C33' and FIG. 7 is a schematic circuit diagram of a control circuit C340 which can be applied to the output circuit C33'.

As shown in FIG. 5, the output circuit C33' according to this embodiment has the configuration in which, in the output circuit C33 according to the first embodiment shown in FIG. 1, a bias voltage control circuit C36' is applied instead of the bias voltage control circuit C36 and a bias voltage control circuit C37' is applied instead of the bias voltage control circuit C37.

Hereupon, the bias voltage control circuit C36' provides a power down (hereinafter referred to as "PD") input terminal (hereinafter referred to as "PD input terminal") 312 in the bias voltage control circuit C36. In the output circuit C33' according to this embodiment, the PD input terminal 312 is connected to the internal circuit C34. Due to such configuration, the operating state of the bias voltage control circuit C36' can be controlled in either the normal operating state or the PD state in accordance with the logic of the signal input from the internal circuit C34 to the PD input terminal 312. Beside, the PD state is a state in which the operating current does not flow, that is to say, a state in which no power is consumed. However, in the PD state, the bias voltage control circuit C36' does not perform the intended function.

As such bias voltage control circuit C36', for example, the bias control circuit C330 as shown in FIG. 6 can be applied. The bias voltage control circuit C330 shown in FIG. 6, as compared with the bias voltage control circuit C53 shown in FIG. 3, differs only in that a PD input terminal 339 is connected to the gate electrode of an NMOS transistor N333 and is substantially the same in another circuit configuration. When a logical signal on the "H" level is input to the PD input terminal 339, such bias control circuit C330 is in the normal operating state. Conversely, when a logical signal in the "L" level is input to the PD input terminal 339, the bias control circuit C330 has the PD state.

Further, the bias voltage control circuit C37' provides a PD input terminal 313 in the bias voltage control circuit C37 as shown in FIG. 1. In the output circuit C33' according to this embodiment, the PD input terminal 313 is connected to the internal circuit C34. Due to such configuration, the bias voltage control circuit C37' can be controlled in either the normal operating state or the PD state in accordance with the logic of the signal input from the internal circuit C34 to the PD input terminal 313.

As such bias voltage control circuit C37', for example, the bias control circuit C340 shown in FIG. 7 can be applied. The bias voltage control circuit C340 shown in FIG. 6, as compared with the bias voltage control circuit C63 shown in FIG. 4, differs only in that a PD input terminal 349 is connected to the input terminal of an inverter circuit C341 and the output terminal of an inverter C341 is connected to the gate electrode of a PMOS transistor P343 and is the same in another configuration. When a logical signal at the "H" level is input to the PD input terminal 349, the bias control circuit C340 has the normal operating state. When a logical signal at the "L" level is input to the PD input terminal 349, the bias control circuit C340 is in the PD state.

In this embodiment described above, because the DC (direct current) between the bias voltage control circuit C36' and the bias voltage control circuit C37' cannot be prevented from flowing only by providing a simple logical circuit and a PD input terminal, waste power consumption can be cut off. To the contrary, in the first embodiment shown in FIG. 1, even when the output circuit C33 does not operate, because a DC flows into the bias voltage control circuit C36 and the bias voltage control circuit C37, waste of power occurs. Besides, the first to fourth effects obtained according the first embodiment can also be obtained in this embodiment.

Figure 8:
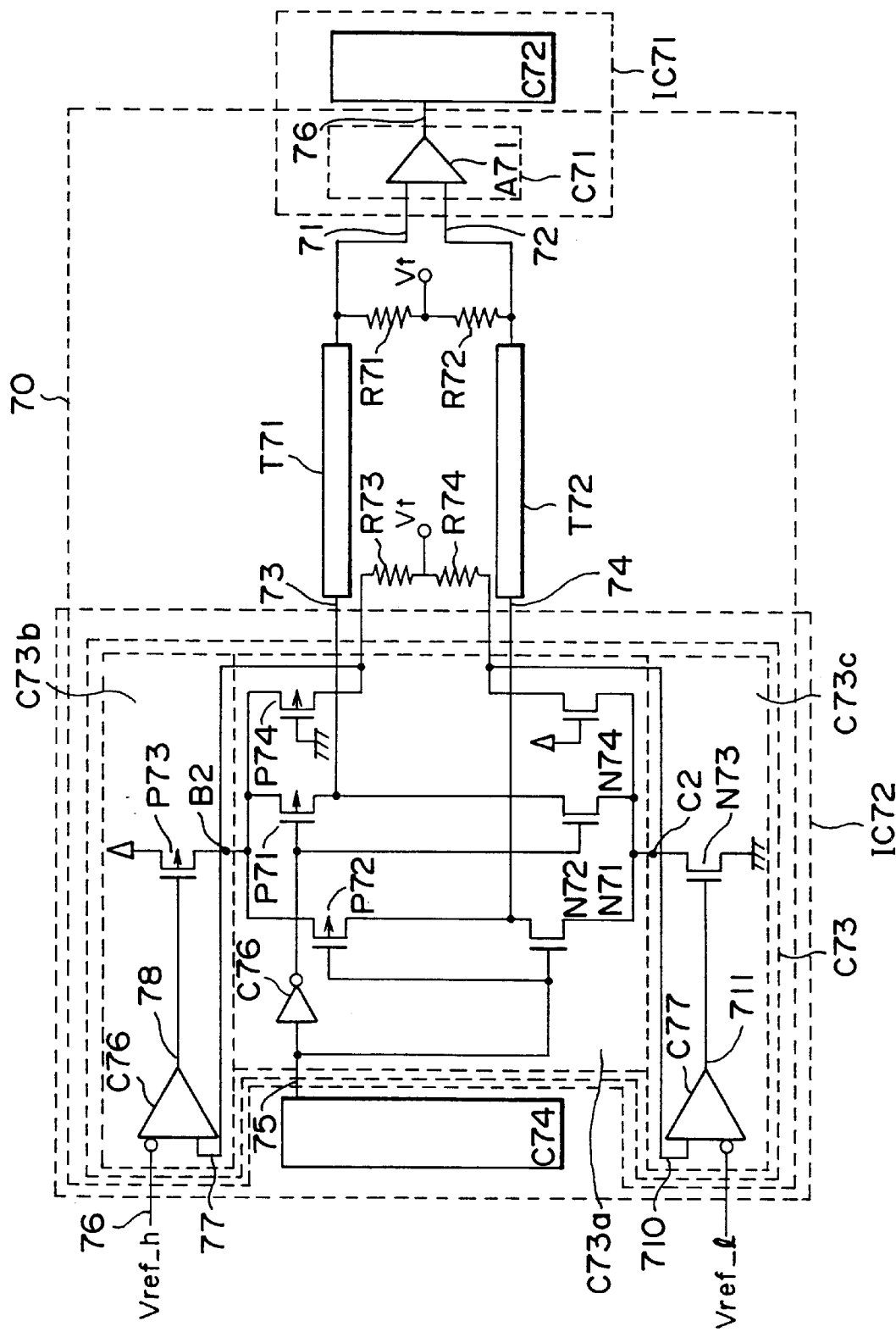
FIG. 8 is a schematic circuit diagram of another output circuit and interface circuit to which the present invention can be applied.

Next, the third embodiment is described referring to FIG. 8. FIG. 8 is a schematic diagram of an output circuit C73 according to this embodiment and an interface circuit 70 to which the output circuit C73 is applied. As shown in FIG. 8, the output circuit C73 according to this embodiment differs from the output circuit C33 according to the embodiment shown in FIG. 1 in that it is provided with a PMOS transistor P74, terminating resistors R73 and R74 and an NMOS transistor N74. which comprise a circuit that corresponds to a feedback voltage formation means.

In the output circuit C73 according to this embodiment, the source terminal of the PMOS transistor P74 is connected to the drain terminal of the third PMOS transistor P73 via the node B2 of a first voltage drop power supply circuit C73b. Further, the drain terminal of the PMOS transistor P74 terminates with the terminating potential Vt via the terminating resistor R73. Furthermore, a voltage of about 0 V is applied to the gate terminal of the PMOS transistor P74 and therefore, the PMOS transistor P74 is always in the on state.

Moreover, the source terminal of the NMOS transistor N74 is connected to the drain terminal of the third NMOS transistor N73 via a node C2 of a second voltage drop power supply circuit C73c. Further, the drain terminal of the NMOS transistor N74 is terminated with the terminating potential Vt via the terminating resistor R74. Furthermore, the power supply voltage Vdd is applied to the gate terminal of the NMOS transistor N74, and therefore, the NMOS transistor N74 is always in the on state in the same manner as the PMOS transistor P74.

In the first voltage drop power supply circuit C73b of such output circuit C73, an input terminal 77 of a bias voltage control circuit C76 is connected to the drain terminal of the PMOS transistor P74. Further, in the second voltage drop power supply circuit C73c, an input terminal 710 of a bias voltage control circuit C77 is connected to the drain terminal of the NMOS transistor N74.

In the output circuit C73 according to this embodiment, another circuit configuration is almost the same as the output circuit C33 according to the first embodiment shown in FIG. 1. Therefore, the bias voltage control circuit C76 can use a circuit having almost the same configuration as the bias voltage control circuit C36 shown in FIG. 1 and the bias voltage control circuit C77 can use a circuit having almost the same configuration as the bias voltage control circuit C37 shown in FIG. 1. Further, an input circuit C71 can use a circuit having the same configuration as input circuit C31.

In the output circuit C73, the PMOS transistor P74 is designed in the same structure as PMOS transistors P71 and P72, and each on resistance is designed so as to become equal.

Furthermore, the resistance of the terminating resistors R73 and R74 is almost the same as the resistance of terminating registers R71 and R72. Therefore, the potential of the drain terminal of the PMOS transistor P74 is almost equal to the output voltages at the 'H' level of output terminals 73 and 74. Further, the potential of the NMOS transistor N74 is almost equal to the output voltages at the "L" level of the output terminals 73 and 74.

The 'H' level of the output of the output circuit C73 is determined depending on the on resistance of a PMOS transistor P73, the on resistance of the PMOS transistor P71 (or PMOS transistor P72), the on resistance of the PMOS transistor P74, the terminating resistor R71 (or R72) and the resistance of the terminating resistor R73. Further, the 'L' level of the output voltage is determined depending on the on resistance of an NMOS transistor N73, the on-resistance of an NMOS transistor N72 (or NMOS transistor N71), the on resistance of the NMOS transistor N74 and the resistance of the terminating resistor R72 (or terminating resistor R71) and the terminating resistor R74.

For example, if designing is done at the power supply voltage Vdd=3.3 V, terminating potential Vt=1.5 V, resistance of the terminating resistors R71, R72, R73, and R74=50Ω, on resistance of the PMOS transistors P71, P72, and P74=20Ω, on resistance of the PMOS transistor P73=55Ω, on resistance of the NMOS transistors N71, N72 and N74=20Ω and on resistance of the NMOS transistor N73=40Ω, the 'H' level=2.0 V and the 'L' level=1.0 V of the output voltage are reached, and the output voltage becomes the same as the output voltage illustrated in the first embodiment.

The reference potential Vref_h is set to the potential (2.0 V for this example) which is equal to the 'H' level of the predetermined output voltage. Further, the reference potential Vref_I is set to the potential (1.0 V for this example) which is equal to the 'L' level of the predetermined output voltage. The bias voltage control circuit C76 compares the potential of the drain terminal of the PMOS transistor P74 and the reference potential Vref_h and controls the on resistance of the third PMOS transistor P73. Further, the bias voltage control circuit C77 compares the potential of the drain (terminal) of the NMOS transistor N74 and the reference potential Vref_I, and controls the on resistance of the NMOS transistor N73.

In the output circuit C73 according to this embodiment described above, another circuit operation is almost the same as that of the output circuit C33 according to the first embodiment shown in FIG. 1.

First, an issue to be solved in this embodiment is described. In the output circuit C33 according to the first embodiment shown in FIG. 1, it is left as the issue that although the potential of the drain terminal of a third PMOS transistor P33 and the potential of the drain terminal of a third NMOS transistor N33 can be suppressed to a fixed potential, the fluctuation of the on resistance between the first PMOS transistor P31 and the second PMOS transistor P32, and between the first NMOS transistor N31 and the second NMOS transistor N32, cannot be controlled. Therefore, although the output voltage of the output circuit C33 can approach a predetermined output voltage to some extent, it cannot be controlled fully.

For example, when the on resistance of the first PMOS transistor P31 (or the second NMOS transistor P32) is lower than the predetermined on resistance (for example, 20Ω), the potential of the drain (terminal) of the third PMOS transistor P33 can be controlled to a fixed potential by the operation of the bias control circuit C36. However, because the output voltages S1 and S1' are determined depending on the on resistance of the first PMOS transistor P31 (or second PMOS transistor P32) and the voltage division of the first terminating resistor R31 (or second terminating resistor R32), the "H" level of the output voltage reaches a higher potential than a predetermined output voltage.

Conversely, when the on resistance of the first PMOS transistor P31 (or the second NMOS transistor P32) is higher than the predetermined on resistance (for example, 20Ω), the potential of the drain (terminal) of the third PMOS transistor P33 can be controlled to a fixed potential by the operation of the bias control circuit C36. However, because the output voltage is determined depending on the on resistance of the first PMOS transistor P31 (or second PMOS transistor P32) and the voltage division of the first terminating resistor R31 (or second terminating resistor R32), the "H" level of the output voltage reaches a lower potential than a predetermined output voltage.

On the one hand, in the output circuit C73 according to this embodiment, the bias voltage control circuit C76 compares the potential of the drain terminal of the PMOS transistor P74 and the reference potential Vref_h and controls the on resistance of the third PMOS transistor P73. Further, the bias voltage control circuit C77 compares the potential of the drain terminal of the NMOS transistor N74 and the reference potential Vref_I, and controls the on resistance of the third NMOS transistor N73.

Hereupon, the potential of the drain terminal of the PMOS transistor P74 is designed so as to be equal to the output voltages at the "H" level of the output terminals 73 and 74, and the potential of the drain terminal of the NMOS transistor N74 is designed so as to be equal to the output voltages at the "L" level of the output terminals 73 and 74. Further, because the PMOS transistors P71, P72 and P74 are manufactured so as to have the same structure and the NMOS transistors N71, N72 and N74 are manufactured so as to have the same structure, the irregularity of each on resistance can also be made almost equal.

That is to say, by comparing the potential of the drain terminal of the PMOS transistor P74 with the reference potential Vref_h, the "H" level of the output voltage can be controlled so as to almost equal to the reference potential Vref_h. Further, by comparing the potential of the drain (terminal) of the NMOS transistor N74 with the reference potential Vref_I, the "L" level of the output voltage can be controlled so as to be almost equal to the reference potential Vref_I.

Finally, according to this embodiment, as compared with the first embodiment, a fixed output voltage can be output with better accuracy, which can yield to the improvement of the yield of an integrated circuit and the reduction of its initial cost. Besides, the third and fourth effects obtained according the first embodiment can also be obtained as they are in this embodiment.

Figure 9:
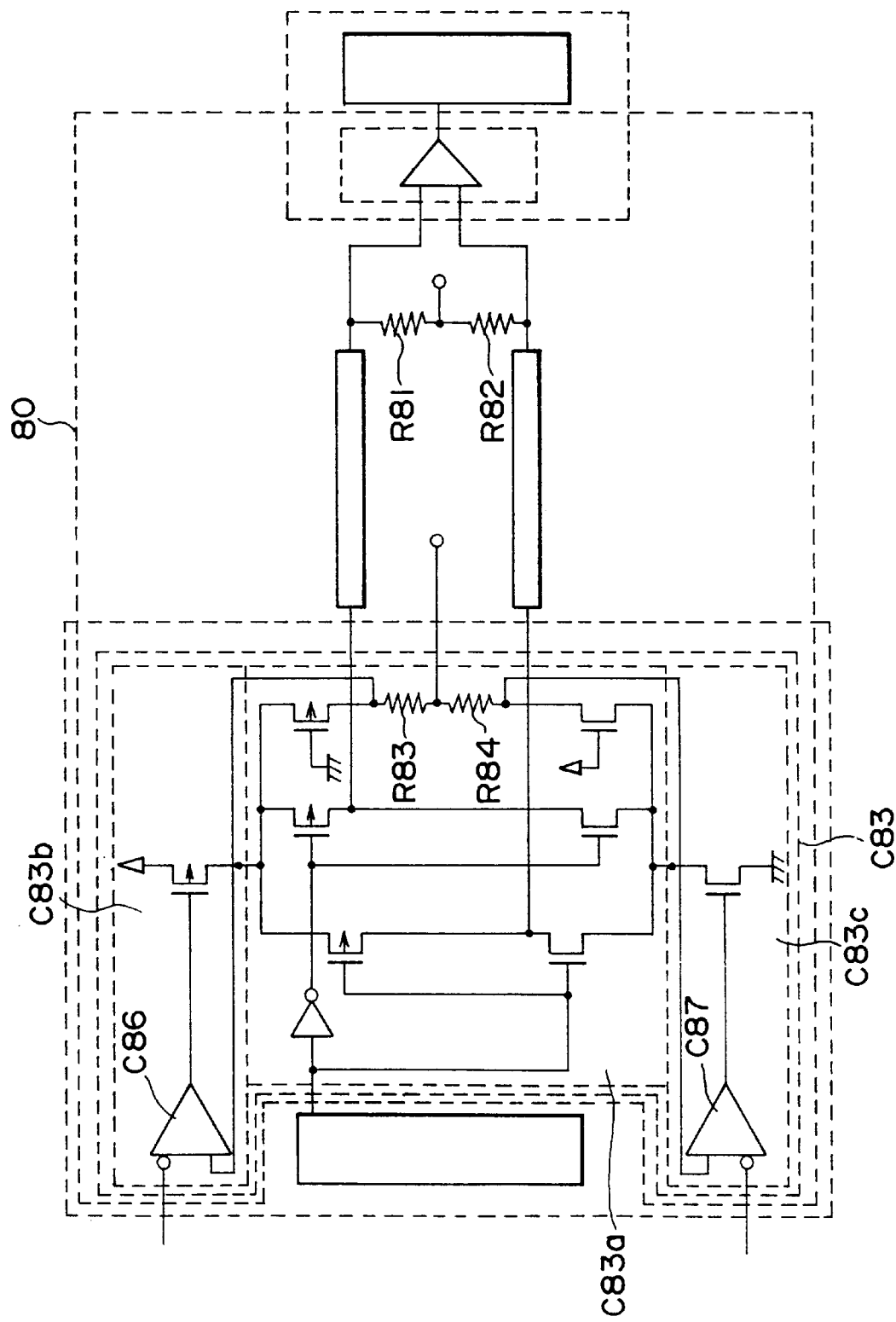
FIG. 9 is a schematic circuit diagram of another output circuit and interface circuit to which the present invention can be applied.

Next, the fourth embodiment is described referring to FIG. 9. FIG. 9 is a schematic circuit diagram of an output circuit C83 according to this embodiment and an interface circuit 80 to which the output circuit C83 applies.

In the output circuit C73 according to the third embodiment shown in FIG. 8, the terminating resistors R73 and R74 are installed outside an LSI, while as shown in FIG. 9, in the output circuit C83 according to this embodiment, terminating terminals R83 and R84 are built in the LSI. In the output circuit C83, the terminating resistors R83 and R84 are designed so as to have the same resistance as a first terminating resistor R81 and a second terminating resistor R82. The terminating resistors R83 and R84, for example, can be formed on an LSI board using diffused resistors.

Another circuit configuration of the output circuit C83 is almost the same as that of the first to fourth embodiments, and a bias voltage control circuit C86 shown in FIG. 1 can use a circuit having the same configuration as the bias voltage control circuit C36. Further, a bias voltage control circuit C87 can use a circuit having the same configuration as the bias voltage control circuit C37 shown in FIG. 1. Further, an input circuit C81 can use a circuit having the same configuration as the input circuit C31 shown in FIG. 1.

Because the output circuit C83 according to this embodiment builds in the terminating resistors R83 and R84 in an LSI, no terminating resistor need be installed on a PC board. Therefore, as compared with the third embodiment, the output circuit has effects of reducing an installation area (reducing the PC board), simplifying the wiring design of the PC board and reducing initial cost (eliminating the need for the cost of a resistor and reducing the manufacturing cost of the PC board). Further, the effects obtained in the second embodiment can also be obtained in this embodiment as they are.

Figure 10:
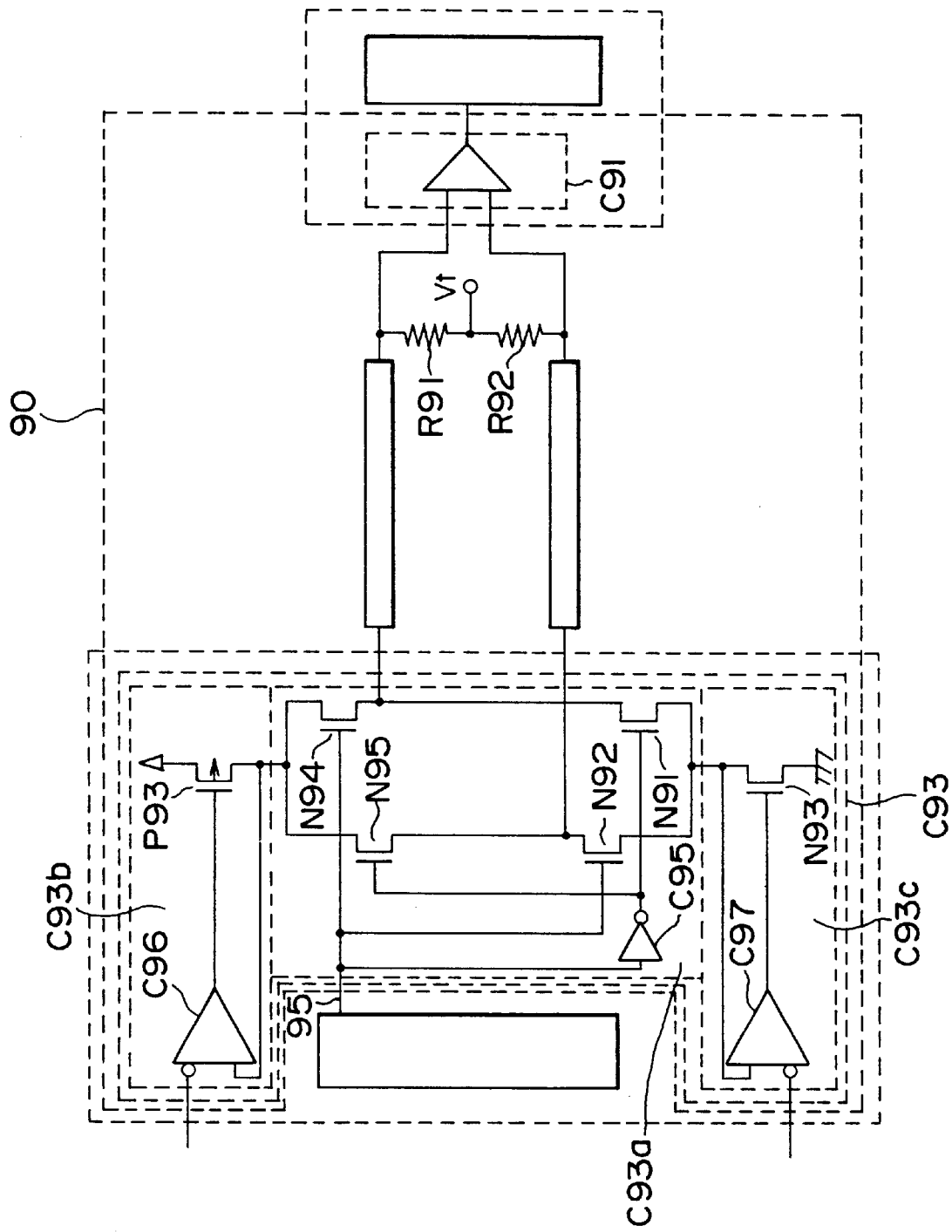
FIG. 10 is a schematic circuit diagram of another output circuit and interface circuit to which the present invention can be applied.

Next, the fifth embodiment is described referring to FIG. 10. FIG. 10 is a schematic circuit diagram of an output circuit C93 according to this embodiment and an interface circuit 90 to which the output circuit C93 applies.

The output circuit C93, in the output circuit C33 according to the embodiment shown in FIG. 1, has almost the same configuration in which an NMOS transistor N94 is used instead of the first PMOS transistor P31 and an NMOS N95 is used instead of the second PMOS transistor P32. The on resistance of the NMOS transistors N94 and N95 is equal to the on resistance of the first PMOS transistors P31 and the second PMOS transistor P32.

Further, because the output circuit C93 according to this embodiment substantially replaces a PMOS transistor with an NMOS transistor, in consideration of the desired output logic, an input terminal 95 is connected to the input terminal of a CMOS inverter C95, the gate terminal of the NMOS transistor N94 and the gate terminal of an NMOS transistor N92. Further, the output terminal of the CMOS inverter C95 is connected to the gate terminals of an NMOS N91 and the NMOS N95.

Because another circuit configuration and circuit operation of the output circuit C93 is almost the same as those of the output circuit C33 according to the embodiment shown in FIG. 1, a detailed description is omitted. Besides, a bias voltage control circuit C96 can use a circuit having the same configuration as the bias voltage control circuit C36 shown in FIG. 1, and a bias voltage control circuit C97 can use a circuit having the same configuration as that of the bias voltage control circuit C37 shown in FIG. 1. Further, an input circuit C91 can use a circuit having the same configuration as that of the input circuit C31 shown in FIG. 1.

Because the output circuit according to this embodiment described above uses an NMOS transistor instead of a PMOS transistor, the size of the transistor can be reduced (in general, because an NMOS transistor is larger in mobility and lower in a threshold than a PMOS transistor, the NMOS transistor can reduce the gate width when an attempt is made to obtain the same on resistance). Therefore, according to this embodiment, an output circuit which is effective for high integration of ICs can be provided. Besides, the effects obtained according to the first embodiment can also be obtained in this embodiment as they are.

Figure 11:
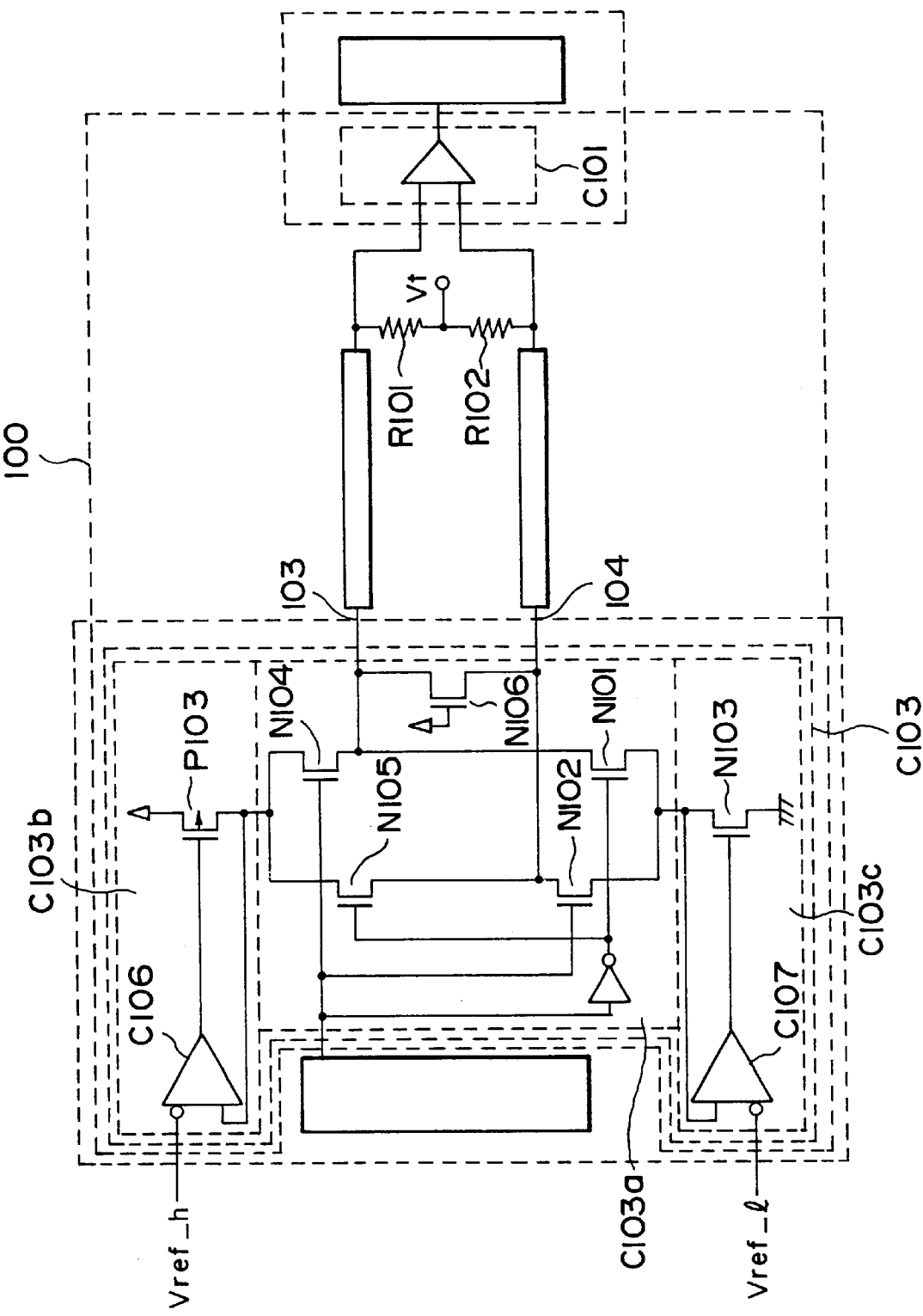
FIG. 11 is a schematic circuit diagram of another output circuit and interface circuit to which the present invention can be applied.

Next, the sixth embodiment is described referring to FIG. 11. FIG. 11 is a schematic diagram of an output circuit C103 according to this embodiment. The difference between the output circuit C103 according to this embodiment shown in FIG. 11 and the output circuit C93 according to the embodiment shown in FIG. 10 is that the output circuit C103 is provided with an NMOS transistor N106. The source terminal and drain terminal of the NMOS transistor N106 according to the characteristics of this embodiment are connected to a first output terminal 103 and a second output terminal 104 of the output circuit C103.

Besides, on the side of the first output terminal 103 and on the side of the second output terminal 104, either can be a source terminal or a drain terminal. In the output circuit C103, the power supply voltage Vdd is applied to the gate of the NMOS transistor N106 and the NMOS N106 is always in the on state. Further, when the output circuit C103 is manufactured, the NMOS transistor N106 in arranged in the vicinity of NMOS transistors N101, N102, N103, N104 and N105 so that each process is completed to the same degree.

Because another circuit configuration of the output circuit C103 is almost the same as the output circuit C93 according to the fifth embodiment shown in FIG. 10, its detailed description is omitted. Besides, the bias voltage control circuit C106 can use a circuit having the same configuration as that of the bias voltage control circuit C96 shown in FIG. 10. Further, a bias voltage control circuit C107 can use a circuit having the same configuration as that of the bias voltage control circuit C97 shown in FIG. 10. Further, an input circuit C101 can use a circuit having the same configuration as that of the input circuit shown in FIG. 10.

In the output circuit C103 composed as described above, because the NMOS transistor N106 is connected between the first output terminal 103 and the second output terminal 104, the "H" level and the "L" level of the output voltage are determined depending on the value of the on (dynamic) resistance of a third PMOS transistor P103 of a first voltage drop power supply circuit C103b, the on resistance of the NMOS transistor N104 (or NMOS transistor N105), the on resistance of the NMOS N106 according to this embodiment, the on resistance of a first terminating resistor R101, a second terminating resistor R102 and the NMOS transistor N102 (or NMOS transistor N101) and the on resistance of the third NMOS transistor N103 of the second voltage drop power supply circuit N103c).

For example, if designing is done at the power supply voltage Vdd=3.3 V, terminating potential Vt=1.5 V, the resistances of the terminating resistors R101 and R102= 50Ω, the on resistance of the NMOS transistors N104 and N105=10Ω, the on resistance of the third PMOS transistor P103=55Ω, the on resistance of the NMOS transistor N106= 100Ω, the on resistances of the NMOS transistors N101 and N102=10Ω and the on resistance of the third NMOS transistor N103=40Ω, the "H" level of the output voltage of about 2.0 V and "L" level of about 1.0 V are reached, and an output voltage that is the same as that of the fifth embodiment shown in FIG. 10 can be obtained.

Further, the reference potential Vref_h is set to the potential (for example, about 2.2 V) which is equal to the predetermined potential of the drain terminal of the third PMOS transistor P103. Furthermore, the reference potential Vref_I is set to the potential (for example, about 0.8 V) which is equal to the predetermined potential of the drain terminal of the third NMOS transistor N103. Because other circuit operations are almost the same as that of the output circuit C93 according to the fifth embodiment shown in FIG. 10, their detailed description is omitted.

The problem according to the fifth embodiment which this embodiment described above is trying to solve is described. The problem, in the output circuit C93 shown in FIG. 10, is that although the potential of the drain terminal of the third PMOS transistor P93 and the potential of the drain terminal of the third NMOS transistor N93 can be suppressed to a fixed potential, the fluctuation of the on resistances of the NMOS transistors N94, N95, N91 and N92 cannot be controlled. Therefore, although the output voltage of the output circuit C93 can approach the predetermined output voltage to some extent, it cannot be controlled fully.

As shown in FIG. 11, in the output circuit C103 according to this embodiment, the NMOS transistor N106 has the effect of suppressing the fluctuation of the output voltage of the output circuit C103 and outputting a fixed output voltage with better accuracy.

In the output circuit C103, when the on resistance of the NMOS transistors N101 and N102 are smaller than the predetermined on resistance (for example, about 10Ω) and the on resistance of the NMOS transistors N104 and N105 is smaller than the predetermined on resistance (for example, about 10Ω), the on resistance of the NMOS transistor N106 is also smaller than the predetermined on resistance (for example, about 100Ω). Therefore, because the on resistance (called Rn106) of the NMOS transistor N106 and the combined resistance of the first terminating resistor R101 and the second terminating resistor R102={Rn106×(R101+ R102)}/(Rn106+R101+R102) also become smaller than the predetermined resistance, the fluctuation of the output voltage can be reduced as compared with the case where the NMOS transistor N106 is not provided.

Next, in the output circuit C103, when the on resistance of the NMOS transistors N101 and N102 are larger than the predetermined on resistance (for example, about 10Ω) and the on resistance of the NMOS transistors N104 and N105 are larger than the predetermined on resistance (for example, about 10Ω), the on resistance of the NMOS transistor N106 also becomes larger than the predetermined on resistance (for example, 100Ω). Therefore, because the on resistance (called Rn106) of the NMOS transistor N106 and the combined resistance of the first terminating resistor R101 and the second terminating resistor R102={Rn106×(R101+ R102)}/(Rn106+R101+R102) also becomes larger than the predetermined resistance, the fluctuation of the output voltage can be reduced as compared with the case where the NMOS transistor N106 is not provided.

From what is described above, according to this embodiment, it is made clear that a fixed output voltage can be output with better accuracy by providing the NMOS transistor N106 as well as obtaining the same effect as the first effect given in the description of the fifth embodiment. Besides, the third and fourth effects given in the description of the first embodiment are also obtained in this embodiment as they are.

Figure 12:
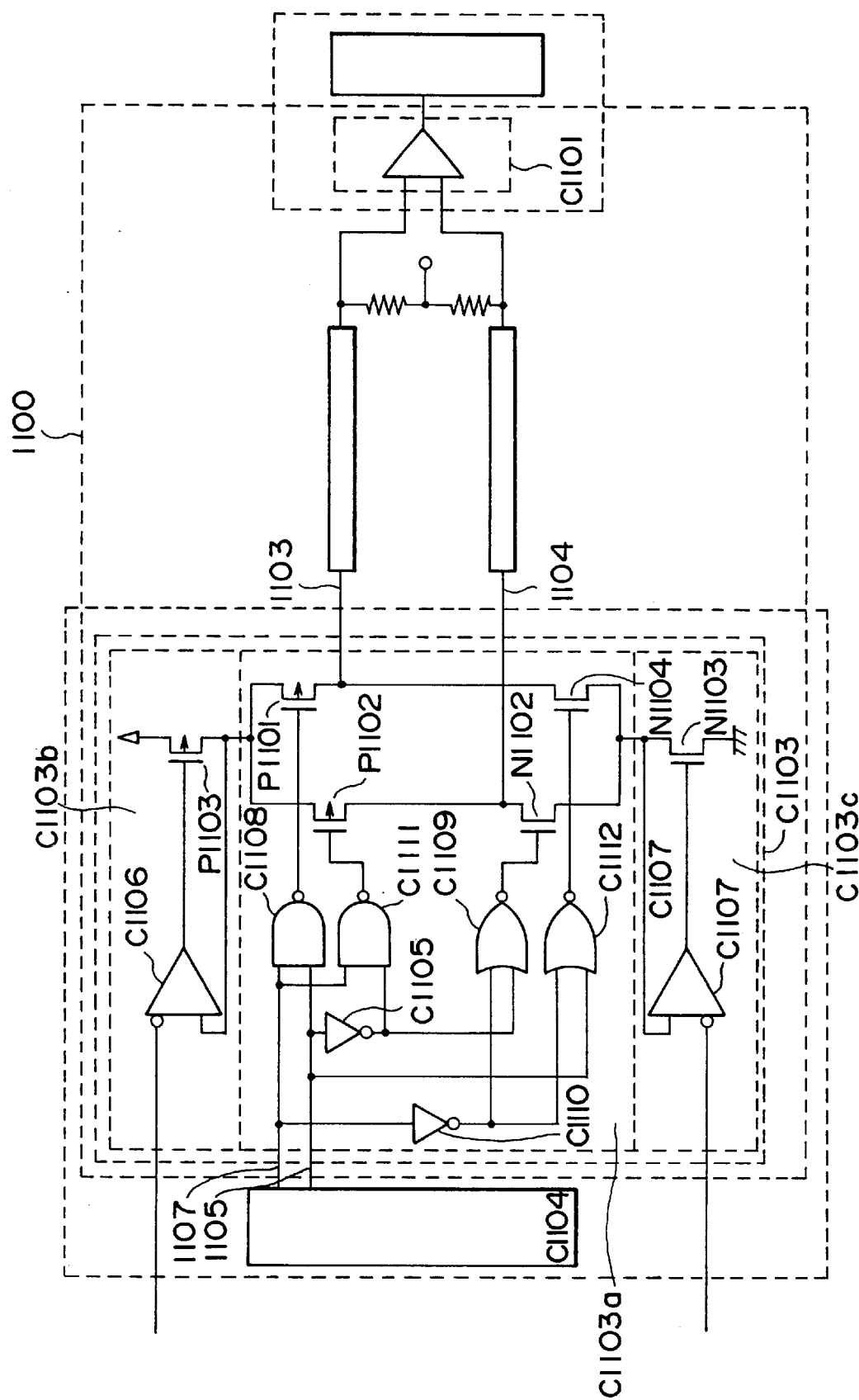
FIG. 12 is a schematic circuit diagram of another output circuit and interface circuit to which the present invention can be applied.

Next, the seventh embodiment is described referring to FIG. 12. FIG. 12 is a schematic diagram of an output circuit C1103 according to this embodiment and an interface circuit 1100 to which the output circuit C1103 is applied. As shown in FIG. 12, the output circuit C1103 according to this embodiment differs most greatly from the output circuit C33 according to the first embodiment shown in FIG. 1 in that the output circuit C1103 has a 3-state control signal input terminal (referred to as "3-state input terminal") 1107 in addition to an input terminal 1105.

Further, the output circuit C1103 according to this embodiment differs from the output circuit C33 shown in FIG. 1 in that the former is provided with a first NAND circuit C1108, a second NAND circuit C1111, a first NOR circuit C1109, a second NOR circuit C1112, a first inverter circuit C1105 and a second inverter circuit C1110. In the output circuit C1103 according to this embodiment, when a logical signal in the "L" level is input from the 3-state terminal 1107 by the functions of these logic elements, output terminals 1103 and 1104 can enter the high impedance state.

In the output circuit C1103, the input terminal of the first inverter circuit C1105 is connected to the input terminal 1105 and the input terminal of the second inverter circuit C1110 is connected to the 3-state input terminal 1107.

Further, in the first NAND circuit C1108, one input terminal is connected to the input terminal 1105 and the other input terminal is connected to the 3-state input terminal 1107. Furthermore, the output terminal of such first NAND circuit C1108 is connected to the gate terminal of a first PMOS transistor P1101.

Moreover, in the second NAND circuit C111, one input terminal is connected to the 3-state input terminal 1107 and the other input terminal is connected to the output terminal of the first inverter circuit C1105. Further, the output terminal of such second NAND circuit C1111 is connected to the gate terminal of a second PMOS transistor P1102.

Furthermore, in the first NOR circuit C1109, one input terminal is connected to the output terminal of the first inverter circuit C1105 and the other input terminal is connected to the output of the second inverter circuit C1110. The output terminal of such first NOR circuit C1109 is connected to the gate terminal of a second NMOS transistor N1102.

Moreover, in the second NOR circuit C1112, one input terminal is connected to the output terminal of the second inverter circuit C1110, and the other input terminal is connected to the output of the input terminal 1105. The output terminal of such second NOR circuit C1112 is connected to the gate terminal of a first NMOS transistor N1101.

In the output circuit C1103 according to this embodiment, the remainder of the other circuit configuration is almost the same as the output circuit C33 according to the first embodiment shown in FIG. 1. Therefore, in the output circuit C1103, a bias voltage control circuit C1106 can use a circuit having the same configuration as the bias voltage control circuit C36 shown in FIG. 1, and a bias voltage control circuit C1107 can use a circuit having the same configuration as that of the bias voltage control circuit C37 shown in FIG. 1. Further, an input circuit C1101 can use a circuit having the same configuration as that of the input circuit C31 shown in FIG. 1. Furthermore, a circuit configuration for controlling three states also enables the circuit configuration other than the output circuit C1103.

In the output circuit C1103 composed as described above, when an "H" level signal at the CMOS logical level is input to the 3-state input terminal 1107, the "H" level voltage and the "L" level voltage are output from the output terminal 1103 and the output terminal 1104 based on the logic of the input signal of the input signal terminal 1105.

When an "L" level signal in the CMOS logic level is input to the 3-state input terminal, regardless of the logic of the input signal of the input signal terminal 1105, the PMOS transistors P1101 and P1102 and the NMOS transistors N1101 and N1102 enter the off state and both the output terminals 1103 and 1104 enter the high impedance state. At this time, no output current flows into an output circuit.

The issue pertaining to the first embodiment, which the embodiment described above tries to solve, is described. In the first embodiment, the end of a transmission line connected to an integrated circuit on the receiving side terminates with terminating potential via a terminating resistor. In a small amplitude interface circuit, because the terminating potential is at a lower potential than the power supply voltage of the output circuit, a DC (direct current) flows from the output terminal of the output circuit to the terminating potential. Because such DC flows when the output circuit is not operated, wasted power consumption will occur. Moreover, the power consumed by such DC occupies a large percentage for the power consumption of the entire output circuit.

In the output circuit according to this embodiment, only by providing a simple logical circuit and a 3-state input terminal, the output terminal is fixed to the high impedance state and the DC can be prevented from flowing when the output circuit is not operated. This can cut off wasted power consumption when no signal transmission is performed.

Besides, the effects obtained in the first embodiment can also be obtained in this embodiment as they are.

Figure 13:
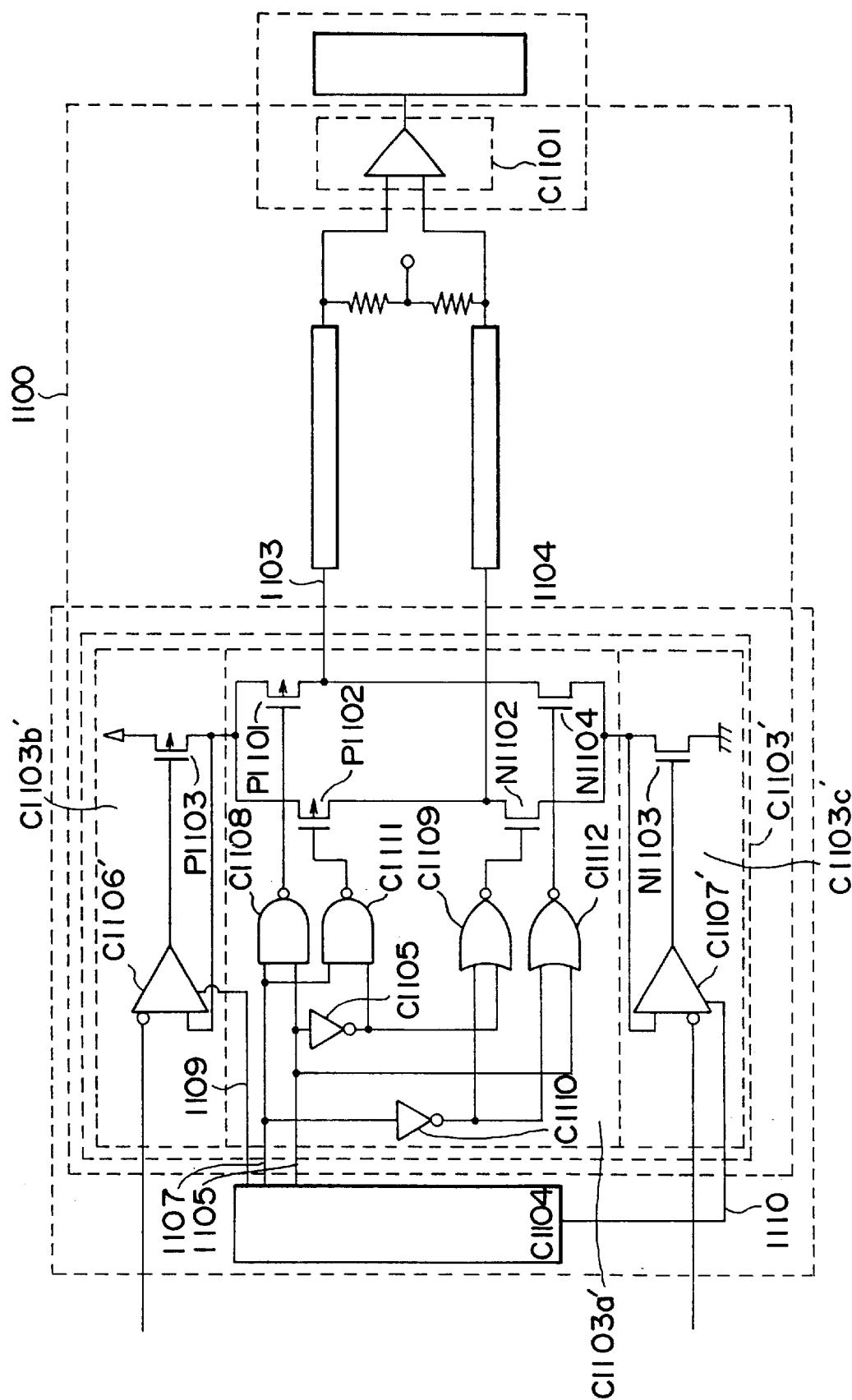
FIG. 13 is a schematic circuit diagram of another output circuit and interface circuit to which the present invention can be applied.
Figure 14:
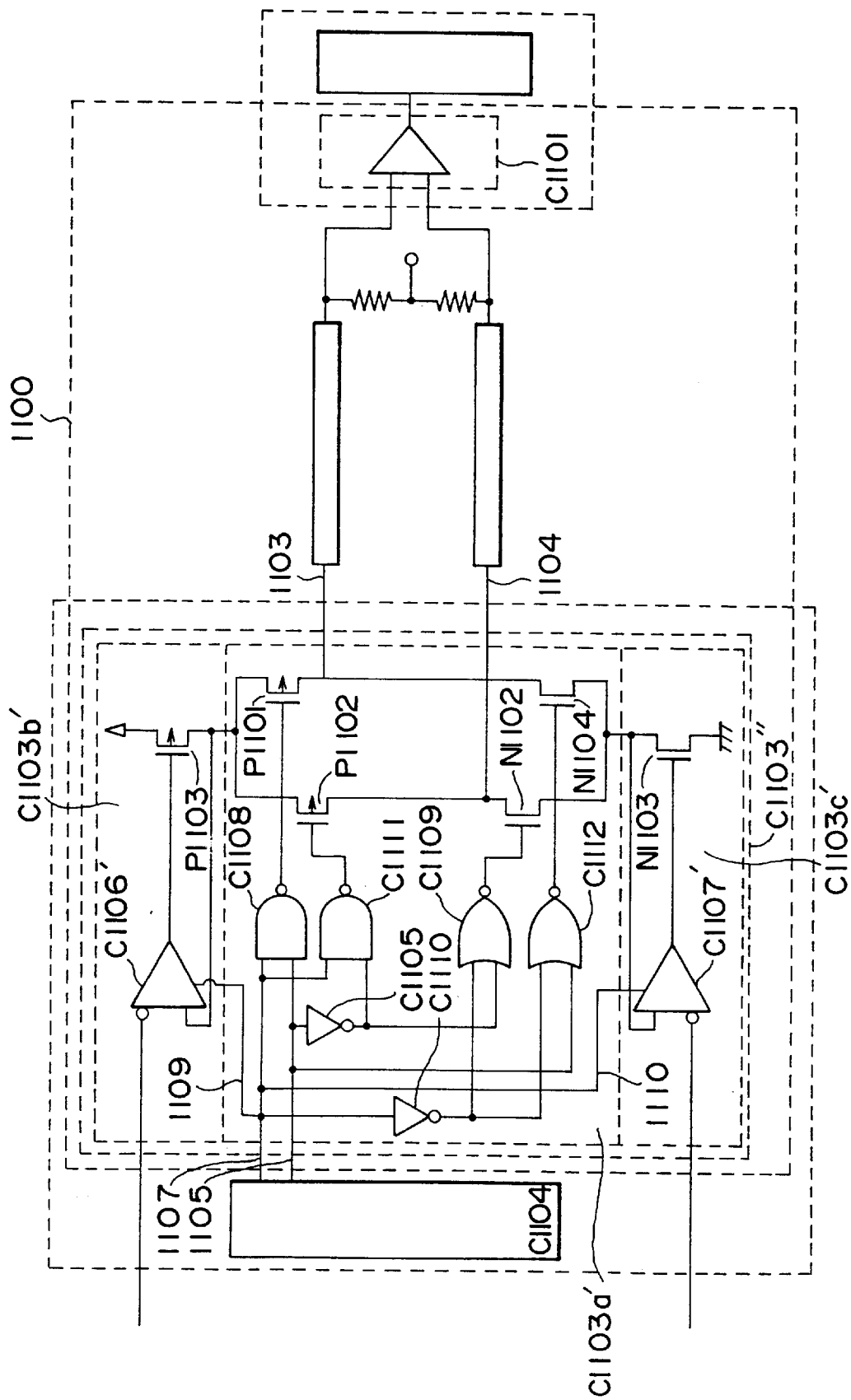
FIG. 14 is a schematic circuit diagram of another output circuit and interface circuit to which the present invention can be applied.

Next, the eighth embodiment is described referring to FIGS. 13 and 14. FIG. 13 is a schematic circuit diagram of one output circuit C1103' according to this embodiment and FIG. 14 is a schematic diagram of another output circuit C1103" according to this embodiment.

As shown in FIG. 13, the output circuit C1103', as compared with the output circuit C1103 according to the seventh embodiment shown in FIG. 12, differs in that a bias voltage control circuit C1106' applies instead of the bias voltage control circuit C1106, and a bias voltage control circuit C1107' applies instead of the bias voltage control circuit C1107 and is substantially the same in the remainder of the configuration.

The bias voltage control circuit C1106' applied to the output circuit C1103' substantially has the configuration in which a PD input terminal 1109 of the bias voltage control circuit C1106' is connected to an internal circuit C1104 of the integrated circuit IC32. As such, bias voltage control circuit C1106', for example, the bias voltage control circuit C330 shown in FIG. 6, can apply.

Further, the bias voltage control circuit C1107' substantially has the configuration in which a PD input terminal 1110 is provided in the bias voltage control circuit C1107 shown in FIG. 12. In the output circuit C1103' according to this embodiment, the PD input terminal 1110 of the bias voltage control circuit C1107' is connected to the internal circuit C1104 of the integrated circuit IC32. As such, bias voltage control circuit C1107', for example, the bias voltage control circuit C340 shown in FIG. 7, can apply.

In the output circuit C1103' according to this embodiment composed as described above, when a logical signal at the "H" level is input from the internal circuit C1104 to the PD input terminal 1109, the PD input terminal 1110 and the 3-state input terminal 1107, the output circuit C1103' is in the normal operating state. Conversely, when a logical signal at the "L" level is input to the PD input terminal 1109, the PD input terminal 1110 and the 3-state input terminal 1107, the output circuit C1103' is in the high impedance state, and the bias voltage control circuit C1106' and the bias voltage control circuit C1107' are in the PD state.

Further, in this embodiment, the configuration of the output circuit C1103" shown in FIG. 14 can also be employed. As shown in FIG. 14, the output circuit C1103" has the configuration in which in the output circuit C1103' shown in FIG. 13, the PD control terminal 1109 and the PD control terminal 1110 connected to the internal circuit 01104 independently, are instead connected to the 3-state input terminal 1107 in common.

The output circuit C1103" having such configuration is in the normal operating state when a logical signal in the "H" level is input to the 3-state input terminal 1107. Conversely, when a logical signal at the "L" level is input to the 3-state input terminal 1107, the output circuit C1103" is in the high impedance state and the bias voltage control circuit C1106" and the bias voltage control circuit C1107" are in the PD state.

As described above, according to this embodiment, because the DC of an output circuit is fully prevented from flowing by executing both 3-state control and PD control, wasted power consumption can be suppressed, and an ICCS test performed for inspecting the shipment of an LSI can effectively be performed. Hereupon, the ISSC test is a method of inspecting defective products by measuring the small leakage current of the LSI, and is used widely in general.

On the contrary, in the seventh embodiment, the DC output current of the output circuit can be prevented from flowing by 3-state control, but a DC will flow into the bias voltage control circuit. Such DC indicates that power is wastefully consumed and the ISSC test is interrupted.

Furthermore, in this embodiment, when the configuration of the output circuit C1103" shown in FIG. 14 is employed, because a single common input terminal (3-state input terminal 1107 in FIG. 14) can perform both a 3-state control and a PD control, control from the internal circuit of an LSI is facilitated.

Besides, the first to third effects which can be obtained by the first embodiment can also be obtained in this embodiment.

Figure 15:
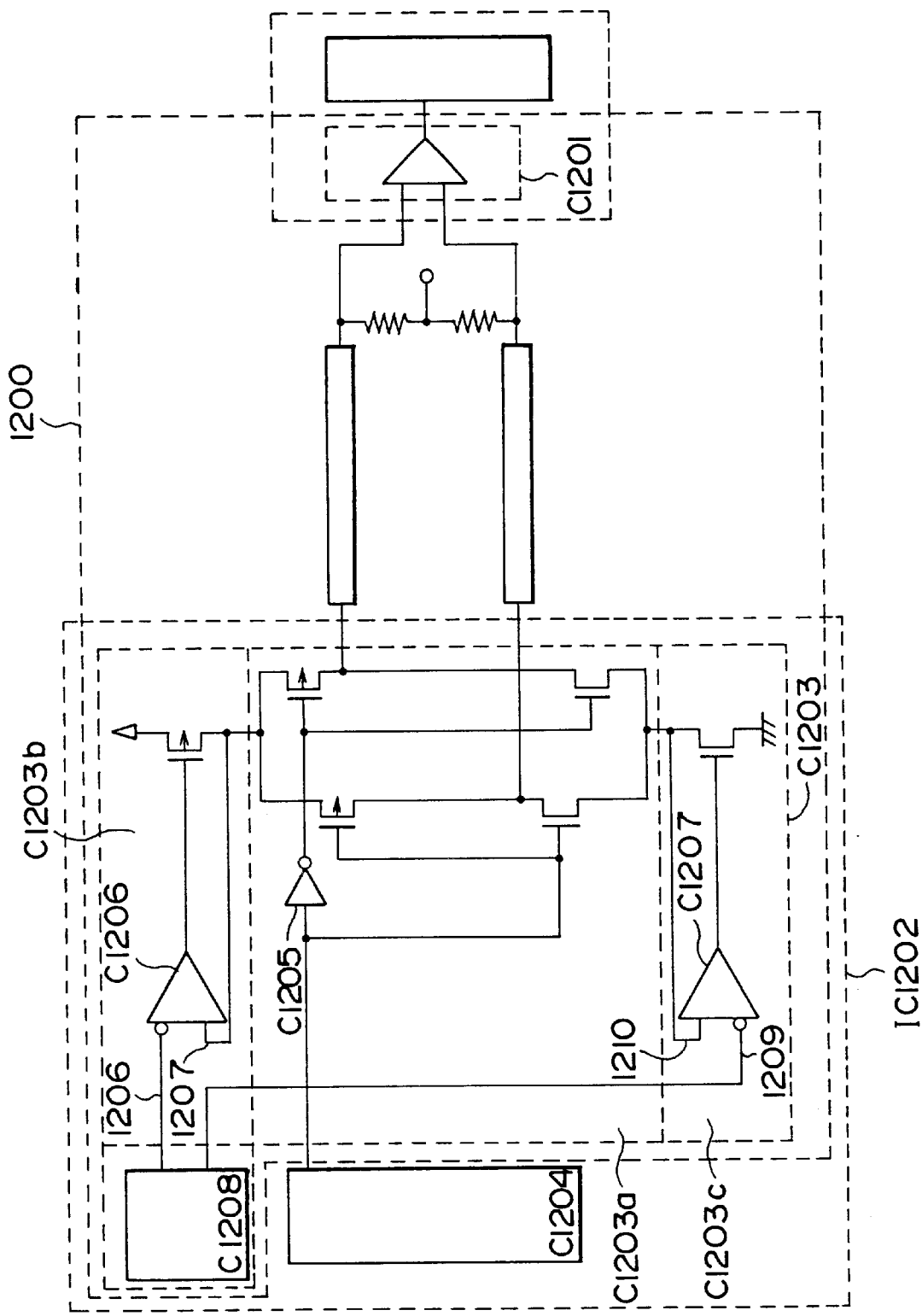
FIG. 15 is a schematic circuit diagram of another output circuit and interface circuit to which the present invention can be applied.
Figure 16:
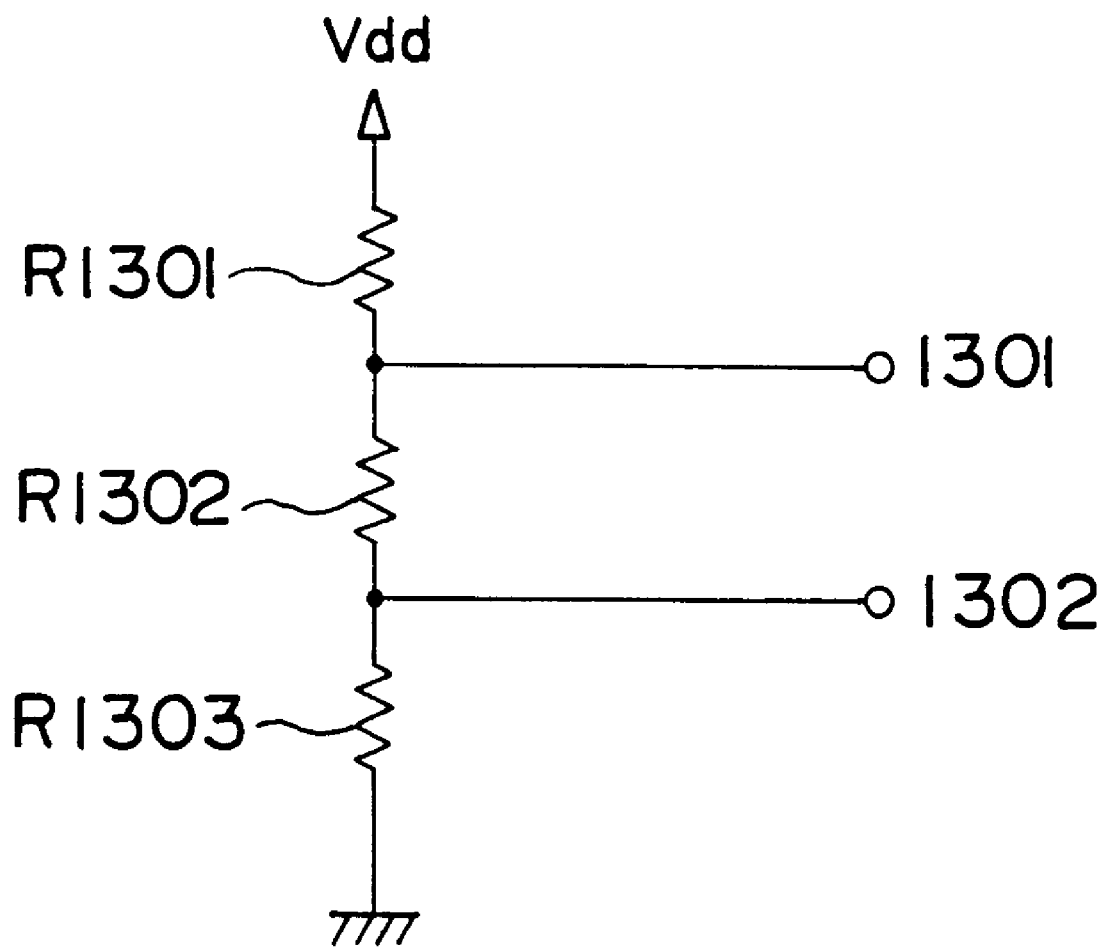
FIG. 16 is a schematic circuit diagram of a reference potential generation circuit which can be applied to the output circuit shown in FIG. 15.

Next, the ninth embodiment is described referring to FIGS. 15 and 16. FIG. 15 is a schematic circuit diagram of an output circuit C1203 according to this embodiment and an interface circuit 1200 to which the output circuit C1203 is applied, and FIG. 16 is a schematic circuit diagram of a reference potential generation circuit C1300 which can be applied to the output circuit C1203.

As shown in FIG. 15, the output circuit C1203 according to this embodiment has the same configuration circuit as output circuit C33 according to the embodiment shown in FIG 1. Therefore, a bias voltage control circuit C1206 can use a circuit having the same configuration as that of the bias voltage control circuit C36 shown in FIG. 1. Further, a bias voltage control circuit C1207 can use a circuit having the same configuration as that of the bias voltage control circuit C37 shown in FIG. 1. Furthermore, in the interface circuit 1200 to which the output circuit C1203 applies, an input circuit C1201 can use a circuit having the same configuration as that of the input circuit C31 shown in FIG. 1.

However, in this embodiment, a reference potential generation circuit C1208 is built in the inside of an integrated circuit C1202 on the sending side, and such point differs from the embodiment in which two types of reference potentials Vref_h and Vref_l are supplied from the outside of the integrated circuit IC32. In the output circuit according to this embodiment, the two output terminals of the reference potential generation circuit C1208 are connected to a reference potential input terminal 1206 of the bias voltage control circuit C1206 and a reference potential input terminal 1210 of the bias voltage control circuit C1207, respectively. Due to such configuration, the application of the reference potential to the bias voltage control circuit C1206 and the bias voltage control circuit C1207 is implemented.

FIG. 16 shows a circuit 1300 as an example of the reference potential generation circuit C1208. In such circuit 1300, a resistor R1301, a resistor R1302 and a resistor R1303 are sequentially connected in series between the power supply potential Vdd and GND. Such circuit 1300 partially divides the power supply voltage Vdd by the resistor R1301, the resistor R1302 and the resistor R1303 and generates reference potentials at an output terminal 1301 and an output terminal 1302.

When such circuit 1300 is applied to the integrated circuit IC1202, the output terminal 1301 is connected to the reference potential input terminal 1206 of the bias voltage control circuit C1206 and the output circuit 1302 is connected to a reference potential input terminal 1209 of the bias voltage control circuit C1207. Hereupon, the resistor R1301, the resistor R1302 and the resistor R1303, for example, can be manufactured by using the high density impurity area in which a high-density impurity is doped on a silicon base.

Besides, it is needless to say the reference potential generation circuit C1208 can apply to a circuit configuration other than the circuit 1300 shown in FIG. 16. The circuit 1300 shown in FIG. 16 has an advantage of an exceedingly simple circuit configuration, while it is not easy to obtain generated reference potential with full accuracy. If a reference potential having a better accuracy is generated, the accuracy of the control of the output voltage in the output circuit C1203 is further improved.

In this embodiment described above, because the reference potential generation circuit is formed into an integrated circuit and built in the integrated circuit IC1202, the installation area on a PC board can be reduced and the cost of the reference potential generation circuit on the PC board can be reduced.

Further, to externally apply a reference potential to an LSI, a dedicated LSI pin for applying external potential needs to be provided. If the number of supply pins for the reference potential increases, countermeasures for reliability such as ESD are made complex. Because this embodiment builds in a reference potential generation circuit, the reduction in the number of pins and the countermeasures for reliability are not required as compared with the first embodiment. This considerably simplifies the design of ICs. Besides, the effects obtained in the first embodiment can also be obtained in this embodiment as they are.

Figure 17:
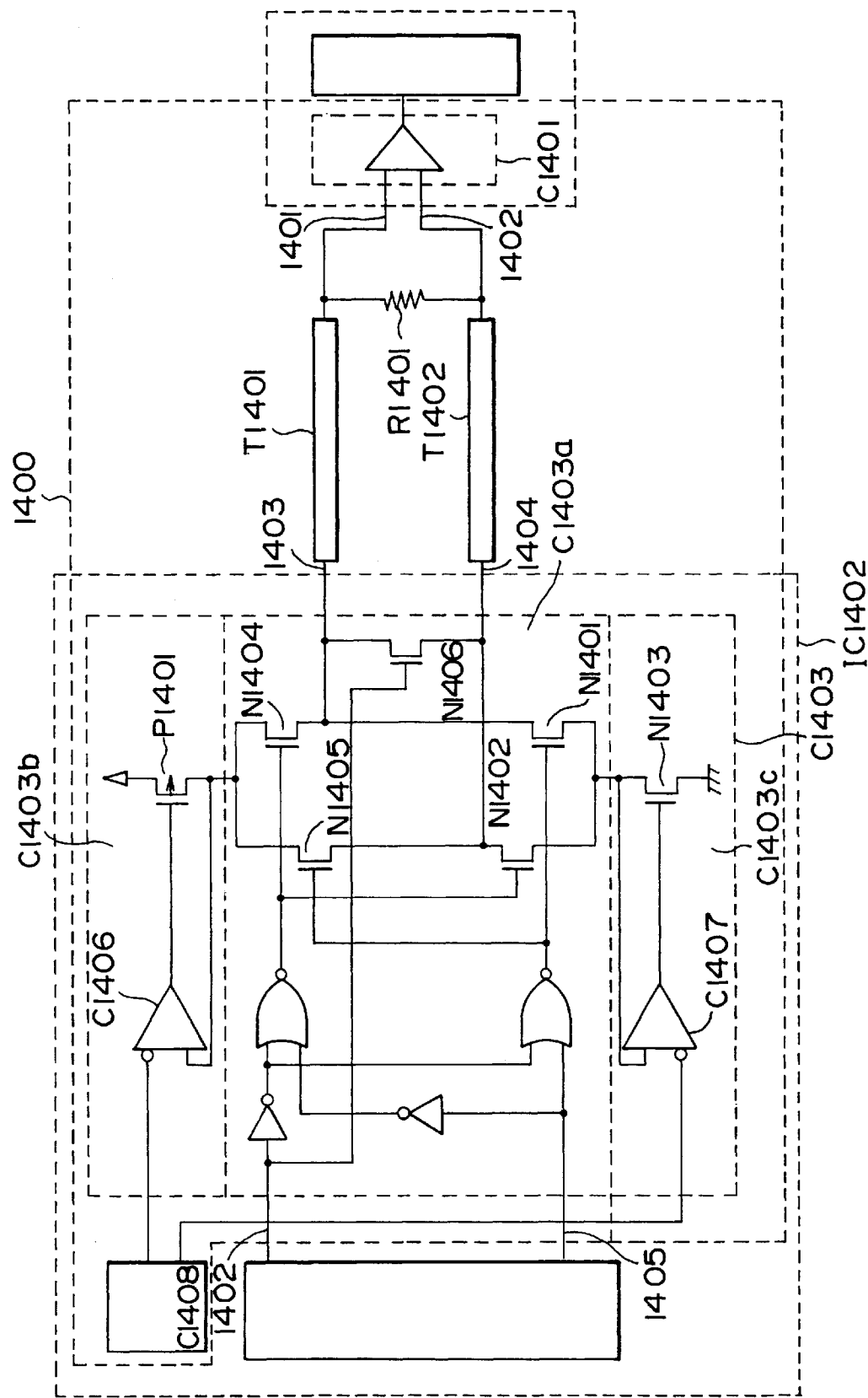
FIG. 17 is a schematic circuit diagram of another output circuit and interface circuit to which the present invention can be applied.

Next, the tenth embodiment of the present invention is described referring to FIG. 17. FIG. 17 is a schematic circuit diagram of an output circuit C1403 according to this embodiment. Such output circuit C1403 is an output circuit whose application to a small amplitude interface circuit other than CTT, in particular, an LVDS interface circuit, is effective.

As shown in FIG. 17, in the output circuit C1403 according to this embodiment, a push-pull unit C1403a is controlled in three states by a logical signal from a 3-state terminal 1407. Such point is the same as the output circuit C1103 according to the seventh embodiment shown in FIG. 12. Further, the push-pull unit C1403a is provided with four NMOS transistors N1401, N1402, N1404 and N1405 for forming an output signal. Such point is the same as the output circuit C93 according to the embodiment shown in FIG. 10.

Furthermore, the push-pull unit C1403a is provided with an NMOS transistor N1406 in which a source terminal (or drain terminal) is connected to an output terminal 1403, a drain terminal (or source terminal) is connected to a second output terminal 1404 and the deviation from the design value of an output signal is suppressed. Such point is the same as the output circuit C103 according to the sixth embodiment shown in FIG. 11. However, in the output circuit C1403 according to this embodiment, the gate terminal of the NMOS transistor N1406 is connected to the 3-state input terminal 1407. Such point differs from the output circuit C103 shown in FIG. 11.

Moreover, in the output circuit C1403 according to this embodiment, a first voltage drop power supply circuit C1403b and a second voltage drop power supply circuit C1403c are controlled based on the reference potential which is sent from a reference potential generation circuit C1408 integrated on the integrated circuit IC1402. Such point is the same as the output circuit C1203 according to the embodiment shown in FIG. 15.

In an interface circuit 1400 which conforms to the LVDS shown in FIG. 17, the output terminals 1403 and 1404 of such output circuit C1403 and input terminals 1401 and 1402 of an input circuit C1401 are connected in one-to-one correspondence by transmission lines T1403 and 1404. In the interface circuit 1400, such transmission line T1401 and transmission line T1402 mutually connect one end and one end connected to the side of the input circuit C1401 by an external resistor R1401. The termination of such transmission lines T1401 and T1402 also differs from any of the interface circuits to which the output circuits according to the first to ninth embodiments apply.

Besides, in the output circuit C1403 according to this embodiment, for example, the circuit C53 shown in FIG. 3 and the circuit C63 shown in FIG. 4 can be applied to a bias voltage control circuit C1406 and a bias voltage control circuit C1407. Further, for example, the circuit C1300 shown in FIG. 16 can be applied to the reference potential generation circuit C1408. Furthermore, in the output circuit C1403, the "H" level and the "L" level of the output voltage are determined depending on the voltage division the on resistance of the PMOS transistor P1401, the on resistance of the NMOS transistor N1404 (or N1405), the on resistance of the NMOS transistor N1406 and the combined resistance of the resistor R1401, the on resistance of the NMOS transistor N1402 (or N1401) and the on resistance of the NMOS transistor N1403. Moreover, in the interface circuit 1400, the external resistor R1401 is used to terminate with the transmission lines T1401 and T1402 and match impedance. For example, a resistor having the resistance of about 100Ω can be applied.

Figure 18:
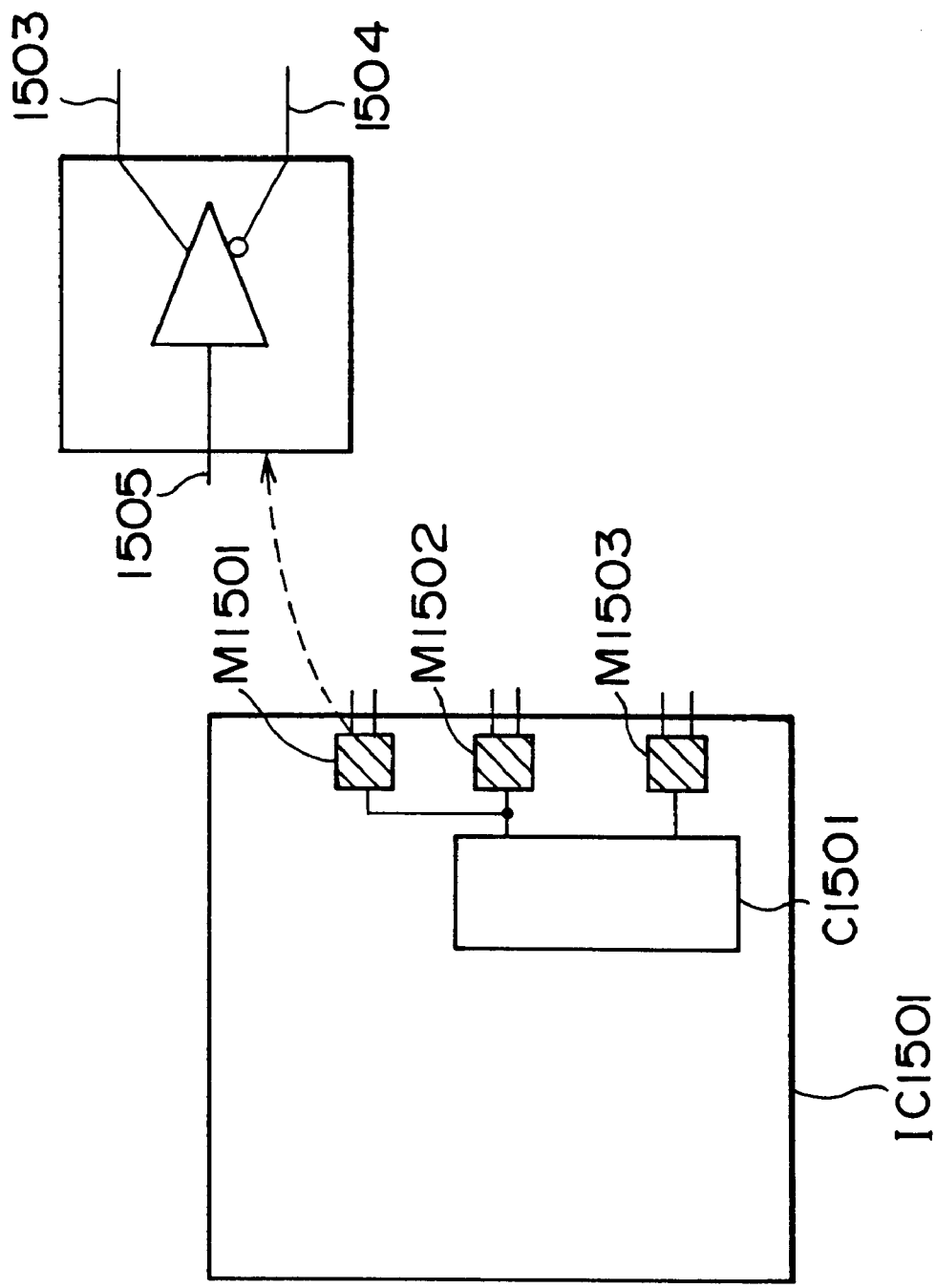
FIG. 18 is a schematic circuit diagram of a micro-celled output circuit and an LSI chip to which the present invention can be applied.

Next, the 11th embodiment is described referring to FIG. 18. FIG. 18 is a schematic circuit diagram of an LSI chip IC1501 to which micro cells M1501, M1502 and M1503 according to this embodiment can be applied. In FIG. 18, the micro cells M1501, M1502 and M1503 according to this embodiment have the configuration in which an input circuit C2130 according to the ninth embodiment shown in FIG. 15 is micro-celled.

When the LSI chip IC1501 is designed using the micro cells M1501, M1502 and M1503 according to this embodiment is designed practically, each input terminal 1505 is connected to an internal circuit C1501. Further, respective output terminals 1503 and 1504 of the micro cells M1501, M1502 and M1503 are connected to the output pins of the LSI chip IC1501. In such configuration, each of the micro cells M1501, M1502 and M1504 performs the function of an input circuit C2180 on the LSI chip IC1501.

As described above, according to this embodiment, an LSI chip can be designed by micro-celling an output circuit using an automatic layout CAD (computer aided design) tool. Therefore, the TAT (turn around times) of the LSI chip design can be shortened greatly. Besides, the effects described above are also obtained by applying the 11th embodiment to any of the output circuit C33 according to the first embodiment, the output circuit C33' according to the second embodiment, the output circuit C73 according to the third embodiment, the output circuit C83 according to the fourth embodiment, the output circuit C93 according to the fifth embodiment, the output circuit C103 according to the sixth embodiment, the output circuit C1103 according to the seventh embodiment, the output circuit C1103' or the output circuit C1103" according to the eighth embodiment, the output circuit C1203 according to the ninth embodiment or the output circuit C1403 according to the tenth embodiment.

Figure 19:
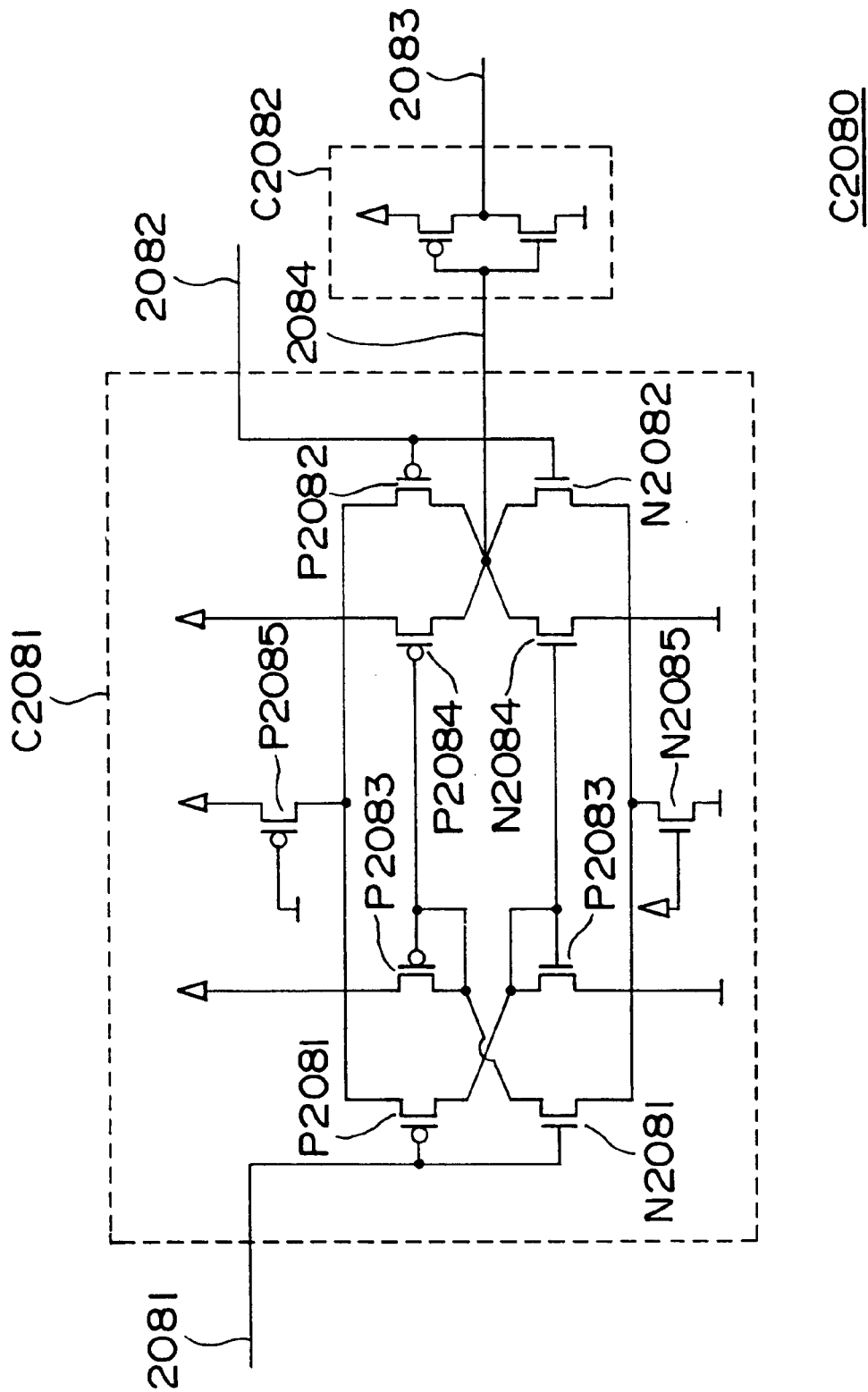
FIG. 19 is a schematic circuit diagram of an input circuit to which the present invention can be applied.
Figure 20A:
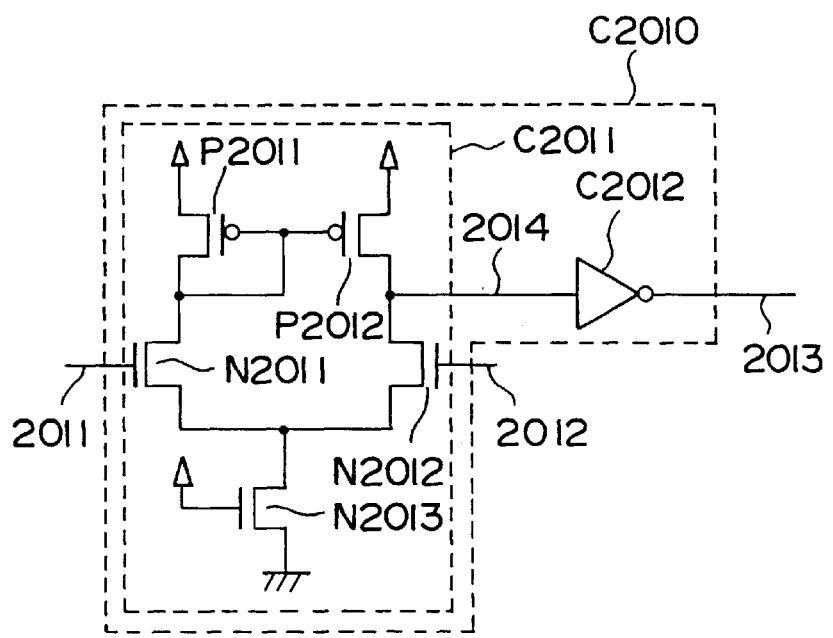
FIG. 20A is a circuit diagram of an input circuit illustrated in the description of the input circuit shown in FIG. 19
Figure 20B:
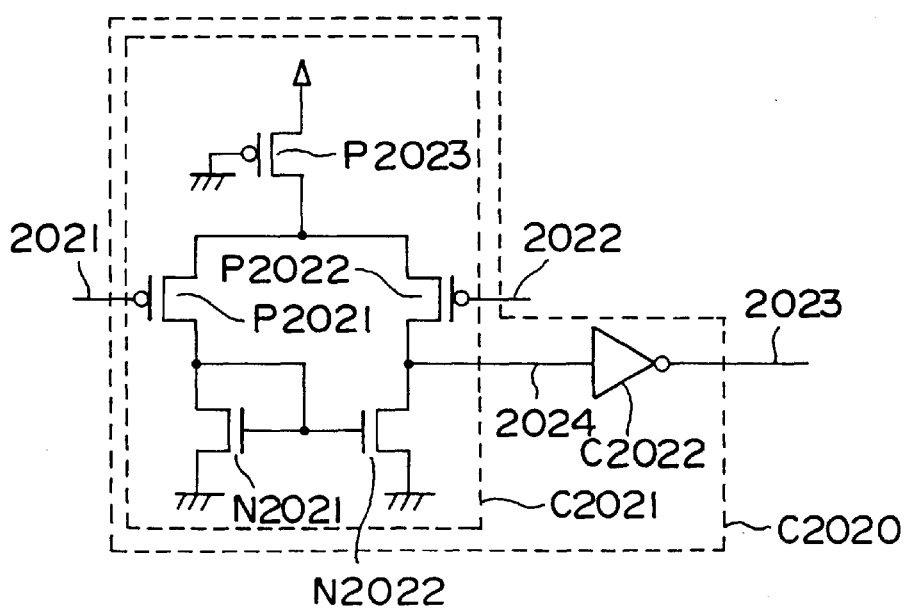
FIG. 20B is a circuit diagram of another input circuit illustrated in the description of the input circuit shown in FIG. 19.
Figure 21:
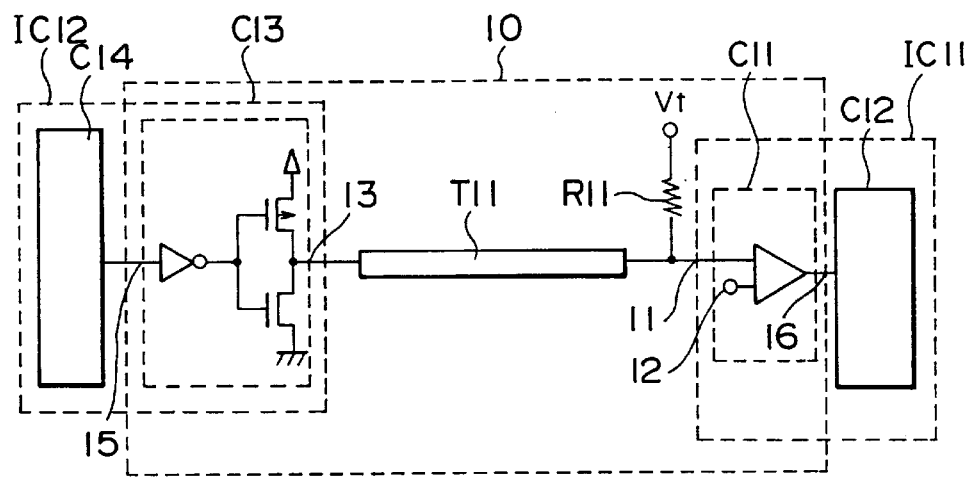
FIG. 21 is a schematic circuit diagram of an unbalanced transmission-type interface circuit.
Figure 22:
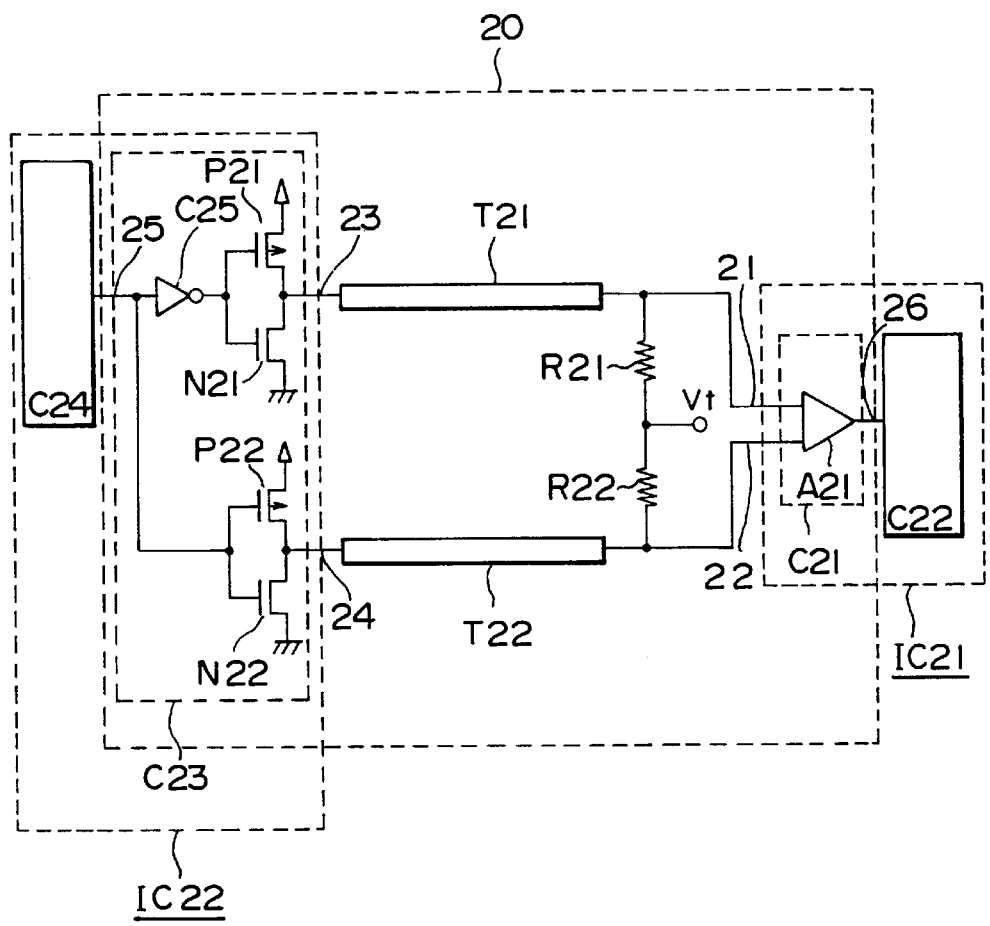
FIG. 22 is a schematic circuit diagram of a balanced transmission-type interface circuit.
Figure 24A:
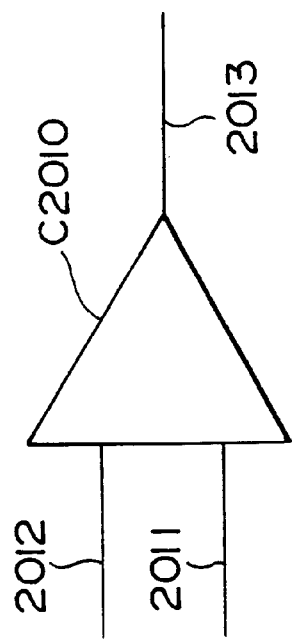
FIG. 24 is an explanatory diagram regarding another circuit operation of the input circuit shown in FIG. 20B.
Figure 24B:
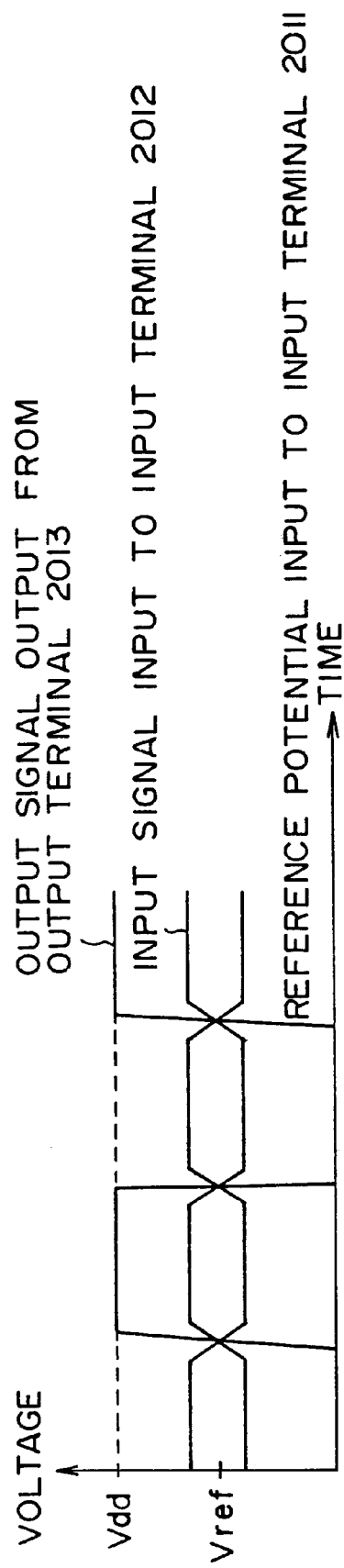
Figure 25:
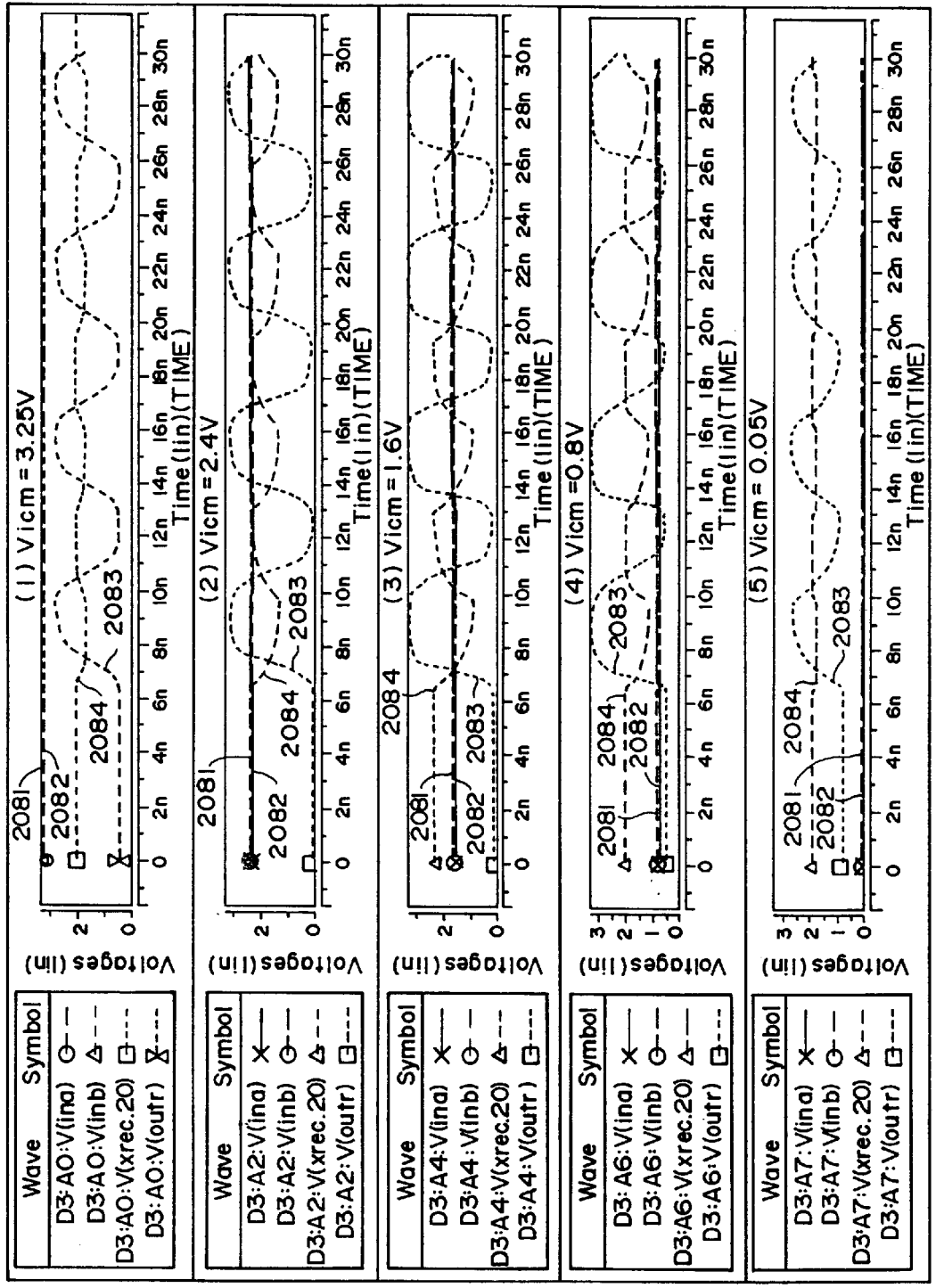
FIG. 25 is an explanatory diagram of the simulation result regarding the circuit operation of the input circuit shown in FIG. 19.
Figure 26:
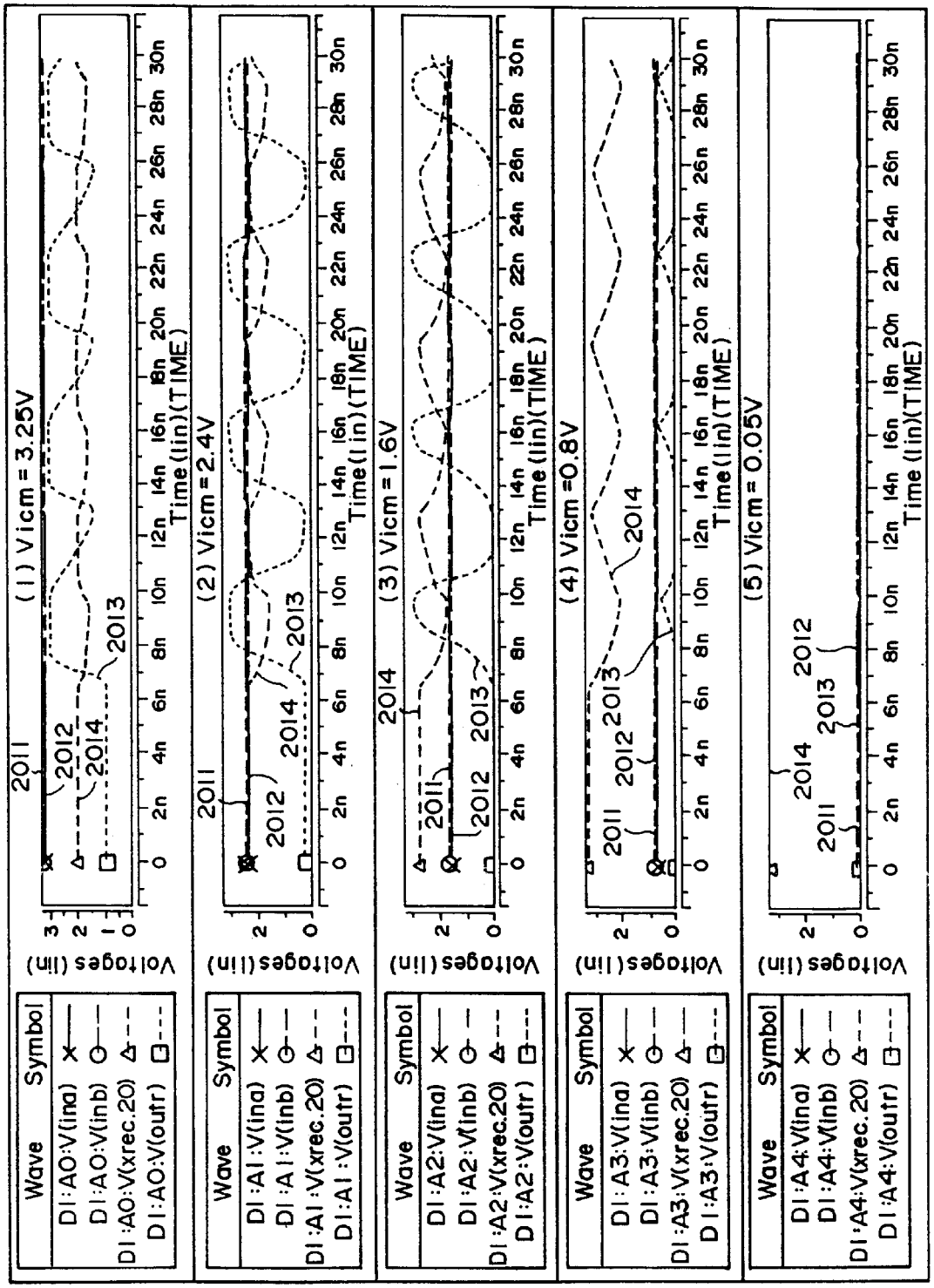
FIG. 26 is a diagram of the simulation result regarding the input circuit shown in FIG. 20A.
Figure 27:
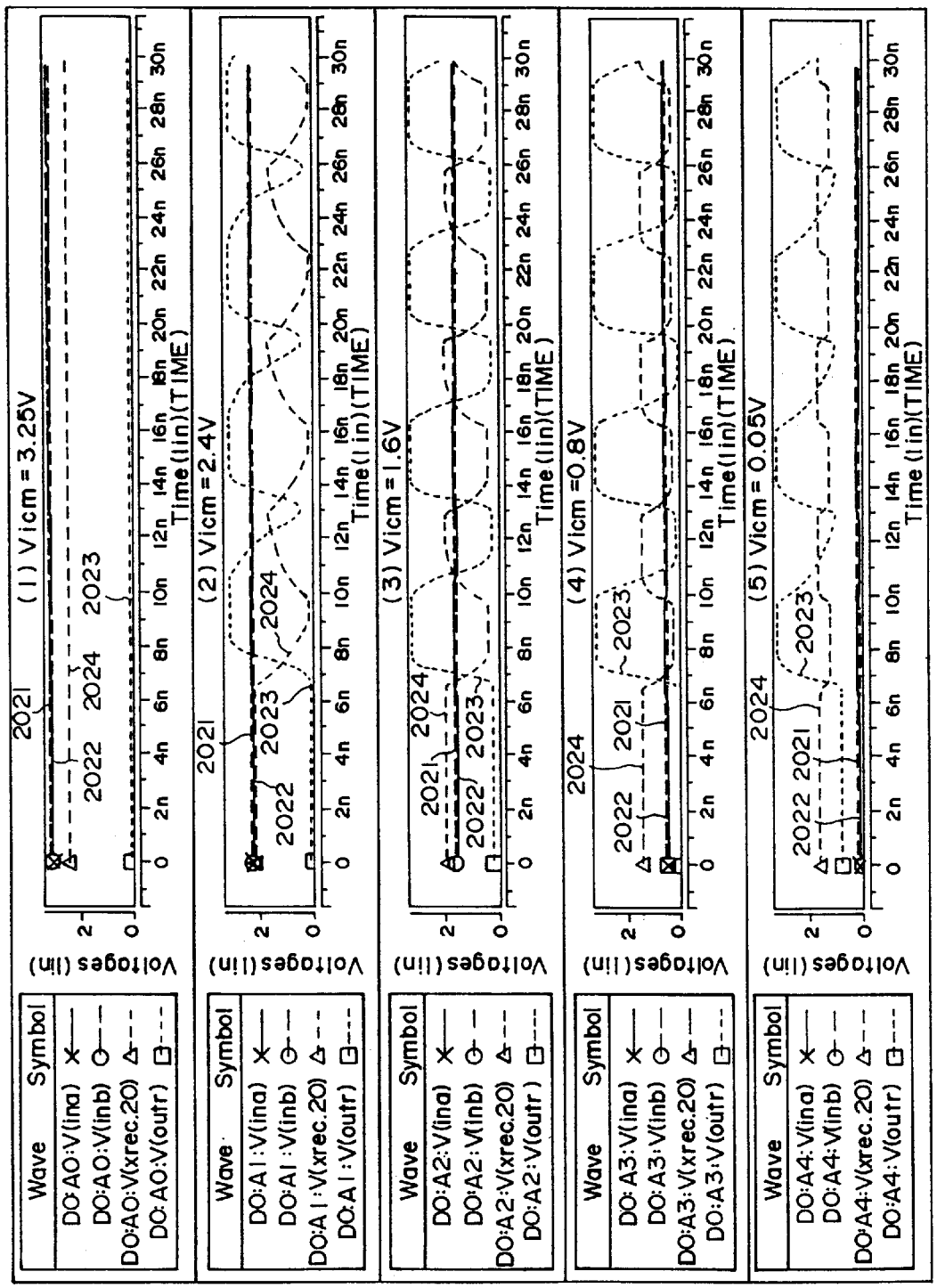
FIG. 27 is a diagram of the simulation result regarding the input circuit shown in FIG. 20B.

Next, the 12th embodiment is described referring to FIGS. 19 to 27. FIG. 19 is a schematic circuit diagram of an input circuit C2080 according to this embodiment, FIG. 20A is a circuit diagram of an input circuit C2010 that is compared with the input circuit C2080 in the following description, and FIG. 20B is a circuit diagram of another circuit C2020 that is compared with the input circuit C2080 in the following description. Moreover, FIG. 21 is a schematic circuit diagram of the unbalanced transmission-type interface circuit 10 to which the input circuit C2080 can apply and FIG. 22 is a schematic circuit diagram of the balanced transmission-type interface circuit 20 to which the input circuit C2080 can apply. Further, FIG. 23 is an explanatory diagram regarding the circuit operation of the input circuit C2010 and FIG. 24 is an explanatory diagram regarding another circuit operation of the input circuit C2010. Furthermore, FIG. 25 is an explanatory diagram of the simulation result regarding the circuit operation of the input circuit C2080. FIG. 26 is a diagram of the simulation result regarding the input circuit C2010 and FIG. 27 is a diagram of the simulation result regarding the input circuit C2020.

As shown in FIG. 19, the configuration of the input circuit C2080 according to this embodiment is almost the same as the configuration in which a differential C2011 applied to the input circuit C2010 shown in FIG. 20A and a differential amp C2021 applied to the input circuit C2020 shown in FIG. 20B are combined. Hereupon, before a detailed description of the input circuit C2080 according to this embodiment is performed, the input circuit C2010 shown in FIG. 20A, and FIG. 20B are described.

As shown in FIG. 20A, the input circuit C2010 comprises the differential amp C2011 and a CMOS inverter circuit C2012 and has a first input terminal 2011, a second input terminal 2012 and an output terminal 2013.

The differential amp C2011 comprising the input circuit C2010 is a differential amplification circuit which comprises a first NMOS transistor N2011 and a second NMOS transistor N2012 for differential input, a first PMOS transistor P2011 and a second PMOS transistor P2012 which are current mirror type loads and a third NMOS transistor N2013 used for the source potential control of the first NMOS transistor N2011 and the second NMOS transistor N2012.

In the input circuit C2010, the input terminal of the CMOS inverter circuit C2012 is connected to an output terminal 2014 of such differential amp C2011. Further, the first input terminal 2011 of the input circuit C2010 is connected to the gate terminal of the first NMOS transistor N2011 comprising such differential amp C2011. Furthermore, the second input terminal 2012 is the gate terminal of the second NMOS transistor N2012. Moreover, in the input circuit C2010, the output of the CMOS inverter circuit C2012 is connected to the output terminal 2013.

Further, the output terminal 2013 of the input circuit C2010 is connected to the internal circuit of an LSI. When the input circuit C2010 is applied, for example, to an unbalanced transmission-type interface circuit 20 shown in FIG. 22 instead of an input circuit C21, the output terminal 2013 is connected to the input terminal of an internal circuit C22. Furthermore, when the input circuit 2013 is applied, for example, to a balanced transmission-type interface circuit 10 instead of an input circuit C11, the-output terminal 2013 is connected to an internal circuit C12.

The circuit operation of the input circuit C2010 composed as described above is described referring to FIGS. 20A, 20B, 23 and 24. Besides, FIG. 23 is an explanatory diagram regarding the circuit operation when the input circuit C2010 is applied to an unbalanced transmission-type interface circuit and FIG. 24 is an explanatory diagram regarding the circuit operation when the input circuit C2010 is applied to a balanced transmission-type interface circuit.

Figure 23A:
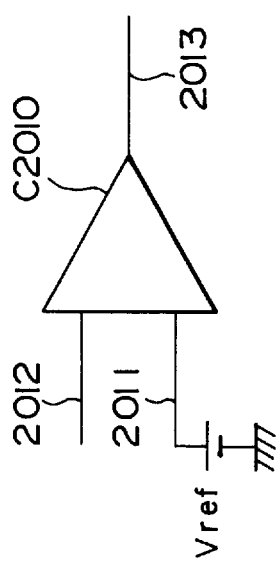
FIG. 23 is an explanatory diagram regarding the circuit operation of the input circuit shown in FIG. 20A.

As shown in FIG. 23A, when the first input terminal 2011 of the input circuit C2010 is connected to a reference potential Vref when it is applied to an unbalanced transmission-type interface circuit. Conversely, the second input terminal 2012 of the input circuit C2010 is connected to a transmission line through which a small amplitude input signal is propagated. The input circuit C2010 compares the potential of an input signal propagated through the transmission line with the reference potential Vref according to the function of the differential amp C2011, and identifies the logic of the input signal to be at the "H" level or the "L" level, by the output signal at the output terminal 2013.

For example, let the case to be considered in which the reference potential of about 1.5 V is connected to the first input terminal 2011 as the reference potential Vref, an input signal whose "H" level is 1.7 V and "L" level is 1.3 V is input to the second input terminal 2012 and the power supply potential is set to about 3.3 V. Besides, the reference potential of about 1.5 V is the typical potential of CTT. Further, that the potential of an input signal at the "H" level is about 1.7 V assumes the minimum value of the high level input voltage of CTT. Furthermore, that the potential of an input signal in the "L" level is about 1.3 V assumes the maximum value of the low level input voltage of CTT. In such setting conditions, in the differential amp C2011, the signal potential and reference potential of the input signal are amplified to the amplitude of about 1 to 2 V and output from the output terminal 2014. The output voltage from such differential amp C2011 is, for example,about 2.5 V in the "H" level and about 0.5 V in the "L" level.

The logic of the output signal output from the output terminal 2014 is determined by comparing the potential (about 1.5 V) of the first input terminal 2011 and the potential of the second input terminal 2012. When the input signal (about 1.7 V) at the "H" level is input to the second input terminal 2012, an output signal at the "L" level (about 0.5 V) is output from the output terminal 2014. Conversely, when the potential of the second input terminal 2012 is at the "L" level (about 1.4 V), a signal at the "H" level (about 2.5 V) is output from the output terminal 2014.

In the input circuit C2010, a signal output from the output terminal 2014 of the differential amp C2011 is further amplified into an output signal in the CMOS level whose "H" level potential is about 3.3 V and "L" level potential is about 0 V and is output from the output terminal 2013 of the input circuit C2010. Besides, in a signal output from the output terminal 2014 of the differential amp C2011 and a signal output from the output 2013 of the input circuit C2010, a logic is inverted by the function of the CMOS inverter circuit C12.

Figure 23B:
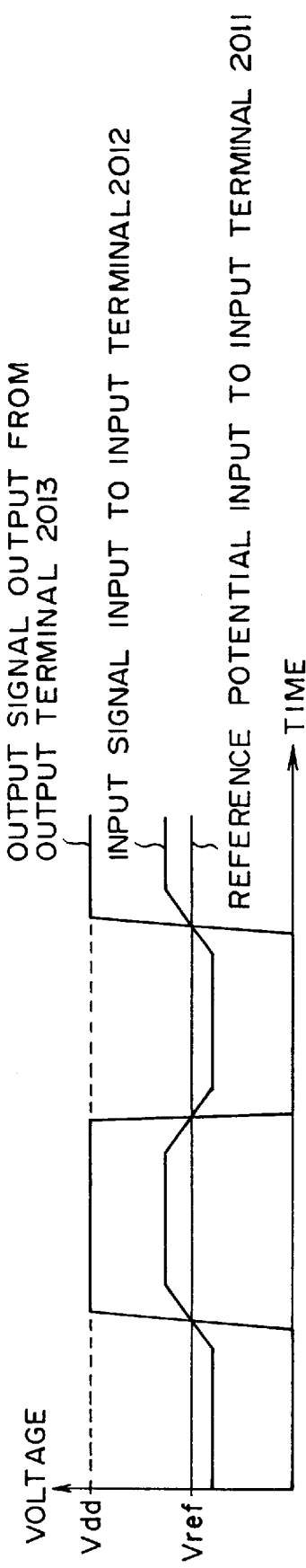

Consequently, in the input circuit C2010, it can be understood that the circuit operation whose timing chart is shown in FIG. 23B is performed.

Further, as shown in FIG. 24A, when the input circuit C2010 is applied to a balanced transmission-type interface circuit, a differential input signal is input to the first input terminal 2011 and the second input terminal 2012, respectively. As shown in FIG. 24B, also in such case, in the input circuit C2010, the potential of the first input terminal 2011 and the potential of the second input terminal 2012 are compared, the logic of an input signal is identified and an identification result is amplified to the amplitude equal to that of a power supply potential in the differential amp C11 (FIG. 20 A) and the CMOS inverter circuit C2012 (FIG. 20A). Consequently, an output signal in the CMOS level is output from the output terminal 2013.

Furthermore, as shown in FIG. 20B, an input circuit C2020 comprises the differential amp C2021 and a CMOS inverter circuit C2022 and has a first input terminal 2021, a second input terminal 2022 and a first output 2023.

The differential amp C2021 comprising such input circuit C2020 is a differential amplification circuit, which comprises a first PMOS transistor P2021 and a second PMOS transistor P2022 for differential input, a first NMOS transistor N2021 and a second NMOS transistor N2022 that are current mirror type loads, and a third PMOS transistor P2023 used for the source potential control of the first PMOS transistor P2021 and the second PMOS transistor P2022.

In the input circuit C2020, the first input terminal 2021 is connected to the gate terminal of the first PMOS transistor P2021 of such differential amp C2021. Further, the second input 2022 is connected to the gate terminal of the second PMOS transistor P2022 of the differential amp C2021. Furthermore, the input terminal of the CMOS inverter circuit C2022 is connected to an output 2024 of the differential amp C2021. Moreover, in the input circuit C2020, the output terminal of the CMOS inverter circuit C2022 is connected to a first output 2023 of the input circuit C2020.

Further, the output terminal 2023 of the input circuit C2020 is connected to the internal circuit of an LSI. When the input circuit C2020, for example, is applied to the balanced transmission-type interface circuit 20 instead of the input circuit C21, the output terminal 2023 is connected to the input terminal of the internal circuit C22. Furthermore, when the input circuit C2020, is applied, for example, to the unbalanced transmission-type interface circuit 10, instead of the input circuit C11, the output terminal 2023 is connected to the internal circuit C12.

The input circuit C2010 and the input circuit C2020 described above are common in that an electrical signal that is proportional to the potential differences of two input terminals, is output by the mutually almost the same circuit operation. Hereupon, for the details of the circuit operation of the input circuit C2020, a description by referencing the operation of the input circuit C2010, and a specific description is made.

Conversely, because the input circuit C2010 and the input circuit C2020 differ in the circuit configuration of an applied differential amp, the range of an input signal which can obtain a full output differs. Specifically, the input circuit C2010 is used to receive an input signal by the first NMOS transistor N2011 and the second NMOS transistor N2012 when the input signal has comparatively high potential (potential approximate to the power supply potential in the vicinity of the center of the power supply voltage). Conversely, the input circuit C2020 is used to receive an input signal by the first PMOS transistor P2021 and the second PMOS transistor P2022 when an input signal has comparatively low potential (potential approximate to the GND potential in the vicinity of the power supply voltage).

Also described above regarding this embodiment, the configuration of a differential amp C2081 according to this embodiment shown in FIG. 19 is substantially the same as the configuration in which the differential amp C2011 applied to the input circuit C2010 shown in FIG. 20A and the differential amp C2021 applied to the input circuit C2020 shown in FIG. 20B are combined.

In the differential amp C2081, a first set of differential amps has almost the same circuit configuration as the differential amp C2011 applied to the input circuit C2010 shown in FIG. 20A. Specifically, such first set of differential amps, as shown in FIG. 19, comprises PMOS transistors P2083 and P2084 which are current mirror type loads, a pair of NMOS transistors N2081 and N2082 for differential input and an NMOS transistor N2085 used for the source potential control of the NMOS transistors N2081 and N2082.

Further, a second set of differential amps comprising the differential amp C2081 has almost the same circuit configuration as the differential amp C2021 applied to the input circuit C2020 shown in FIG. 20B. Specifically, such first set of differential amps, as shown in FIG. 19, comprises NMOS transistors N2083 and N2084 which are current mirror type loads, a pair of PMOS transistors P2081 and P2082 for differential input and a PMOS transistor P2085 used for the source potential control of the PMOS transistors P2081 and P2082.

In the differential amp C2081, the gate terminal of the PMOS transistor P2081 and the gate terminal of the NMOS transistor N2081 are connected in common to one input terminal of the differential amp C2081. Further, the gate terminal of the PMOS transistor P2082 and the gate terminal of the NMOS transistor N2082 are connected in common to the other input terminal of the differential amp C2081. Furthermore, the drain terminal of the PMOS transistor P2082, the drain terminal of the PMOS transistor P2084, the drain terminal of the NMOS transistor N2082 and the drain terminal of the NMOS transistor N2084 are connected in common to an output terminal 2084 of the differential amp C2081.

That is to say, the differential amp C2081 is provided with the mutually paired PMOS transistors P2081 and P2082 which form the input unit of the first set of differential amps and the mutually paired NMOS transistors N2081 and N2082 which form the input unit of the second set of differential amps and has the circuit configuration in which an input signal can be received by both the PMOS transistor and the NMOS transistor.

The input circuit C2080 to which such differential amp C2081 comprises the differential amp C2081 and a CMOS inverter circuit C2082 and has an input terminal 2081, an input terminal 2082 and the output terminal 2083. In the input circuit C2080, one input terminal of the differential amp C2081 is connected to the input terminal 2081 and the other input terminal is connected to the input terminal 2082.

Further, the output terminal of the CMOS inverter circuit C2082 is connected to the output terminal 2083. Furthermore, such output terminal 2083 is connected to the internal circuit of an LSI not illustrated, which is provided outside the input circuit C2080. Moreover, in the input circuit C2080, the differential amp C2081 and the CMOS inverter circuit C2082 are connected due to the fact that the output terminal 2084 of the differential amp C2081 is connected the input terminal of the CMOS inverter circuit C2082.

When a differential input signal is input from the input terminal 2081 and the input terminal 2082, respectively, to the input circuit C2080 according to this embodiment composed as described above, the input circuit C2080 compares the potential at the input terminal 2081 and the potential at the input terminal 2082, identifies the logic of an input signal and outputs an output signal at the "H" level or the "L" level, which is amplified to the amplitude equal to the power supply voltage, from the output terminal 2083.

The input circuit C2080 according to this embodiment that performs such operation, can receive a differential input signal within a wider range as compared with the input circuit C2010 shown in FIG. 20A and the input circuit C2020 shown in FIG. 20B. The principle by which the input circuit C2080 can receive the differential input signal within a wide range is described below.

First, when the potential of the differential input signal is in the vicinity of the power supply potential, the second set of differential amps of the input circuit C2080 cannot receive the differential input signal, but the first set of differential amps of the input circuit C2080 can receive it. Further, when the potential of the difference input signal is in the middle, between the power supply potential and the GND potential, the signal can be received by both the first set of differential amps and the second set of differential amps of the input circuit C2080. Furthermore, when the potential of the differential input signal is in the vicinity of GND, the signal cannot be received by the first set of differential amps of the input circuit C2080, but it can be received by the second set of differential amps of the input circuit C2080.

Thus, because a mutually unreceivable voltage range can be covered by applying the differential amp C2080 in which the first set of differential amps and the second set of differential amps are combined, the input circuit C2080 according to this embodiment can receive a differential input signal within a wide range.

Hereupon, a simulation result of the circuit operation of the input circuit C2080 according to this embodiment is described by comparing the input circuit C2010 and the input circuit C2020 shown in FIGS. 20A and 20B and referring to FIGS. 25, 26 and 27. FIG. 25 shows an example of a result in which the input circuit C2080 according to this embodiment is simulated as described above. Further, FIG. 26 shows an example of the result in which the input circuit C2010 shown in FIG. 20A is simulated, and FIG. 27 shows an example of the result in which the input circuit C2020 shown in FIG. 20B is simulated.

Specifically, FIG. 26 shows the input signal waveforms of the input terminals 2011 and 2012 shown in FIG. 20A and the output signal waveforms of the output terminals 2014 and 2013 of the differential amp C2011. The simulation condition in FIG. 26 is that a differential input signal of 156 MHz having the power supply voltage Vdd of 3.3 V and the amplitude of 0.1 V is input to the input terminals 2011 and 2012. Simulation waveforms in which the central potential Vicm of the differential input signal is varied to 3.25 V, 2.4 V, 1.6 V, 0.8 V or 0.05 V are shown in plots (1), (2), (3), (4) and (5) of FIG. 26.

According to FIG. 26, when attention is paid to the output signal waveform of the output terminal 2013, operation is performed with difficulty for Vicm=3.25 V, 2.4 V or 1.6 V, but a faulty operation is already assumed for Vicm=0.8 V and no operation is assumed for Vicm=0.05 V. This is because, for Vicm=0.2 V and 0.05 V, the output 2014 of the differential amp C2011 cannot output a signal enough to drive the inverter circuit C2012 at the next stage. Consequently, it can be confirmed that the input circuit C2010 cannot perform an operation when the potential of an input differential signal is in the vicinity of the GND potential.

FIG. 27 shows the input signal waveforms of the input terminals 2021 and 2022 shown in FIG. 20B and the output signal waveforms of the output terminals 2024 and 2023 of the differential amp C2021. The simulation condition in FIG. 27 is that a differential input signal of 156 MHz having the power supply voltage Vdd of 3.3 V and the amplitude of 0.1 V is input to the input terminals 2021 and 2022. Simulation waveforms in which the central potential Vicm of the differential input signal is varied to 3.25 v, 2.4 V, 1.6 V, 0.8 V or 0.05 v are shown in plots (1), (2), (3), (4) and (5) of FIG. 27.

According to FIG. 27, when attention is paid to the output signal waveform of the output terminal 23, operation is performed with difficulty for Vicm=0.05 V, 0.8 V or 1.6 V, but for Vicm=2.4 V and 3.25 V, the output 2024 of the differential amp C2021 cannot output a signal strong enough to drive the inverter circuit C2022 at the next stage. Consequently, it can be confirmed that the input circuit C2020 cannot perform an operation when the potential of an input differential signal is in the vicinity of the power supply potential.

FIG. 25, as an example of the result in which the circuit operation of the C2080 according to this embodiment is simulated, shows the input signal waves of the input terminals 2081 and 2082 and the output signals of the output terminals of the differential amp C2081. The simulation condition in FIG. 25 is that a differential input signal of 156 MHz having the power supply voltage Vdd of 3.3 V and an amplitude of 0.1 V, is input to the input terminals 2081 and 2082. Simulation waveforms in which the central potential Vicm of the differential input signal is varied to 3.25 V, 2.4 V, 1.6 V, 0.8 V or 0.05 V are shown in the plots (1), (2), (3), (4) and (5) of FIG. 25.

According to FIG. 25, when attention is paid to the output signal waveform of the output terminal 2083, it can be confirmed that an operation is performed for all of these cases, that is, for Vicm=3.25V, 2.4 V, 1.6 V, 0.8 V or 0.05 V. This is because, even for any case of Vicm=3.25 V, 2.4 V, 1.6 V, 0.8 V or 0.05 V, the output terminal 2084 of the differential amp C2081 can output a signal strong enough to drive the inverter circuit C2082 at the next stage. Consequently, the input circuit C2080 according to this embodiment shown in FIG. 19 can confirm that a differential input signal within a wide range can be received.

As described above, in this embodiment, by using the circuit configuration of a differential amp that can receive an input signal by both the PMOS transistor and the NMOS transistor, an input circuit which can receive a differential input signal within a wide range is implemented. The effects of this fact are described below.

First, the first effect is that the input circuit cannot satisfy the specifications of LVDS or is very difficult to satisfy, but the input circuit according to this embodiment can satisfy the specifications of LVDS.

Further, because the input circuit shown in FIG. 20A or FIG. 20B cannot receive a differential input signal within a wide range individually, one input circuit is difficult to support various interfaces in which the specifications of the input signal potential differ. According to the specifications, because the input circuit may have to be redesigned, it is uneconomical. Conversely, because the input circuit according to this embodiment can receive the differential input signal within a wide range, one input circuit can support various interfaces whose specifications are different. This is the second effect.

Furthermore, in a circuit in which an LSI is incorporated, when the LSI is practically mounted on a PC board, there may be a large potential difference between LSIs. Moreover, the power and the potential of GND may greatly change by the operation of the LSI itself. Therefore, in the input circuit shown in FIG. 20A or FIG. 20B, the characteristic deterioration of a circuit, such as deterioration of a duty ratio easily occurs, and in the worst case, a malfunction might have been caused (because changing the potential of GND results in changing the central potential of a differential input signal).

On the one hand, the input circuit according to this embodiment is strong when there are fluctuations of the power supply and GND potential, and can normally operate even when the power supply potential and the GND potential fluctuate greatly. Therefore, the input circuit according to this embodiment normally operates even when there is a large potential difference between LSIs or the power supply potential and the GND potential fluctuate greatly by the operation of the LSI itself. This is the third effect.

The input circuit according to this embodiment can receive an input differential signal within a wide range from the power supply potential Vdd to the GND potential. However, when the simulation waveform of the output terminal 84 shown in FIG. 25 is observed, for Vicm=2.4 V, 1.6 V or 0.8 V, although a signal having an amplitude high enough to drive the CMOS inverter circuit at the next stage, for Vicm=3.25 V or 0.05 V, such amplitude is high enough that driving is enabled without difficulty, and such a state in which no allowance for performance is permitted can be seen.

Figure 28:
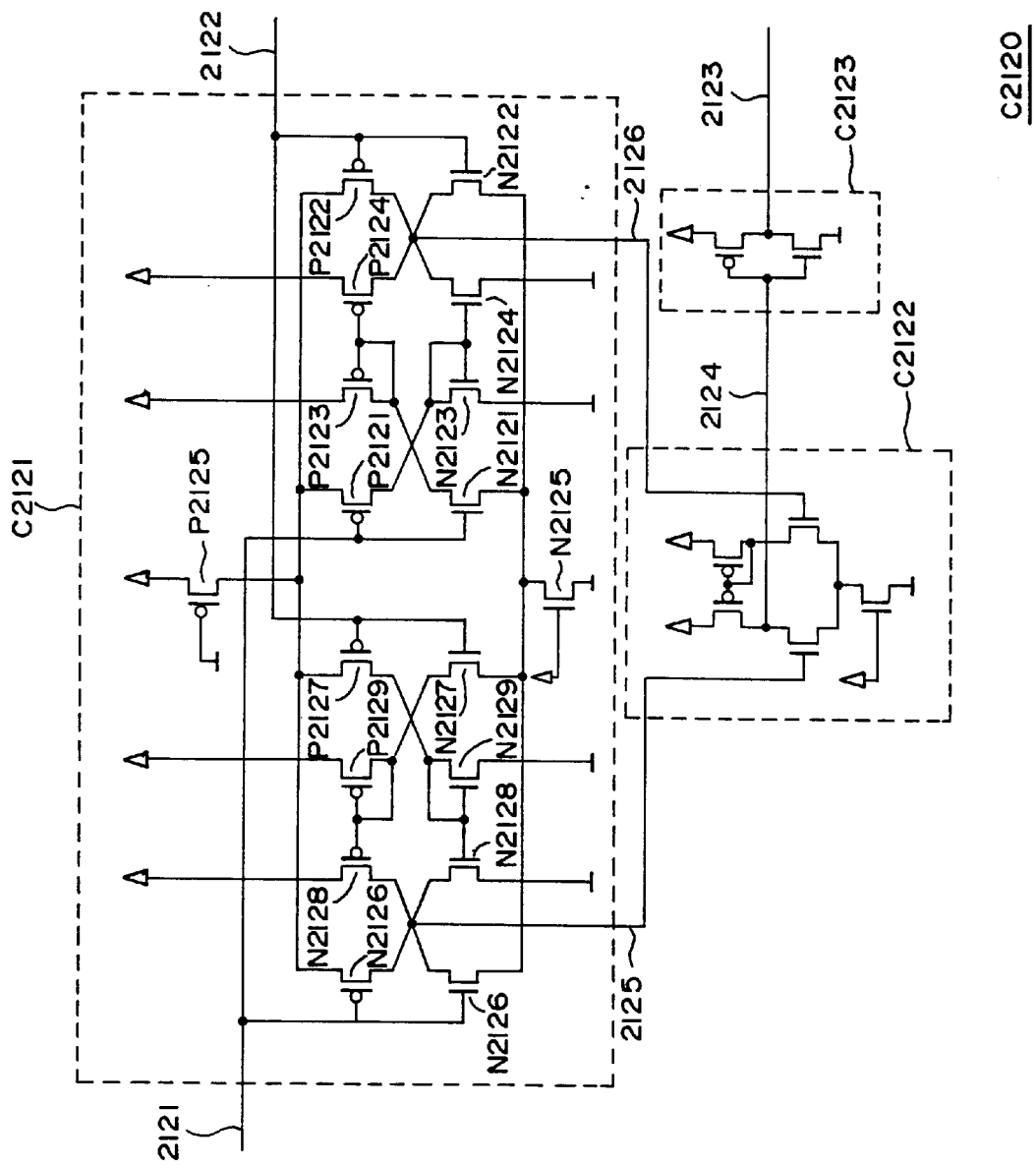
FIG. 28 is a schematic circuit diagram of another input circuit to which the present invention can be applied.

Next, the 13th embodiment is described referring to FIG. 28. FIG. 28 is a schematic circuit diagram of an input circuit C2120 according to this embodiment. As shown in FIG. 28, the input circuit C120 according to this embodiment greatly differs from the input circuit C2080 according to the embodiment shown in FIG. 19 in that a second-stage differential amp C2122 is provided at the next stage of a first-stage differential amp C2121. Further, the input circuit C2120 according to this embodiment also differs from the differential amp C2081 of the input circuit C2080 according to the first embodiment in the circuit configuration of the first-stage differential amp C2121.

In the input circuit C2120 according to this embodiment, the first-stage differential amp C2121 has differential output terminals 2125 and 2126. The first-stage differential amp C2121 has almost the same circuit configuration in which the two differential amps C2081 shown in FIG. 19 are combined, that is to say, comprises four sets of differential amps.

The first-stage differential amp C2121 has almost the same circuit configuration as the differential amp C2081 shown in FIG. 19 in which the circuit units (first and two sets of differential amp units) comprise PMOS registers P2121, P2122, P2123, P2124 and P2125 and NMOS transistors N2121, N2122, N2123, N2124 and N2125.

The input circuit C2120 according to this embodiment has a configuration in which the third and fourth sets of differential amp units are added to such first and second sets of differential amp units.

Such third set of differential amp units comprises PMOS transistors P2128 and P2129, which are current mirror type loads, a pair of NMOS transistors N2126 and N2127 for differential input and the NMOS transistor N2125 used the source potential control of the N2126 and N2127.

Further, the fourth set of differential amp units comprises NMOS transistors N128 and N129, which are current mirror type loads, a pair of PMOS transistors P126 and P127 for differential input, and a PMOS transistor P125 used for the source potential control of the PMOS transistors P126 and P127.

The first-stage differential amp C2121 has two input terminals, which correspond to the first or second input, and the gate electrodes of PMOS transistor P2121, a PMOS transistor P2126 and NMOS transistors N2121 and N2126, are connected to the one input terminal. Moreover, the gate electrodes of PMOS transistor P2122, a PMOS transistor P2127, and the NMOS N2122 and N2127, are connected in common to another input terminal of the first-stage differential amp C2121. The first input terminal and the second input terminal of the first-stage differential amp C2121 are connected in common to input terminals 2121 and 2122 of the input circuit C2120, respectively.

Further, the drain terminal of the PMOS transistor P2122, the drain terminal of the PMOS transistor P2124, the drain terminal of the NMOS transistor N2122 and the drain terminal of the NMOS transistor N2124 are connected in common to the output 2126 of the first-stage differential amp C2121. Furthermore, the drain terminal of the PMOS transistor P2126, the drain terminal of the PMOS transistor P2128, the drain terminal of the NMOS transistor N2126 and the drain terminal of the NMOS transistor N2128 are connected to the output terminal 2125 of the first-stage differential amp C2121, which corresponds to a common output terminal.

The output terminals 2125 and 2126 of the first-stage differential amp C2121 is connected to the input terminal of the second-stage differential amp C2121. An output terminal 2124 of the second-stage differential amp C2121 is connected to the input terminal of a CMOS inverter circuit C2123. Further, the output terminal of the CMOS inverter circuit C2123 is connected to an output terminal 2123 of the input circuit C2120. Hereupon, the second-stage differential amp C2122 has almost the same circuit configuration as the conventional differential amp C2011 shown in FIG. 20A. This is an example of the second-stage differential amp C2122, for example. It is needless to say that almost the same circuit configuration as the differential amps C2021 and 2081 shown in FIG. 19 also can be employed.

In the input circuit C2120 composed as described above, when a differential input signal is input to the input terminals 2121 and 2122, in the first-stage differential amp C2121 the potential between the input terminal 2121 and the input terminal 2122 are compared and a differential signal having a logical value that is based on the compare result, is output to the output terminal 2124 and the output terminal 2125. Hereupon, a differential signal having the smaller amplitude than the power supply voltage will be output to the output terminal 2124 and the output terminal 2125 in the same manner as the simulation waveform of the output terminal, shown in FIG. 25.

The differential signal between the output terminal 2124 and the output terminal 2125, as described in relation to issues of concern with the 12th embodiment, has the lowest amplitude to drive a CMOS inverter circuit, but has the differential amplitude high enough to drive the second-stage differential amp. Moreover, because the center potential of the differential signal of the output terminal 2124 and the output terminal 2125, for example, will not scatter within a wide range from the power supply potential Vdd to the GND potential, and scatters only within a narrow range to some extent, the second-stage differential amp C2122 can easily receive the differential signal.

The differential signal between the output terminal 2124 and the output terminal 2125 is further amplified by the second-stage differential amp C2122 and is output to the output terminal 2124. Because the signal at the output terminal 2124 is amplified to an amplitude high enough to drive the inverter circuit C2123, the issue of the input circuit according to the 12th embodiment is solved. Finally, the signal is amplified into a signal of "H" level=Vdd and "L" level=0 V by the CMOS inverter circuit C2123 and is output from the output 2123 to the outside of the input circuit C2120.

In this embodiment described above, the first to third effects in the 12th embodiment can be obtained in the same manner. In addition, according to this embodiment, the issues left in the input circuit according to the 12th embodiment can also be obtained. Therefore, according to this embodiment, as compared with the input circuit of the 12th embodiment, an input circuit which is strong for the effects such as a process fluctuation, a power supply fluctuation and a GND fluctuation is provided. That is to say, the input circuit according to this embodiment normally operates even when the process fluctuation, power supply fluctuation and GND fluctuation are large.

In the input circuit C2120 according to this employment, the CMOS inverter circuit C2123 drives the loads of LSI elements outside the input circuit C2120, for example, such as wiring and internal circuits, but the driving force is small and is not always said to be sufficient. This is because, usually, the capability to drive the CMOS inverter circuit C2123 of the differential amp C2122 is small compared to (generally used) a buffer. The parasitic load capacitance of the output terminal 2124 needs to be reduced to the utmost, and the size of a transistor for the CMOS inverter circuit C2123 cannot be increased. (Because the size of the transistor is small, the driving force is small).

That is to say, in the input circuit C2120 according to this embodiment, it is desirable that the load drive capacity of the output terminal 2123 should become larger. Such issue is a common issue in the 12th embodiment as well as this embodiment.

Figure 29:
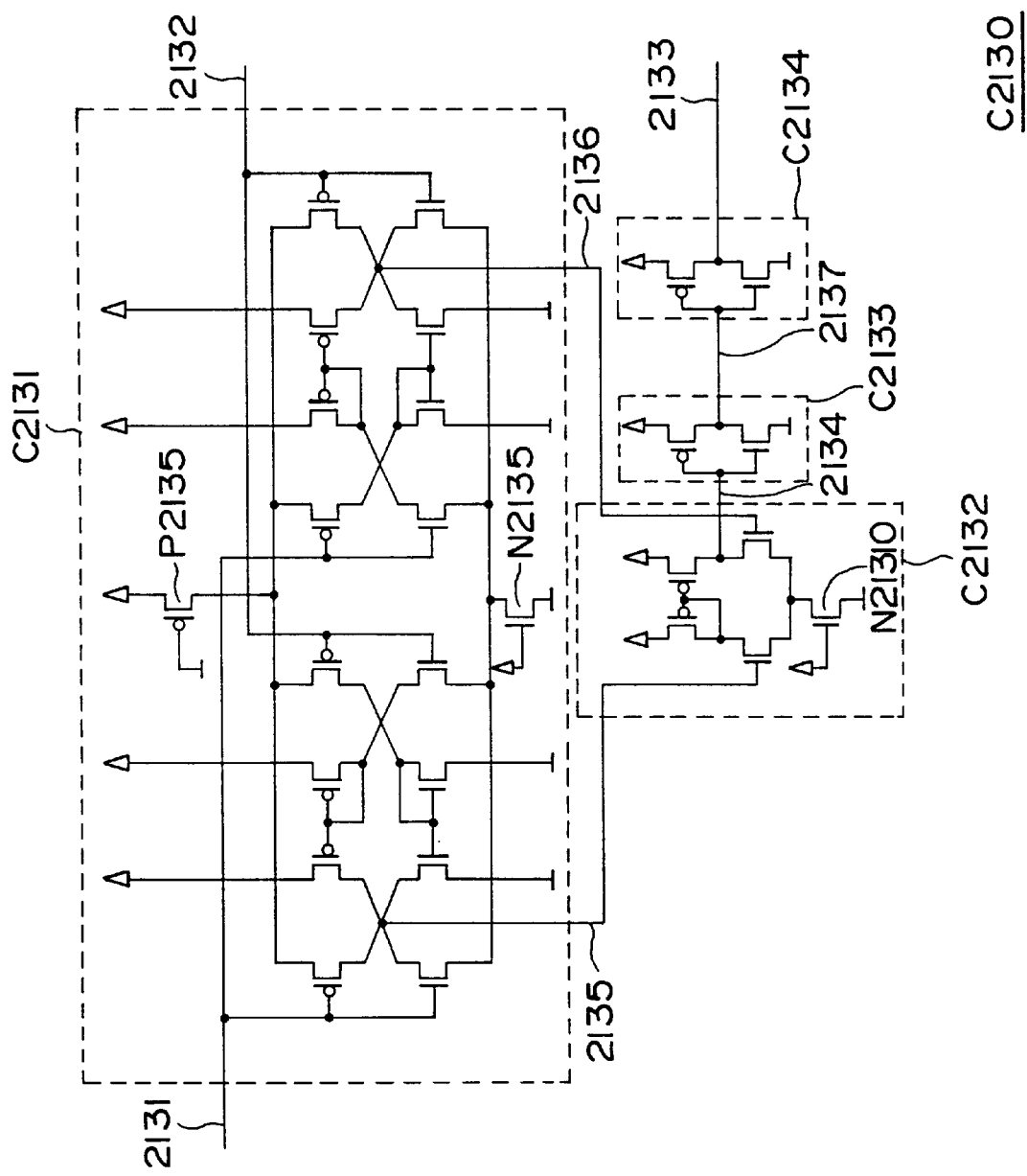
FIG. 29 is a schematic circuit diagram of another input circuit to which the present invention can be applied.

Next, the 14th embodiment is described referring to FIG. 29. FIG. 29 is a schematic configuration diagram of the input circuit C2130 according to this embodiment. As shown in FIG. 29, the input circuit C2130 according to this embodiment has a configuration in which a fourth-stage CMOS inverter circuit C2134 is further provided in the input circuit C2120 according to the 13th embodiment.

In the input circuit C2130, the fourth-stage CMOS inverter circuit C2134 is provided in the next stage following a third-stage CMOS inverter circuit C2133. Such CMOS inverter circuit C2134 is a CMOS inverter circuit whose transistor size is larger and whose driving force is greater than in the third-stage CMOS inverter circuit C2133.

Further, the connection between output terminals 2134 and 2135 of the first and second input terminals of the first-stage differential amps and the first and second input terminals of the second-stage differential amp C2132 are reversed, and this means such circuit configuration is only provided for consideration of a signal logic and is not related to the essence of this embodiment. (That is to say, even if the connection between the output terminals 2134 and 2135 of the first-stage differential amp and the input terminal of the second-stage differential amp C2132 is the same as the embodiment 2, the effects of the embodiment 3 can be obtained.

The circuit operation of a first-stage differential amp C2131, a second-stage differential amp C2132 and the third-stage CMOS inverter circuit C2133 is almost the same as the 13th embodiment shown in FIG. 28. However, because the connection between the output terminal 2135 and an output 2136 of the first-stage differential amp C2131 and the input terminal of the second-stage differential amp C2132 are reversed with the input circuit C2120 according to the 13th embodiment shown in FIG. 28, the signal logic of the output terminal 2134 is inverted relative to that of the input circuit C2120.

A signal output from an output terminal 2137 drives the fourth-stage CMOS inverter circuit C2134 and the fourth-stage CMOS inverter circuit C2134 drives an internal circuit of an LSI not illustrated connected to the output terminal 2133. Finally, a large driving force can be obtained by gradually increasing the size of a transistor from the third-stage CMOS inverter circuit C2133 to the fourth CMOS inverter circuit C2134 and increasing the driving force.

According to this embodiment described above, first, the issue included in the input circuit C2120 according to the 13th embodiment can be solved. Besides, as a means of solving the issue included in the input circuit C2120 according to the 13th embodiment, there is the configuration in which a buffer circuit having a large driving force is externally connected to the output terminal 2123 of the input circuit C2120. However, the configuration in which an inverter circuit is provided inside of an input circuit according to the 14th embodiment has an advantage that the circuit area can greatly be reduced. Further, even when this embodiment is applied to the 12th embodiment, the first and second effects can be obtained. Furthermore, the effects obtained according to the 12th embodiment can also be obtained in this embodiment.

An input circuit C2130 according to this embodiment applies a DC to the first-stage differential amp C2131 and the second-stage differential amp C2132, and consumes wasted power through this DC even when a signal is received (when the input circuit is not operated). Moreover, the power consumed through this DC occupies a large percentage to the power consumption of the entire input circuit.

Figure 30:
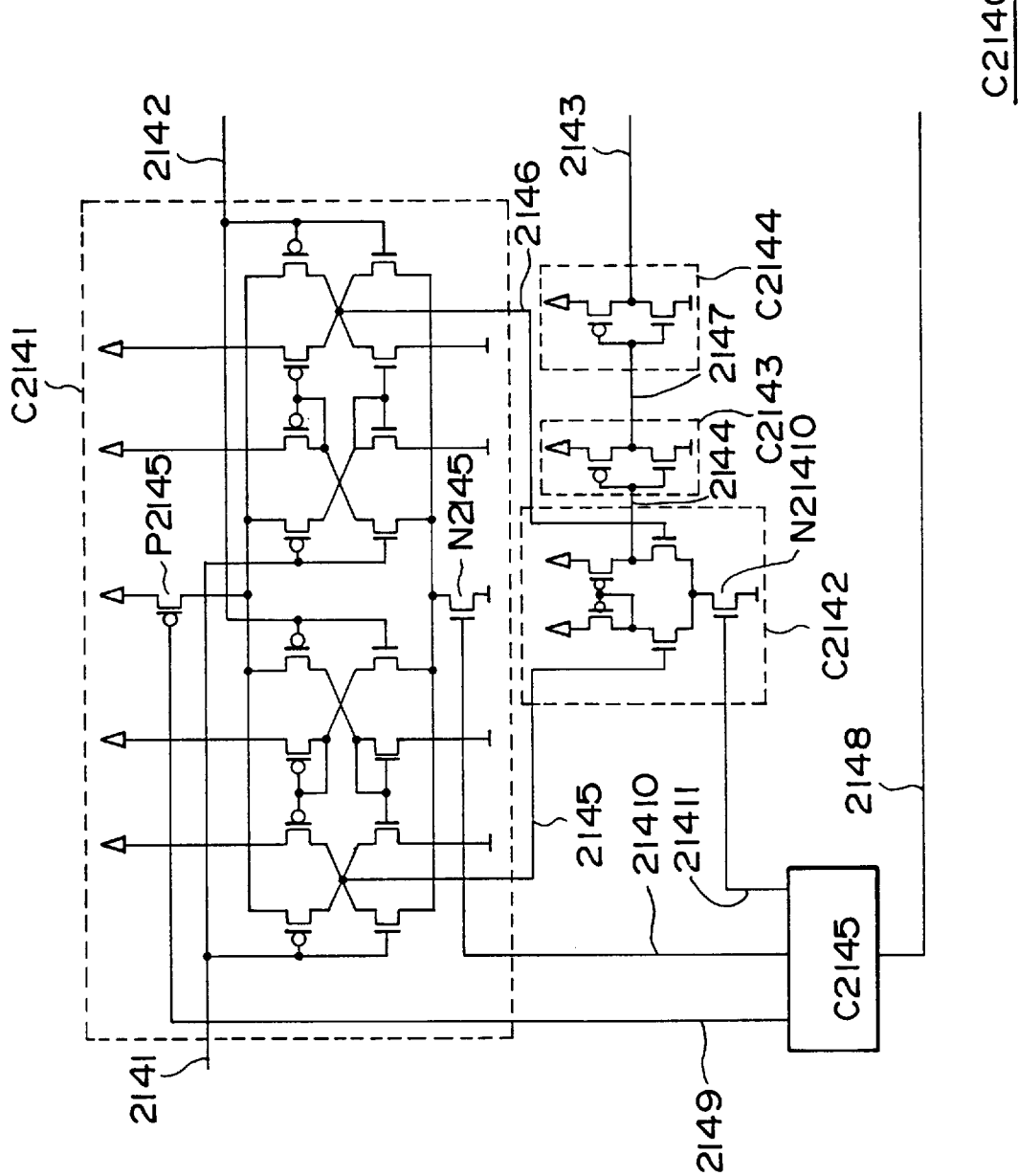
FIG. 30 is a schematic circuit diagram of another input circuit to which the present invention can be applied.
Figures 31A, 31B:
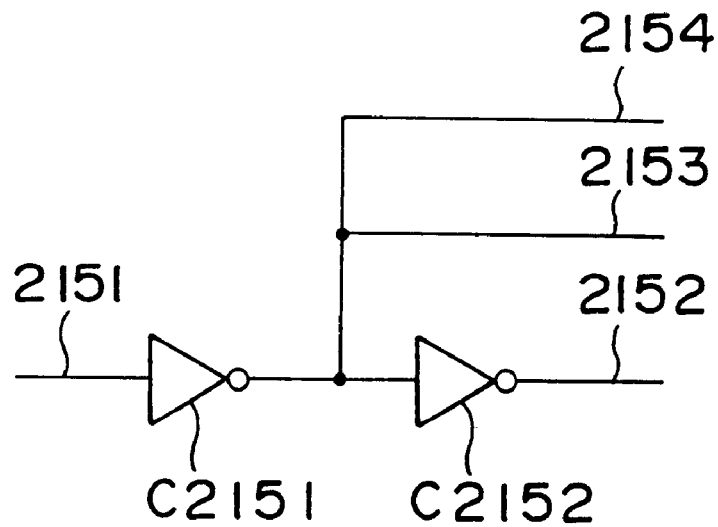
FIG. 31A is a schematic circuit diagram of the PD control circuit which can be applied to the input circuit shown in FIG. 30 and FIG. 31B where
FIG. 31B is a truth table regarding the operation of the PD control circuit shown in FIG. 36A.

Next, the 15th embodiment is described referring to FIGS. 30, 31A and 31 B. FIG. 30 is a schematic circuit diagram of the configuration of an input circuit C2140 according to this embodiment. Further, FIG. 31A is a schematic circuit diagram of a control circuit C2150 to which the input circuit C2140 can be applied as a PD (power down) control circuit C2145 and FIG. 31B is a truth table regarding the operation of the control circuit C2150.

As shown in FIG. 30, the input circuit according to this embodiment has a configuration in which the PD control circuit C2145 is further provided in the input circuit C2130 according to the 14th embodiment. In the input circuit C2140, the PD control circuit C2145 has an input terminal 2148, a first output terminal 2149, a second output terminal 21410 and a third output terminal 21411.

The input terminal 2148 of such PD control circuit C2145 is connected to the internal circuit (not illustrated) of an integrated circuit to which the input circuit 2140 is applied. Further, the first output terminal 2149 is connected to the gate terminal of a PMOS transistor P2145 to which a first-stage differential amplification circuit C2141 is applied. Furthermore, the second output terminal 21410 is connected to the gate terminal of an NMOS transistor N2145. Moreover, the third output terminal 21411 is connected to the gate-electrode of an NMOS transistor N21410 applied to a second-stage differential amplification circuit C2142. Besides, an example of the specific configuration of a PD control circuit 2145 is described later.

The circuit operation of the first-stage differential amp C2141, the second-stage differential amp C2142, a third-stage CMOS inverter circuit C2143 and a fourth-stage CMOS inverter circuit C2144 is almost the same as the 14th embodiment. Therefore, hereupon, its detailed description is omitted, and the circuit operation of a PD control circuit C2145 according to this embodiment is described in detail.

When a PD control signal is input from an internal circuit not illustrated to the input terminal 2148 of the PD control circuit C2145, a signal at the "H" level or the "L" level is output from the first output terminal 2149, the second output terminal 21410 and the third output terminal 21411 based on the logic of such PD control signal and the on and off states of the PMOS transistor P2145, NMOS transistor N2145 and NMOS transistor N21410 are controlled.

As the PD control circuit C2145, for example, a PD control circuit 2150 shown in FIG. 31A can be used. The PD control circuit C2150 has an input terminal 2151 and first, second and third output terminals 2152, 2153 and 2154 and each corresponds to an input terminal 2146 of the PD control circuit C2145 shown in FIG. 30 and the first, second and third output terminals 2149, 21410 and 21411. Further, FIG. 31B shows a truth table of the PD control circuit C2150. When an "L" level voltage of 0 V is input to the input terminal 2151, "L" level=0 V is output to the first output terminal 2152 and "H" level=Vdd (power supply voltage) is output to the second output terminal 2153 and the third output terminal 2154. Conversely, when "H" level voltage of Vdd is output to the input terminal 2151, an "H" level voltage of Vdd is output to the first output terminal 2152 and an "L" level voltage of =0 V is output to the second output terminal 2153 and the third output terminal 2154.

Next, the circuit operation of the input circuit C2140 is described specifically. When an "L" level voltage (for example, about 0 V) is output from the internal circuit outside the input circuit C2140 to the input terminal 2148 of the PD control circuit C2145, a signal of an "L" level voltage of 0 V is output to the first output terminal 2149 of the PD control circuit C2145. Further, almost simultaneously, an "H" level voltage (for example, power supply potential Vdd) is output to the second output terminal 21410 and the third output terminal 21411.

Therefore, the PMOS transistor P2145, the NMOS transistor N2145 and the NMOS transistor N21410 enter the on state and the first-stage differential amp C2141 and the second-stage differential amp C2142 enter the normal operating state. Consequently, the input circuit C2140 enters the normal operating state (the state in which an input signal can be received).

On the one hand, when the "H" level voltage (for example, power supply potential Vdd) is input from an internal circuit to the input terminal 2148, a signal at the "H" level (for example, at the power supply potential Vdd) is output to the first output terminal 2149. Further, the "L" level voltage (for example, about 0 V) is output to the second output 21410 and the third output terminal 21411. Therefore, the PMOS transistor P2145, the NMOS transistor N2145 and an NMOS transistor N1410 enter the off state, no DC is applied to the first-stage differential amp C2141 and the second-stage differential amp C2142, and a non-operating state (the state in which a signal cannot be received) is implemented.

Besides, because it is desirable that the PD control circuit C2145 should be able to control the potential of the gate electrode of the respective PMOS transistor P2145, NMOS transistor N2145 and NMOS transistor N21410, a circuit configuration other than the PD control circuit C2150 shown in FIG. 31A is also enabled.

In the embodiment described above, if the input circuit C2140 need not receive an input signal, the state in which the DC of the first-stage differential amp C2141 and the second-stage differential amp C2142 will not flow with a PD control signal (hereinafter "PD state"), can be set. Therefore, the issue which the input circuit C2140 according to the 14th embodiment leaves can be solved.

Further, the PD control circuit C2145 can be configured with a simple circuit such as the PD control circuit C2150 shown in FIG. 31A, so that the area of the input circuit C2140 is slightly increased. Besides, even if this embodiment is applied to the 12th embodiment or the 13th embodiment, the first and second effects can be obtained. Moreover, the effects obtained in the 12th embodiment, the 13th embodiment and the 14th embodiment can also be obtained in this embodiment.

Furthermore, in an input circuit C2140 according to this embodiment, the logic of the output signal of the output terminal 2143 is indefinite in the PD state. This is because the potential of the output terminal 2144 of the second-stage differential amp C2142 is indefinite. Therefore, the possibility of generating excess countermeasures in the design of an internal circuit is left.

Figure 32:
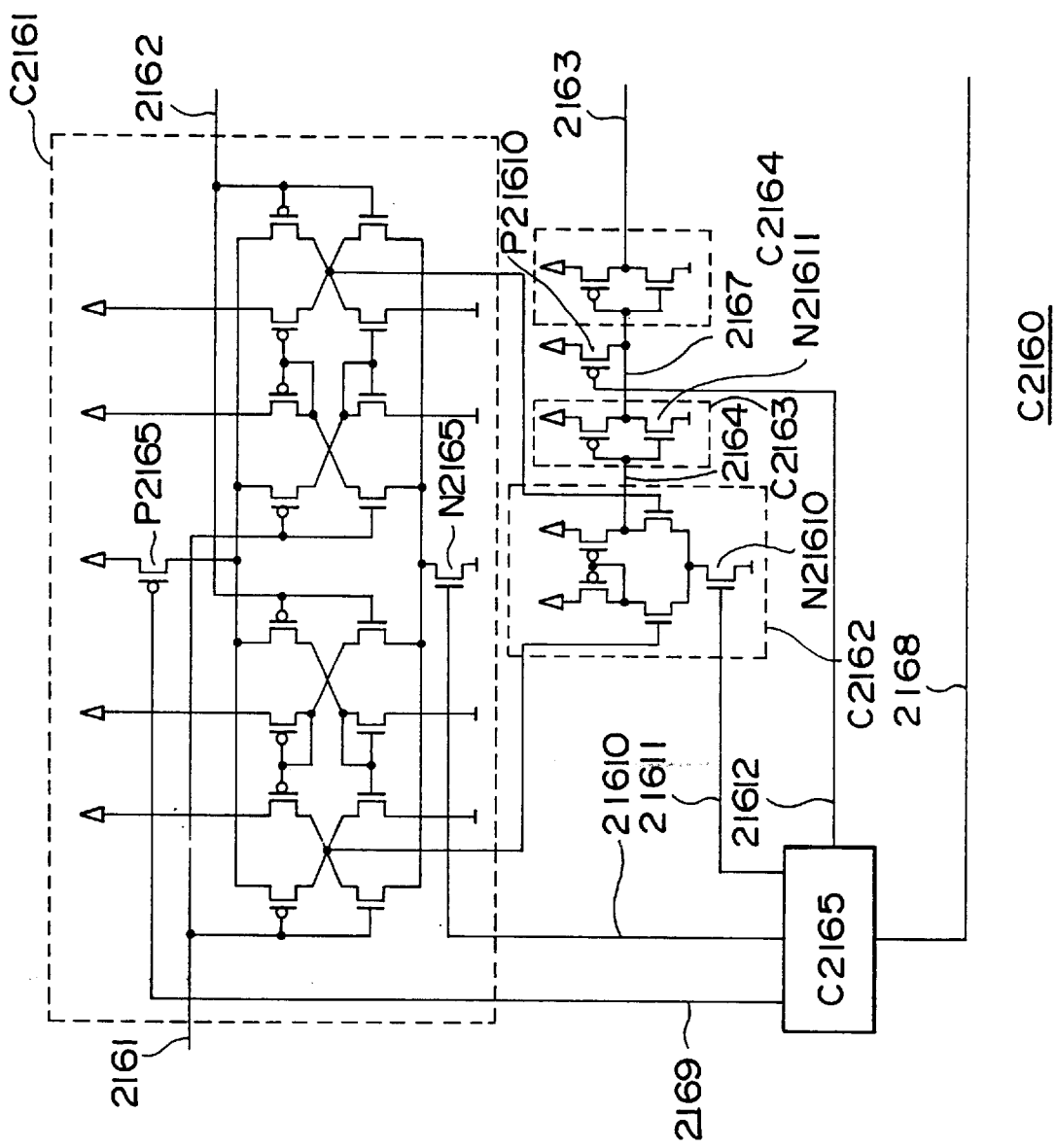
FIG. 32 is a schematic circuit diagram of another input circuit to which the present invention can be applied.
Figures 33A, 33B:
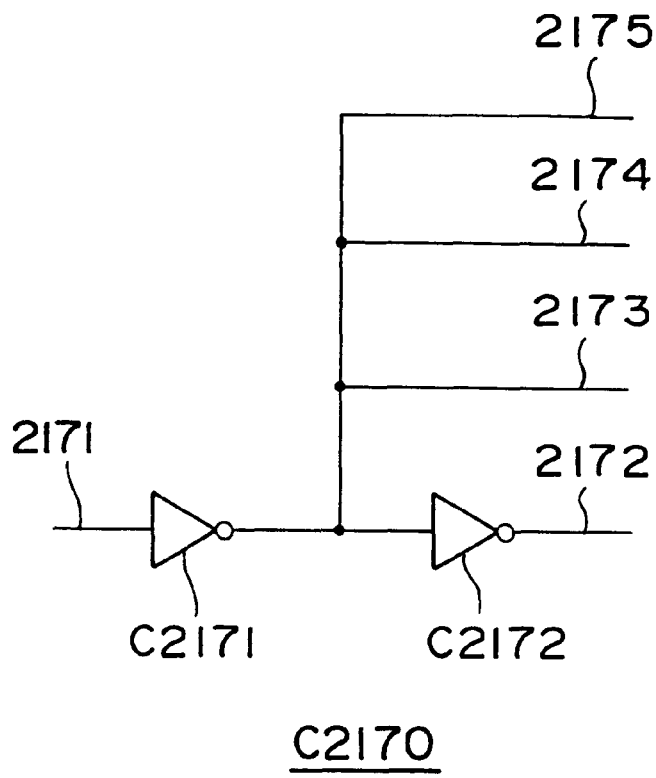
FIG. 33A is a schematic circuit diagram of the PD control circuit which can be applied to the input circuit shown in FIG. 32 and FIG. 33B where
FIG. 33B is a truth table regarding the operation of the PD control circuit shown in FIG. 36A.

Next, the 16th embodiment is described referring to FIGS. 32, 33A and 33B. Besides, FIG. 32 is a schematic circuit of an input circuit C2160 according to this embodiment. Further, FIG. 33A is a schematic circuit diagram of a control circuit C2170 which can be applied to the input circuit C2160 as a PD control circuit C2165, and FIG. 33B is a truth table regarding the operation of the control circuit C2170.

The input circuit C2160, according to this embodiment has a configuration in which a PMOS transistor P21610 is further provided in the input circuit C2140 according to the 15th embodiment shown in FIG. 30. Further, the PD control circuit C2165 has a fourth output terminal 21612.

In the PMOS transistor P21610, according to the characteristic of this embodiment, its drain terminal is connected to an output terminal 2167 of a third-stage CMOS inverter circuit C2163 and its source terminal is connected to the power supply potential Vdd. Further, the gate terminal of such PMOS transistor P21610 is connected to the fourth output terminal 21612 of the PD control circuit C2165. Besides, an example of the specific circuit configuration of the PD control circuit C2165 is described later.

In the input circuit C2160 composed as described above, the circuit operation between a first-stage differential amp C2161, a second-stage differential amp C2162, the third-stage CMOS inverter circuit C2163 and a fourth-stage CMOS inverter circuit C2164, is almost the same as each component which corresponds to the input circuit C2140 according to the 15th embodiment. Therefore, its detailed description is omitted, and the circuit operation between the PD control circuit C2165 and the PMOS transistor P21610 is described later in detail.

In the input circuit C2160, when a PD control signal is input from an internal circuit not illustrated to an input terminal 2168 of the PD control circuit C2165, a signal at the "H" level or "L" level is output from a first output terminal 2169, a second output terminal 21610, a third output terminal 21611 and a fourth output terminal 21612 based on the logic of such PD control signal. Consequently, the on and off states of a PMOS transistor P2165, an NMOS transistor N2165, an NMOS transistor N21610 and a PMOS transistor P21610 are controlled.

In this embodiment, for example, the PD control circuit C2170 shown in FIG. 33A can apply to the PD control circuit C2165, for example. The PD control circuit C2170 has an input terminal 2171, a first output terminal 2172, a second output terminal 2173, a third output terminal 2174 and a fourth input terminal 2175. These correspond to an input terminal 2168 of the PD control circuit C2165 shown in FIG. 32 and first, second, third and fourth output terminals 2169, 21610, 21611 and 21612, respectively.

FIG. 33B shows a truth table of such PD control circuit C2170. When an "L" level voltage (for example, about 0 V)

is input to the input terminal 2171, an "L" level voltage (for example, about 0 V) is output to the first output terminal 2172. Further, almost simultaneously, an "H" level voltage (for example, power supply potential Vdd) is output to the second output terminal 2172, the third output terminal 2174 and the fourth output terminal 2175.

On the one hand, when an "H" level voltage (for example, about Vdd) is input to the input terminal 2171, "H" level (for example, about Vdd) is output to the first output terminal 2172. Further, almost simultaneously, an "L" level voltage (for example, about 0 V) is output to the second output terminal 2173, the third output terminal 2174 and the fourth output terminal 2175.

Next, the circuit operation of the input circuit C2160 is described specifically. Assume the case in which an "L" level voltage (for example, about 0 V) is input from the internal circuit (not illustrated) outside the input circuit C2160 to the input terminal 2168 of the PD control circuit C2165. In such case, a signal at the "L" level voltage (for example, about 0 V) is output to the first output terminal 2169 and an "H" level voltage (for example, power supply potential Vdd) is output to the second output terminal 21610, the third output terminal 21611 and the fourth output terminal 21612.

Therefore, because all the PMOS transistor P2165, the NMOS transistor N2165 and the NMOS transistor N21610 enters the on state, the first-stage differential amp C2161 and the second-stage differential amp C2162 are in the normal operating state and the PMOS transistor P21610 is in the off state, the potential of the output terminal 2167 is not affected. Consequently, the input circuit C2160 enters the normal operating state.

On the one hand, when an "H" level voltage (for example, power supply potential Vdd) is input from an internal circuit to the input terminal 2168, a signal at the "H" level (for example, power supply potential) is output to the first output terminal 2169. Further, almost simultaneously, "L" level (for example, about 0 V) is output to the second output 21610, the third output terminal 21611 and the fourth output terminal 21612.

Therefore, the PMOS transistor P2165, the NMOS transistor N2165 and the NMOS transistor N21610 enter the off state, and because no DC flows into the first-stage differential amp C2161 and the second-stage differential amp C2162, both amps enter the non-operating state. Further, the PMOS transistor P21610 enters the on state, the output terminal 2167 is fixed at the "H" level (for example, the power supply potential) and the output terminal 2163 is fixed at the "L" level (for example, about 0 V). The input circuit C2160 has the non-operating state.

Besides, because it is desirable that the PD control circuit C2165 should be able to control the potential of the gate electrode of the PMOS transistor P2165, the NMOS transistor N2165, the NMOS transistor N21610 and the PMOS transistor P21610, its circuit configuration also enables a circuit configuration other than that shown in FIG. 33A.

According to this embodiment described above, because the logic at an output terminal can be fixed in the output circuit in a non-operational state, the above-described issue with the input circuit according to the 15th embodiment can be solved. Further, in the input circuit C2160 according to this embodiment, the PD control circuit C2165 can be configured with a simple circuit and the circuit area slightly increases because only one PMOS transistor is added to the input circuit. Furthermore, the effects obtained in the 12th embodiment, the 13th embodiment, 14th embodiment and the 15th embodiment can also continuously be obtained in this embodiment.

Besides, in the input circuit C2160 according to this embodiment, a DC may flow into the PMOS transistor P21610 and the third-stage CMOS inverter circuit C2163 in the PD state. This is because the potential of the output terminal 2164 of the second-stage differential amp C2162 is indefinite, and the NMOS transistor N21611 of the CMOS inverter circuit C2163 enters the on state. Therefore, it is impossible that no DC can fully flow even if it is desired, and power may be wastefully consumed.

Figure 34:
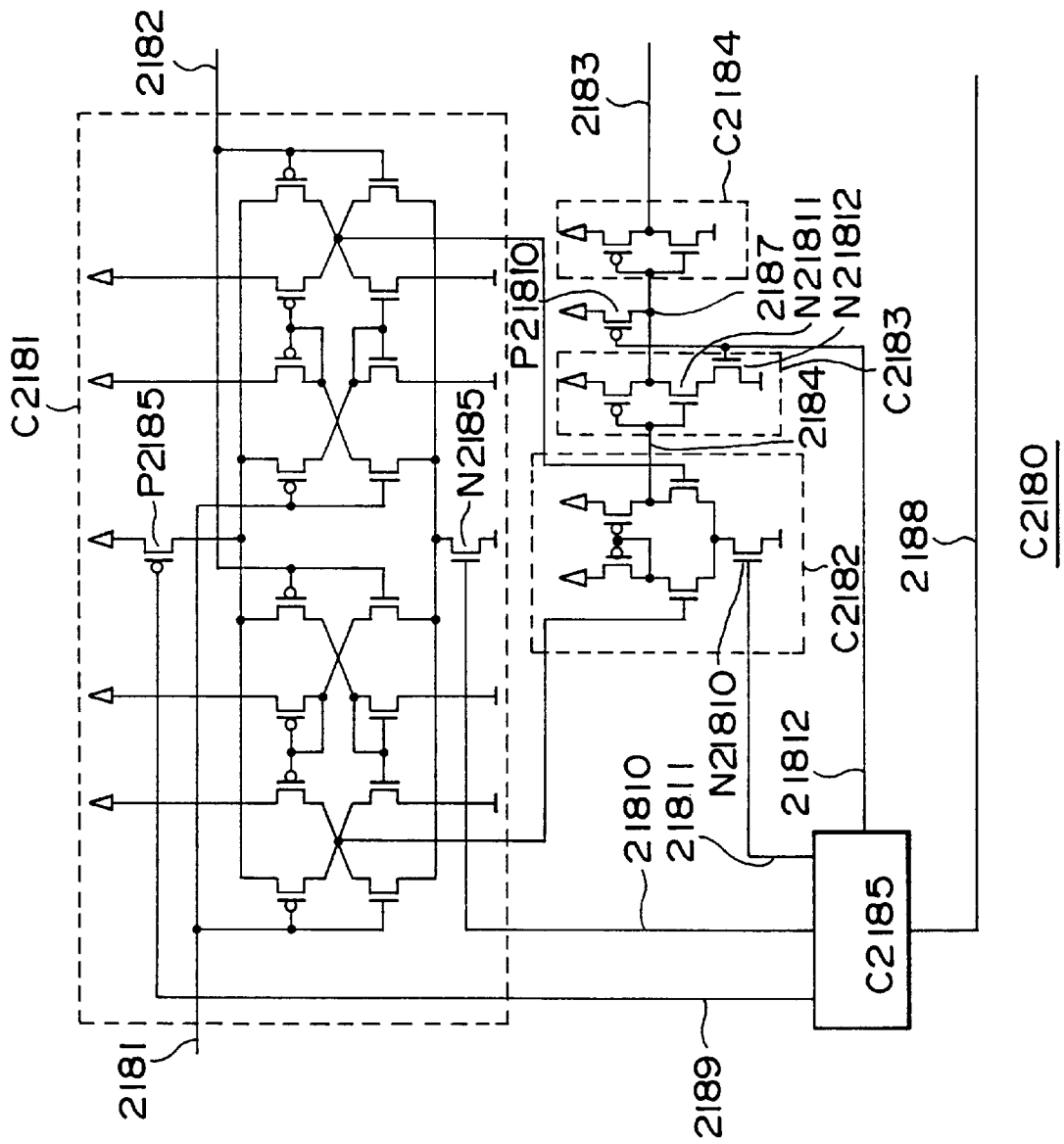
FIG. 34 is a schematic circuit diagram of another input circuit to which the present invention can be applied.
Figure 35:
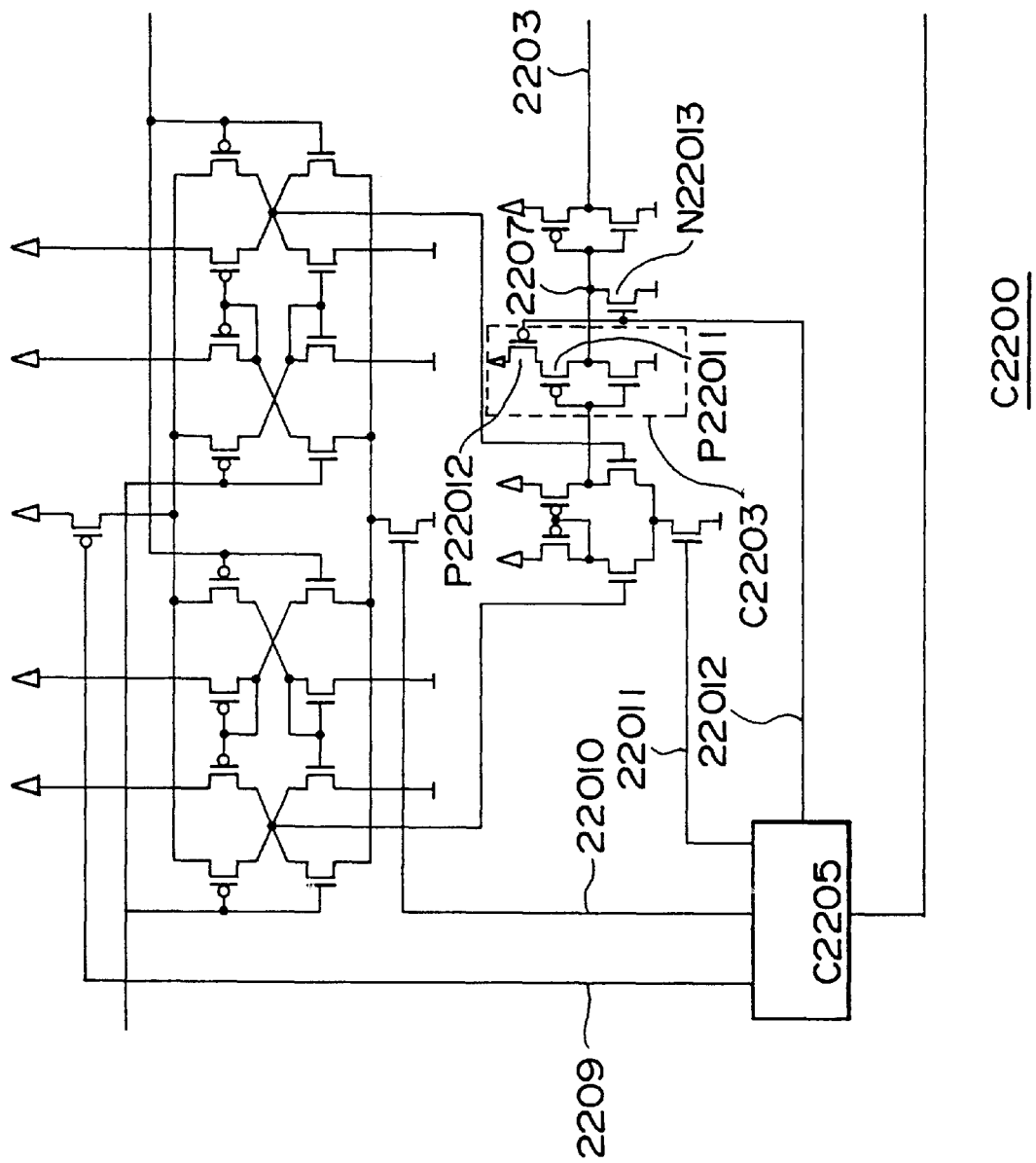
FIG. 35 is a schematic circuit diagram of another input circuit to which the present invention can be applied.
Figures 36A, 36B:
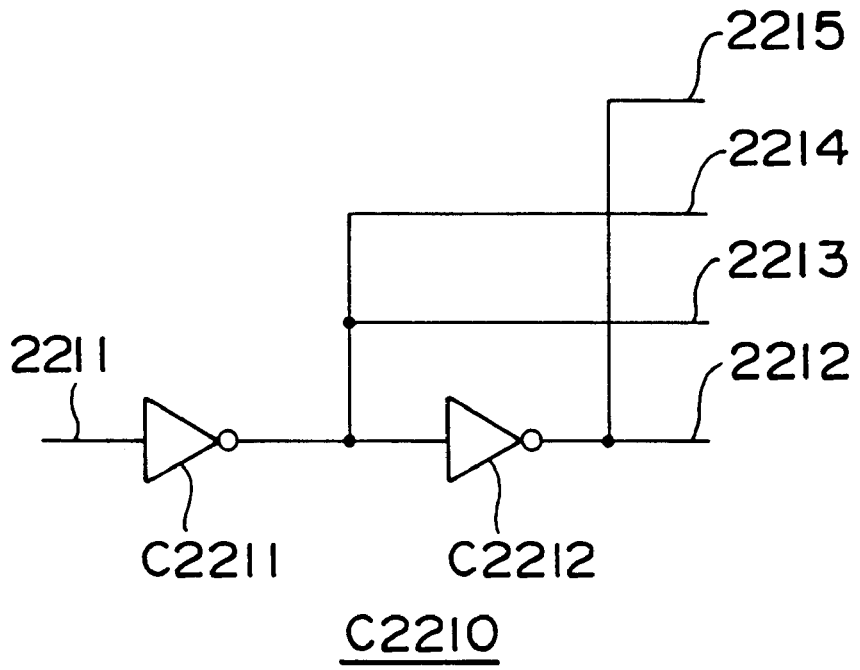
FIG. 36A is a schematic circuit diagram of the PD control circuit which can be applied to the input circuit shown in FIG. 35.
FIG. 36B is a truth table regarding the operation of the PD control circuit shown in FIG. 36A.

Next, the 17th embodiment is described referring to FIG. 34 to FIGS. 36A and 36B. Besides, FIG. 34 is a schematic circuit diagram of an input circuit C2180 according to this embodiment and FIG. 35 is a schematic circuit diagram of another input circuit C2200 according to this embodiment. FIG. 36A is a schematic circuit diagram of a PD control circuit C2210 which can apply to the input circuit C2200 as a PD control circuit C2205 and FIG. 36B is a truth table of the PD control circuit C2205.

As shown in FIG. 34, the input circuit C2180 according to this embodiment has substantially the configuration wherein, in the input circuit C2160 according to the 16th embodiment shown in FIG. 32, a CMOS inverter circuit C2183 is applied instead of the three-stage CMOS inverter circuit C2163.

The pull-down side of such three-stage CMOS inverter circuit C2183 connects an NMOS transistor N21811 and an NMOS transistor N21812 in series. The drain terminal of the NMOS transistor N21811 is an output terminal 2187 of the second-stage differential amp C2183. Further, the gate terminal is connected to an output terminal 2184 of the second-stage differential amp C2182. Furthermore, the source terminal is connected to the drain terminal of the NMOS transistor N21812. The gate terminal of the NMOS transistor N21812 is connected to the fourth output terminal 21812 of a PD control circuit C2185 and the source terminal is connected to GND. Besides, the PD control circuit C2185 can use the PD control circuit C2170 according to the 16th embodiment shown in FIG. 33A.

The circuit operation of a first-stage differential amp C2181, the second-stage differential amp C2182, the fourth-stage CMOS inverter circuit C2184 and the PD control circuit C2185 is almost the same as each corresponding component in the 16th embodiment. Therefore, the description of these details is omitted, and the circuit operation of the three-stage CMOS inverter circuit C2183 and the PD control circuit C2185 which controls it is described in detail below.

When an "L" level voltage (for example, about 0 V) is input from an internal circuit not illustrated to an input terminal 2188 of the PD control circuit control C2185, a signal at the "L" level voltage (for example, about 0 V) is output from a first output terminal 2189. Almost simultaneously, an "H" level voltage (for example, power supply potential Vdd) is output from a second output terminal 21810, a third output terminal 21811 and a fourth output terminal 21812.

Therefore, a PMOS transistor P2185, an NMOS transistor N2185, an NMOS transistor N21810 and the NMOS transistor N21812 enter the on state and the first-stage differential amp C2181, the second-stage differential amp C2182 and the third-stage CMOS inverter circuit C2183 enter the normal operating state. Further, the PMOS transistor P21810 enters the off state and the potential at the output terminal 2187 is not affected. Consequently, the input circuit C2180 enters the normal operating state.

On the one hand, when an "H" level voltage (for example, power supply potential) is input from an internal circuit not illustrated to the input terminal 2188 of the PD control circuit C2185, the signal at the "H" level (for example, power supply potential Vdd) is output from the first input terminal 2189. Almost simultaneously, the "L" level voltage (for example, about 0 V) is output from the second output terminal 21810, the third output terminal 21811 and the fourth output terminal 21812.

Therefore, the PMOS transistor P2185, NMOS transistor N2185 and NMOS transistor N21810 enter the off state, and because no DC will flow into the first-stage differential amp C2181, the second-stage differential amp C2182, both amps enter the non-operating state. Further, the NMOS transistor N21812 enters the off state and no DC will flow into the NMOS transistor N21812 regardless of the potential (the potential of the output terminal 2184) of the third-stage CMOS inverter circuit C2182. Furthermore, the PMOS transistor P21810 enters the on state, the output terminal 2187 is fixed at the "H" level voltage (for example, power supply potential) and an output terminal 2183 is fixed at the "L" level voltage of 0 V. The input circuit C2180 has the non-operating state.

Besides, because it is desirable that the PD control circuit C2170 should be able to control the potential of the gate electrodes of the PMOS transistor P2185, the NMOS transistor N2185, the NMOS transistor N21810, PMOS transistor P21810 and the NMOS transistor N21812, its circuit configuration also enables a circuit configuration other than the control circuit C2170 shown in FIG. 33A.

Further, another input circuit according to this embodiment includes the input circuit C2200 shown in FIG. 35. Such input circuit C2200 differs in the following point from the input circuit C2180 shown in FIG. 34. That is to say, as shown in FIG. 35, an NMOS transistor N22013 is applied instead of the PMOS transistor P21810 shown in FIG. 34 and the inverter circuit C2203 is applied instead of the third-stage inverter circuit C2183 shown in FIG. 34.

As shown in FIG. 35, in the input circuit C2200, the drain terminal of the NMOS transistor N22013 is connected to an output terminal 2207 and the source terminal is connected to the GND level. The third-stage inverter circuit C2203, as in the inverter circuit C2183 shown in FIG. 34, has the configuration in which a PMOS transistor P22012 is connected to the power supply potential side instead of an NMOS transistor N2183 shown in FIG. 34. In the input circuit C2200, the gate terminal of the NMOS transistor N22013 and the gate terminal of the PMOS transistor P22012 are connected to the fourth output terminal of the PD control circuit C2205.

Further, in the PD control circuit C2205 of the input circuit C2200, the output logic of the fourth control terminal 22012 becomes an inverted logic to the output logic of the first, second and third control terminals 2209, 22010 and 22011. In the input circuit C2200, for example, the PD control circuit C2210 shown in FIG. 36 can be applied to such a control circuit.

The input circuit C2200 described above outputs an "H" level voltage of Vdd from the output terminal 2203 in the PD state. Conversely, the input circuit C2180 shown in FIG. 34 outputs an "L" level voltage from the output terminal 2183 in the PD state. Like this, in this embodiment, the logic of an output signal can arbitrarily be set in the PD state.

According to the embodiment described above, the issue left with the input circuit according to the 16th embodiment can be solved. That is to say, because the input circuit C2180 according to this embodiment can set that state in which no DC flows fully, by setting it in the PD state, the DC power consumption can be eliminated. Further, because only one NMOS transistor is added to the third-stage CMOS inverter circuit C2183, the increase in an area is slight.

Besides, even if this embodiment is applied to the 12th embodiment inverter circuit C2082, the 13th embodiment inverter circuit C2123, the 14th embodiment inverter circuit C2133 and the 15th embodiment inverter circuit C2143, the first and second effects can be obtained. Further, the effects obtained in the 12th embodiment, the 13th embodiment, the 14th embodiment, the 15th embodiment and the 16th embodiment can subsequently be obtained in this embodiment.

Figure 37:
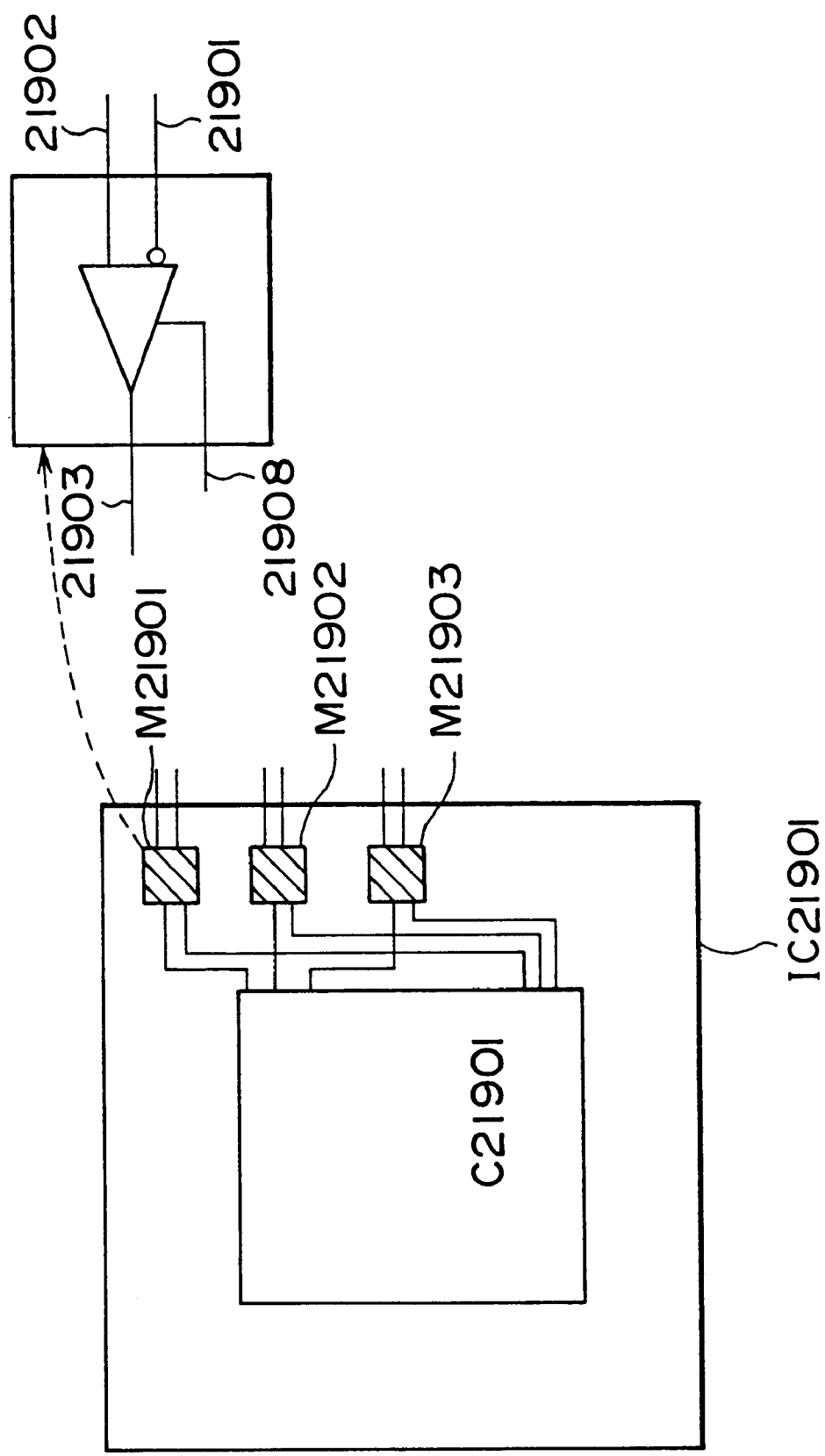
FIG. 37 is a schematic circuit diagram of a micro-celled input circuit and an LSI chip to which the present invention can be applied.

Next, the 18th embodiment is described referring to FIG. 37. FIG. 37 is a schematic circuit diagram of an LSI chip IC21901 having micro cells M21901, M21902 and M21903 according to this embodiment. In FIG. 37, the micro cells M21901, M21902 and M21903 according to this embodiment have the configuration in which the input circuit C2180 according to the 17th embodiment shown in FIG. 34 is micro-celled.

When the LSI chip IC21901 is actually designed using the micro cells M21901, M21902 and M21903 according to this embodiment, each output terminal 21903 and the internal terminal 21908 of a PD signal are connected to an internal circuit C21901. Further, respective input terminals 21901 and 21902 of the micro cells M21901, M21902 and M21903 are connected to the input pin of the LSI chip IC21901. In such configuration, on the LSI IC chip IC21901, each of the micro cells M21901, M21902 and M21903 performs the function of the input circuit C2180.

When an input circuit is micro-celled like this embodiment as described above, the design of an LSI chip can be executed by using an automatic CAD tool. Therefore, the TAT required for the design of the LSI chip can greatly be reduced. Besides, even when the 18th embodiment is applied to the input circuit C2080 according to the 12th embodiment, the input circuit C2120 according to the 13th embodiment, the input circuit C2130 according to the 14th embodiment, the input circuit C2140 according to the 15th embodiment and the input circuit C2160 according to the 16th embodiment, the effects can be obtained.

The embodiments suitable to the present invention are described above referring to the appended drawings, but the present invention is not limited to such configuration. In the category of the technical idea according to claims, for a person skilled in the art, the embodiments can correspond to various modification examples and correction examples and their modification examples and correction examples are assumed to belong to the technical range of the present invention.

For example, the embodiment is described quoting an output circuit and an input circuit applied to the signal transmission in the point-to-point format as examples, but the present invention is not limited to such configuration. The present invention can also apply to the output circuit and input circuit applied to the signal transmission in other various formats, for example, the signal transmission in the point-to-multipoint format and the signal transmission in the bus format.

Further, the embodiment is mainly described quoting an output circuit and an input circuit applied to a balanced transmission-type interface circuit as examples, but the present invention is not limited to such configuration. The present invention can apply to both the output circuit and input circuit applied to the balanced transmission-type interface circuit and the output circuit and the input circuit applied to an unbalanced transmission-type interface circuit. In particular, the input circuit applied to the unbalanced transmission-type interface circuit can be used in the reference potential within a wider range than before when the reference potential is connected to one side of an input terminal and an input signal is input to the other input terminal by applying the present invention.

Furthermore, the embodiment is mainly described quoting an output circuit and an input circuit applied to a small amplitude interface circuit of CTT as examples, but the present invention is not limited to such configuration. The present invention can also apply to other various interface circuits, for example, the output circuit and the input circuit applied to an interface circuit of LVDS. Because only a slight allowance for the sensitivity of the output circuit and the input circuit is a common problem of a small amplitude interface circuit, that can be solved by the invention, the same effects can be obtained even if the output circuit and the input circuit are applied to a CMOS small amplitude interface circuit other than CTT.

Further, needless to say, the output circuit and the input circuit quoted in examples of embodiments of the invention may mutually be combined or mutually applied in a characteristic configuration.

According to the present invention, an output circuit whose output fluctuation is suppressed and an input circuit whose allowable input voltage range is wide are implemented. Therefore, in an interface circuit for the signal transmission between integrated circuits, a fixed allowance can be secured in the input circuit and the width for which the output voltage of the output circuit is selected can be improved. Consequently, according to the present invention, the degree of design freedom of the interface circuit can greatly be improved or the yield of a manufactured product can be improved.

Further, when an output circuit whose output fluctuation is small and an input circuit whose input voltage is wide are required, the transmission signal with smaller amplitude can be used as a transmission signal used in an interface circuit. Therefore, because the charging and discharging electrical load of capacitance existing in a transmission line such as a transistor applied to the input circuit can be reduced, for example, higher speed signal transmission and low power consumption can be implemented.

What is claimed is:

1. An output circuit, comprising:
   an input terminal receiving an input logical signal;
   a first output terminal outputting a first output logical signal having a logic corresponding to a logic of the input logical signal;
   a second output terminal outputting a second output logical signal having a logic corresponding to an inverted logic of the input logical signal;
   a first constant voltage supply circuit generating a first voltage level;
   a second constant voltage supply circuit generating a second voltage level; and
   an output logic formation circuit connected to said first and second constant voltage supply circuits, said output logic formation circuit generating the first and second output logical signals having either the first voltage level or second voltage level based on the logic of the input logical signal, said output logic formation circuit including:
   an inverter having an input receiving the input logical signal and an output,
   a first NMOS transistor having a gate receiving the input logical signal, a source connected to said first constant voltage supply circuit and a drain connected to said second output terminal,
   a first PMOS transistor having a gate receiving the input logical signal, a source connected to said second constant voltage supply circuit and a drain connected to said second output terminal,
   a second NMOS transistor having a gate connected to the output of said inverter, a source connected to said first constant voltage supply circuit and a drain connected to said first output terminal, and
   a second PMOS transistor having a gate connected to the output of said inverter, a source connected to said second constant voltage supply circuit and a drain connected to said first output terminal.

2. The output circuit according to claim 1, wherein said first and second constant voltage supply circuits comprise a voltage drop circuit having an output node, the voltage drop circuit decreasing a voltage supplied from a voltage source to generate the first and second voltage levels to the output node thereof.

3. The output circuit according to claim 2, wherein the voltage drop circuit is a transistor having a gate, a source connected to the voltage source and a drain connected to the output node of the voltage drop circuit.

4. The output circuit according to claim 2, wherein said first and second constant voltage supply circuits further comprise a control circuit controlling the voltage drop circuit based on a voltage level on the output node of the voltage drop circuit.

5. The output circuit according to claim 4, wherein the control circuit turns to a power down mode in response to a power down signal received thereto.

6. The output circuit according to claim 4, wherein the control circuit is a differential amplifier having a first input connected to the output node of the voltage drop circuit, a second input receiving a referential potential and an output connected to the voltage drop circuit.

7. The output circuit according to claim 6, further comprising a referential potential generator connected to the differential amplifier for supplying the referential potential.

8. The output circuit according to claim 1, further comprising:
   a third NMOS transistor having a gate connected to a power supply, a source connected to the first constant voltage supply circuit and a drain,
   a third PMOS transistor having a gate connected to the ground, a source connected to the second constant voltage supply circuit and a drain,
   a terminating potential node supplying a terminating potential,
   a first terminating resistor connected between the drain of the third NMOS transistor and the terminating potential node, and
   a second terminating resistor connected between the drain of the third PMOS transistor and the terminating potential node.

9. The output circuit according to claim 8, wherein said first and second constant voltage supply circuits comprise:
   a voltage drop circuit having an output node, the voltage drop circuit decreasing a voltage supplied from a voltage source to generate the first and second voltage levels to the output node thereof, and a control circuit controlling the voltage drop circuit based on a voltage level on the drain of the third NMOS and PMOS transistors.

10. The output circuit according to claim 1, wherein said output logic formation circuit comprises:
   an inverter having an input receiving the input logical signal and an output,
   a first NMOS transistor having a gate connected to the output of the inverter, a first terminal connected to the first constant voltage supply circuit and a second terminal connected to the second output terminal,
   a second NMOS transistor having a gate receiving the input logical signal, a first terminal connected to the second constant voltage supply circuit and a second terminal connected to the second output terminal,
   a third NMOS transistor having a gate receiving the input logical signal, a first terminal connected to the first constant voltage supply circuit and a second terminal connected to the first output terminal, and
   a fourth NMOS transistor having a gate connected to the output of the inverter, a first terminal connected to the second constant voltage supply circuit and a second terminal connected to the first output terminal.

11. The output circuit according to claim 10, wherein said output logic formation circuit further comprises a fifth NMOS transistor having a gate connected to a power supply, a first terminal connected to the first output terminal and a second terminal connected to the second output terminal.

12. The output circuit according to claim 1, wherein said output logic formation circuit turns the first and second output terminal to high impedance state when receiving a three state control signal.

13. The output circuit according to claim 12, wherein said output logic formation circuit comprises:
   a first inverter having an input receiving the input logical signal and an output;
   a second inverter having an input receiving the three state control signal and an output;
   a first NAND gate having a first input receiving the input logical signal, a second input receiving the three state control signal and an output;
   a second NAND gate having a first input receiving the input logical signal, a second input connected to the output of said second inverter and an output;
   a first NOR gate having a first input connected to the output of said first inverter, a second input connected to the output of said second inverter and an output;
   a second NOR gate having a first input connected to the output of said first inverter, a second input receiving the three state control signal and an output;
   a first NMOS transistor having a gate connected to the output of said first NOR gate, a source connected to the first constant voltage supply circuit and a drain connected to the second output terminal,
   a first PMOS transistor having a gate connected to the output of said second NAND gate, a source connected to the second constant voltage supply circuit and a drain connected to the second output terminal,
   a second NMOS transistor having a gate connected to the output of said second NOR gate, a source connected to the first constant voltage supply circuit and a drain connected to the first output terminal, and
   a second PMOS transistor having a gate connected to the output of said first NAND gate, a source connected to the second constant voltage supply circuit and a drain connected to the first output terminal.

14. An interface circuit, comprising:
   an input circuit;
   a first transmission line having one end connected to said input circuit;
   a second transmission line having one end connected to said input circuit;
   a terminal potential node supplying a terminating potential;
   a first terminating resistor connected between said first transmission line and said terminating potential node;
   a second terminating resistor connected between said second transmission line and said terminating potential node; and
   an output circuit, including:
      an input terminal receiving an input logical signal,
      a first output terminal connected to said first transmission line for outputting a first output logical signal having a logic corresponding to a logic of the input logical signal,
      a second output terminal connected to said first transmission line for outputting a second output logical signal having a logic corresponding to an inverted logic of the input logical signal,
      a first constant voltage supply circuit generating a first voltage level,
      a second constant voltage supply circuit generating a second voltage level, and
      an output logic formation circuit connected to said first and second constant voltage supply circuits, said output logic formation circuit generating the first and second output logical signals having either the first voltage level or second voltage level based on the logic of the input logical signal, said output logic formation circuit including:
         an inverter having an input receiving the input logical signal and an output,
         a first NMOS transistor having a gate receiving the input logical signal, a source connected to said first constant voltage supply circuit and a drain connected to said second output terminal,
         a first PMOS transistor having a gate receiving the input logical signal, a source connected to said second constant voltage supply circuit and a drain connected to said second output terminal,
         a second NMOS transistor having a gate connected to the output of said inverter, a source connected to said first constant voltage supply circuit and a drain connected to said first output terminal, and
         a second PMOS transistor having a gate connected to the output of said inverter, a source connected to said second constant voltage supply circuit and a drain connected to said first output terminal.

15. The interface circuit according to claim 14, wherein said first and second constant voltage supply circuits comprise a voltage drop circuit having an output node, the voltage drop circuit decreasing a voltage supplied from a voltage source to generate the first and second voltage levels to the output node thereof.

16. The interface circuit according to claim 15, wherein the voltage drop circuit is a transistor having a gate, a source connected to the voltage source and a drain connected to the output node of the voltage drop circuit.

17. The interface circuit according to claim 15, wherein said first and second constant voltage supply circuits further comprise a control circuit controlling the voltage drop circuit based on a voltage level on the output node of the voltage drop circuit.

18. The output circuit according to claim 17, wherein the control circuit turns to a power down mode in response to a power down signal received thereto.

19. The output circuit according to claim 17, wherein the control circuit is a differential amplifier having a first input connected to the output node of the voltage drop circuit, a second input receiving a referential potential and an output connected to the voltage drop circuit.

20. An input circuit, comprising:

a pair of first differential amplification circuits which is provided with first and second differential amplification circuits to which a first input terminal is connected in common, second input terminals are connected in common and output terminals are connected in common; and a first inverting circuit in which an input terminal connects with said output terminals.

21. An input circuit, comprising:

a pair of first and second differential amplification circuits which is provided with first and second differential amplification circuits, respectively, to which first input terminals are connected in common, second input terminals are connected in common and output terminals are connected in common;

a first common input terminal to which said first input terminals of a pair of said first differential amplification circuits and said first input terminals of a pair of said second differential amplification circuits are connected in common;

a second common input terminal to which said second input terminals of a pair of said first differential amplification circuits and said first input terminals of a pair of said second differential amplification circuits are connected in common;

a third differential amplification circuit in which the first input terminal is connected to said output terminals of a pair of said first differential amplification circuits and the second input terminal is connected to the common output terminal of a pair of said second differential circuits; and a first inverting circuit in which an input terminal is connected to the output terminal of said third differential amplification circuit.

22. The input circuit according to claim 21, further comprising a second inverting circuit in which the input circuit is connected to the output terminal of said first inverting circuit.

23. The input circuit according to claim 21, further comprising a switching means which switches the stop/operation with a pair of said first differential amplification circuits, a pair of said second differential amplification circuits and said third differential amplification circuit.

24. The input circuit according to claim 21, wherein said switching means is also provided with the function of controlling the operation of said first inverting circuit.

25. The input circuit according to claim 21, wherein said switching means is also provided with comprises the function of controlling the operation of said second inverting circuit.

26. The input circuit according to claim 21, wherein said switching means comprises an external input terminal, a group of inverted logic circuit terminals, a group of non-inverted logic output terminals, a third inverting circuit in which an output terminal is connected to a group of said non-inverted logic output terminals and a fourth inverting circuit in which an output terminal is connected to said external input terminal and the output terminal is connected to a group of said inverted logic output terminals and the input terminal of the third inverting circuit.

* * * * *